United States Patent
Majithia et al.

(10) Patent No.: US 11,643,559 B2
(45) Date of Patent: May 9, 2023

(54) METHODS AND COMPOSITIONS FOR MAGNETIZABLE PLASTICS

(71) Applicant: Magnomer, Inc., Framingham, MA (US)

(72) Inventors: Ravish Y. Majithia, Framingham, MA (US); Vishal D. Salian, Mumbai (IN); Kumaril R. Kapadia, Mumbai (IN)

(73) Assignee: Magnomer, Inc., Framingham, MA (US)

( * ) Notice: Subject to any disclaimer, the term of this patent is extended or adjusted under 35 U.S.C. 154(b) by 497 days.

(21) Appl. No.: 16/750,780

(22) Filed: Jan. 23, 2020

(65) Prior Publication Data

US 2020/0231829 A1    Jul. 23, 2020

Related U.S. Application Data

(63) Continuation of application No. PCT/US2018/043778, filed on Jul. 25, 2018.
(Continued)

(51) Int. Cl.
*C09D 11/037* (2014.01)
*C08K 3/08* (2006.01)
(Continued)

(52) U.S. Cl.
CPC .............. *C09D 11/037* (2013.01); *C08K 3/08* (2013.01); *C09D 11/033* (2013.01);
(Continued)

(58) Field of Classification Search
CPC .................................................... C09D 11/037
See application file for complete search history.

(56) References Cited

U.S. PATENT DOCUMENTS 3,624,731 A    11/1971    Lindberg
4,434,007 A     2/1984    Lenox et al.
(Continued)

FOREIGN PATENT DOCUMENTS

CN    103602139 A    2/2014
EP      0011480 A2    5/1980
(Continued)

OTHER PUBLICATIONS

International Search Report dated Nov. 19, 2018 for International Application Serial No. PCT/US2018//043778, (6 pages).
(Continued)

*Primary Examiner* — William D Young
(74) *Attorney, Agent, or Firm* — Greenberg Traurig, LLP

(57) ABSTRACT

Provided herein are methods and compositions comprising a non-toxic ferromagnetic ink composition. Also provided herein are plastic objects containing a surface coating of a food-safe ferromagnetic ink composition. The coating imparts functionality to a plastic object such that the object is capable of being mechanically separated from waste stream using a commercial magnetic separator. The food-safe ink composition, which can be printed using high-speed flexographic, intaglio, offset printing or pad printing, combined with heat transfer printing or hot foil stamping consists of an ingestible magnetically susceptible pigment capable of rendering the printed template with magnetically active properties. The surface of the plastic object described can consist of geometric designs which increase printable surface area without significant changes in dimensions of the said object.

26 Claims, 3 Drawing Sheets

Related U.S. Application Data

(60) Provisional application No. 62/536,536, filed on Jul. 25, 2017.

(51) Int. Cl.
    *C09D 11/033* (2014.01)
    *C09D 11/104* (2014.01)
    *C09D 11/107* (2014.01)
    *G09F 3/02* (2006.01)

(52) U.S. Cl.
    CPC .......... *C09D 11/104* (2013.01); *C09D 11/107* (2013.01); *G09F 3/02* (2013.01); *C08K 2003/0856* (2013.01); *C08K 2201/01* (2013.01); *G09F 2003/0202* (2013.01); *G09F 2003/0251* (2013.01)

(56) References Cited

U.S. PATENT DOCUMENTS

| | | |
|---|---|---|
| 4,585,553 A | 4/1986 | Hikosaka et al. |
| 4,812,492 A | 3/1989 | Eckes et al. |
| 4,866,232 A | 9/1989 | Stone et al. |
| 4,906,488 A | 3/1990 | Pera |
| 4,925,215 A | 5/1990 | Klaiber |
| 5,189,952 A | 3/1993 | Ohmura et al. |
| 5,223,360 A | 6/1993 | Prengel et al. |
| RE34,829 E | 1/1995 | Stone et al. |
| 5,382,963 A | 1/1995 | Pond et al. |
| 5,630,363 A | 5/1997 | Davis et al. |
| 5,648,160 A | 7/1997 | Kishimoto et al. |
| 5,651,316 A | 7/1997 | Demoore et al. |
| 5,693,375 A | 12/1997 | Sato et al. |
| 5,811,314 A | 9/1998 | Chen et al. |
| 6,149,857 A | 11/2000 | McArdle et al. |
| 6,180,226 B1 | 1/2001 | McArdle et al. |
| 6,221,138 B1 | 4/2001 | Kenny |
| 6,248,805 B1 | 6/2001 | Nguyen et al. |
| 6,334,893 B1 | 1/2002 | Pfaff et al. |
| 6,423,172 B1 | 7/2002 | McArdle et al. |
| 6,517,628 B1 | 2/2003 | Pfaff et al. |
| 7,008,979 B2 | 3/2006 | Schottman et al. |
| 7,378,150 B2 | 5/2008 | Fugiel et al. |
| 7,887,849 B2 | 2/2011 | Heinz et al. |
| 9,062,222 B2 | 6/2015 | Nilsson et al. |
| 2003/0128029 A1 | 7/2003 | Sawa et al. |
| 2003/0206091 A1 | 11/2003 | Matsumura et al. |
| 2004/0000254 A1 | 1/2004 | McElligott et al. |
| 2004/0001973 A1 | 1/2004 | Gao et al. |
| 2004/0038026 A1 | 2/2004 | Li et al. |
| 2004/0178391 A1 | 9/2004 | Conaghan et al. |
| 2005/0186439 A1 | 8/2005 | Staadecker et al. |
| 2006/0037432 A1 | 2/2006 | Deevi et al. |
| 2006/0150854 A1 | 7/2006 | Benninger et al. |
| 2006/0257634 A1 | 11/2006 | Bossert |
| 2006/0272534 A1 | 12/2006 | Lieberman |
| 2007/0123607 A1 | 5/2007 | King et al. |
| 2007/0144383 A1 | 6/2007 | Klann et al. |
| 2007/0269682 A1 | 11/2007 | Matas et al. |
| 2008/0169452 A1 | 7/2008 | Schneider et al. |
| 2008/0213609 A1 | 9/2008 | Jablonski et al. |
| 2008/0290006 A1 | 11/2008 | Duffy et al. |
| 2009/0191401 A1 | 7/2009 | Deetz |
| 2009/0321676 A1 | 12/2009 | Breton et al. |
| 2010/0098921 A1 | 4/2010 | Burrows |
| 2012/0000833 A1 | 1/2012 | Shelby et al. |
| 2012/0077001 A1 | 3/2012 | Klint et al. |
| 2012/0162330 A1 | 6/2012 | Iftime et al. |
| 2012/0235074 A1 | 9/2012 | Iftime et al. |
| 2012/0236064 A1 | 9/2012 | Iftime et al. |
| 2013/0216597 A1 | 8/2013 | Mathias et al. |
| 2014/0020586 A1 | 1/2014 | Schiplage et al. |
| 2014/0044801 A1 | 2/2014 | Sakurada et al. |
| 2014/0308490 A1 | 10/2014 | Burrows |
| 2014/0354754 A1 | 12/2014 | Mayo et al. |
| 2015/0050508 A1 | 2/2015 | Stout et al. |
| 2015/0344716 A1 | 12/2015 | Kroell et al. |
| 2015/0368425 A1 | 12/2015 | Hughes et al. |
| 2016/0200923 A1* | 7/2016 | Loccufier ............ C09D 11/322 428/195.1 |
| 2016/0243814 A1 | 8/2016 | Schaefer et al. |
| 2016/0250783 A1 | 9/2016 | Schleicher, Jr. |
| 2016/0368261 A1 | 12/2016 | Le Bris et al. |
| 2017/0190927 A1* | 7/2017 | Mao ..................... B05D 7/14 |
| 2021/0009738 A1* | 1/2021 | Illsley ................. C09D 11/101 |

FOREIGN PATENT DOCUMENTS

| | | |
|---|---|---|
| EP | 0030507 A1 | 6/1981 |
| EP | 0063108 | 10/1982 |
| EP | 0099731 A2 | 2/1984 |
| EP | 0133941 A1 | 3/1985 |
| EP | 0276654 | 8/1988 |
| EP | 0342571 | 5/1989 |
| EP | 0404378 A1 | 12/1990 |
| EP | 0641648 A1 | 3/1995 |
| EP | 0647593 A1 | 4/1995 |
| EP | 0686675 A1 | 12/1995 |
| EP | 0772849 A1 | 5/1997 |
| EP | 0960911 A1 | 12/1999 |
| EP | 1013725 A1 | 6/2000 |
| EP | 1027391 A1 | 8/2000 |
| EP | 1090074 A1 | 4/2001 |
| EP | 1104447 A1 | 6/2001 |
| EP | 0885325 B1 | 7/2001 |
| EP | 1226072 A1 | 7/2002 |
| EP | 1263891 A1 | 12/2002 |
| EP | 1391318 A2 | 2/2004 |
| EP | 1493590 A1 | 1/2005 |
| EP | 1537182 A2 | 6/2005 |
| EP | 1669213 A1 | 6/2006 |
| EP | 1683839 A2 | 7/2006 |
| EP | 1854852 A1 | 11/2007 |
| EP | 1880866 A1 | 1/2008 |
| EP | 1978063 A1 | 10/2008 |
| EP | 1987960 A1 | 11/2008 |
| EP | 2234816 A2 | 10/2010 |
| EP | 2303969 A1 | 4/2011 |
| EP | 2604430 A2 | 6/2013 |
| EP | 2608964 A2 | 7/2013 |
| EP | 2749611 A2 | 7/2014 |
| WO | 1990011363 | 10/1990 |
| WO | WO-9637868 A1 | 11/1996 |
| WO | 1999005922 | 2/1999 |
| WO | 2003046068 | 6/2003 |
| WO | WO-03046508 A2 | 6/2003 |
| WO | WO-03088281 A1 | 10/2003 |
| WO | 2004104120 A1 | 12/2004 |
| WO | 2004106082 | 12/2004 |
| WO | 2005080030 | 9/2005 |
| WO | WO-2006082415 A2 | 8/2006 |
| WO | WO-2006093398 A1 | 9/2006 |
| WO | WO-2006103436 A1 | 10/2006 |
| WO | WO-2006120227 A1 | 11/2006 |
| WO | 2006130980 A1 | 12/2006 |
| WO | WO-2007057146 A1 | 5/2007 |
| WO | 2007097747 | 8/2007 |
| WO | WO-2008055645 A2 | 5/2008 |
| WO | WO-2008059552 A1 | 5/2008 |
| WO | WO-2008141971 A2 | 11/2008 |
| WO | WO-2008141972 A1 | 11/2008 |
| WO | WO-2008141973 A1 | 11/2008 |
| WO | WO-2009058137 A1 | 5/2009 |
| WO | WO-2009074284 A1 | 6/2009 |
| WO | 2010026372 | 3/2010 |
| WO | 2010115986 A2 | 10/2010 |
| WO | WO-2011107527 A1 | 9/2011 |
| WO | WO-2012003195 A2 | 1/2012 |
| WO | WO-2012024472 A1 | 2/2012 |
| WO | 2012160181 | 11/2012 |
| WO | 2013056213 | 10/2013 |
| WO | WO-2014024162 A1 | 2/2014 |
| WO | 2014070241 | 5/2014 |
| WO | WO-2014072172 A1 | 5/2014 |

(56) References Cited

FOREIGN PATENT DOCUMENTS

| WO | WO-2014118569 A1 | 8/2014 |
| WO | WO-2015036615 A1 | 3/2015 |
| WO | 2015097288 A1 | 7/2015 |
| WO | WO-2015189624 A2 | 12/2015 |
| WO | WO-2016003563 A2 | 1/2016 |
| WO | WO-2016083259 A1 | 6/2016 |
| WO | 2016125132 | 8/2016 |
| WO | 2016156408 A2 | 10/2016 |

OTHER PUBLICATIONS

Written Opinion of the International Searching Authority dated Nov. 19, 2018 for International Application Serial No. PCT/US2018/043778, (15 pages).

* cited by examiner

METHODS AND COMPOSITIONS FOR MAGNETIZABLE PLASTICS

CROSS-REFERENCE

This application is a continuation of international application no. PCT/US2018/43778 filed on Jul. 25, 2018, which claims the benefit to U.S. Provisional Patent Application No. 62/536,536, filed Jul. 25, 2017, which is incorporated herein by reference in its entirety.

BACKGROUND

The present disclosure relates to the design of a plastic object, used as a non-durable good, characterized by a ferromagnetic marker on the surface of the object, which enables separation of the object in a magnetic field.

SUMMARY

The primary objective of the present disclosure is the design of a plastic object which is imprinted with ink or affixed with a pre-printed label containing ink which enables the separation of the desired object from a mixed-waste stream under application of a magnetic field.

An additional objective of the present disclosure is to describe the geometric surface design of the plastic object which is printed in a way that increases printable surface area on the plastic object without significant change in dimensions of the object.

Another objective of the present disclosure is to showcase the formulation of a printable ink which can be temporarily magnetized in a magnetic field and can be printed, using commercial high-speed printing process such as flexo, intaglio, screen, pad or offset printing, onto the plastic object either directly or indirectly using heat transfer printing or hot foil stamping or as a pre-printed label to be affixed mechanical.

It is also an object of the present disclosure to use the plastic object with ferromagnetic element as food-safe non-toxic object capable for direct or indirect contact with foodstuffs.

In an aspect, the present disclosure provides a ferromagnetic ink composition, comprising: a ferromagnetic material, a resin, and at least one of a wetting agent and a dispersing agent; wherein the ferromagnetic ink composition is a food contact substance.

In some embodiments, the ferromagnetic material comprises at least 20% of the weight of the ferromagnetic ink composition. In some embodiments, the ferromagnetic material is unadulterated iron powder, carbonyl iron, carbonyl cobalt, carbonyl nickel, iron alloy, iron oxide, low carbon steel grade, nickel, cobalt, ferritic stainless steel, atomized stainless steel, or any combination thereof. In some embodiments, the unadulterated iron powder is electrolytic iron, atomized iron, or reduced iron. In some embodiments, the iron alloy is cobalt, vanadium manganese, molybdenum, silicon, nickel. In some embodiments, the iron oxide is iron (III) oxide or iron (II, III) oxide. In some embodiments, the resin comprises at least 5% of the weight of the ferromagnetic ink composition. In some embodiments, the resin is a vinyl chloride vinyl acetate copolymer, nitrocellulose, polyurethane, a ketone aldehyde polymer, an alcohol-soluble polyamide, a co-solvent polyamide, a maleic resin, an ester gum resin, an acrylic resin, a cellulose acetate butyrate resin, cellulose acetate propionate, an amorphous polyester resin, a chlorinated rubber, an ethyl vinyl acetate resin, or any combination thereof.

In some embodiments, the wetting and/or the dispersing agent is Solsperse 8000, Solsperse 8200, Solsperse 2000, Solsperse 24000, Solsperse 17000, Disperbyk 108, Disperbyk 2155, Disperbyk 9077, WA5013, 98C, BYK 111, or any combination thereof. In some embodiments, the ferromagnetic ink composition further comprises at least one solvent, wherein the solvent comprises about 25% of the weight of the ferromagnetic ink composition. In some embodiments, the solvent is methanol, ethanol, n-propanol, isopropyl alcohol, ethyl acetate, n-propyl acetate, isopropyl acetate, n-butyl acetate, toluene, methyl ethyl ketone, acetone, or any combination thereof.

In some embodiments, the ferromagnetic ink composition further comprises a ferromagnetic material/resin ratio ranging from about 2/1 to about 6/1. In some embodiments, the ferromagnetic ink composition further comprises ferromagnetic material/resin ratio ranging from about 3/1 to about 5/1. In some embodiments, all components of the ferromagnetic ink composition are indirect food additives. In some embodiments, the indirect food additives are Generally Recognized as Safe (GRAS) substances. In some embodiments, the components of the ferromagnetic ink composition have a migration of 10 milligrams (mg) per squared decimeter ($dm^2$) at most.

In some embodiments, the ferromagnetic ink composition is temporarily magnetized when exposed to a magnetic field. In some embodiments, the ferromagnetic ink composition is printable. In some embodiments, the ferromagnetic ink composition further comprises a colored pigment.

In another aspect, the present disclosure provides a ferromagnetic label, comprising: a ferromagnetic ink composition, a film, a release varnish, and an adhesive layer.

In some embodiments, the ferromagnetic ink composition is a food contact substance. In some embodiments, the ferromagnetic ink composition comprises a ferromagnetic material, a resin, and a wetting and/or dispersing agent. In some embodiments, the ferromagnetic material comprises at least 20% of the weight of ferromagnetic ink composition. In some embodiments, the ferromagnetic material is unadulterated iron powder, carbonyl iron, carbonyl cobalt, carbonyl nickel, iron alloy, iron oxide, low carbon steel grade, nickel, cobalt, ferritic stainless steel, atomized stainless steel, or any combination thereof. In some embodiments, the unadulterated iron powder is electrolytic iron, atomized iron, or reduced iron. In some embodiments, the iron alloy is cobalt, vanadium manganese, molybdenum, silicon, nickel. In some embodiments, the iron oxide is iron (III) oxide or iron (II, III) oxide. In some embodiments, the resin comprises at least 5% of the weight of the ferromagnetic ink composition. In some embodiments, the resin is a vinyl chloride vinyl acetate copolymer, nitrocellulose, polyurethane, a ketone aldehyde polymer, an alcohol-soluble polyamide, a co-solvent polyamide, a maleic resin, an ester gum resin, an acrylic resin, a cellulose acetate butyrate resin, cellulose acetate propionate, an amorphous polyester resin, a chlorinated rubber, an ethyl vinyl acetate resin, or any combination thereof.

In some embodiments, the wetting and/or the dispersing agent is Solsperse 8000, Solsperse 8200, Solsperse 2000, Solsperse 24000, Solsperse 17000, Disperbyk 108, Disperbyk 2155, Disperbyk 9077, WA5013, 98C, BYK 111, or any combination thereof. In some embodiments, the ferromagnetic label further comprises at least one solvent, wherein the solvent comprises at least 25% of the weight of the ferromagnetic ink composition. In some embodiments, the solvent is methanol, ethanol, n-propanol, isopropyl alcohol, ethyl acetate, n-propyl acetate, isopropyl acetate, n-butyl acetate, toluene, methyl ethyl ketone, acetone, or any combination thereof. In some embodiments, the ferromagnetic ink composition comprises a ferromagnetic material/resin ratio ranging from about 2/1 to about 6/1. In some embodiments, the ferromagnetic ink composition comprises a ferromagnetic material/resin ratio ranging from about 3/1 to about 5/1. In some embodiments, all components of the ferromagnetic ink composition are indirect food additives. In some embodiments, the indirect food additives are Generally Recognized as Safe (GRAS) substances. In some embodiments, all components of the ferromagnetic ink composition have a migration of 10 milligrams (mg) per squared decimeter ($dm^2$) at most.

In some embodiments, the ferromagnetic ink composition is temporarily magnetized when exposed to a magnetic field. In some embodiments, the ferromagnetic ink composition is printable. In some embodiments, the ferromagnetic ink composition is deposited in at least one layer. In some embodiments, the release varnish facilitates release of ferromagnetic ink composition layers. In some embodiments, the adhesive layer adheres to a material. In some embodiments, the ferromagnetic label is transferred to a material upon application of heat and/or pressure. In some embodiments, the material is a plastic object and/or a metal object.

In some embodiments, the ferromagnetic ink composition is suitable for flexographic printing, gravure printing, intaglio printing, pad printing, screen printing, offset printing, or any combination thereof. In some embodiments, the plastic object is a single-use bottle, a bottle cap, a single-use coffee cup, plastic cutlery, an eating utensil, a cutting utensil, a plastic tray, a plastic container, a food packaging container, a shrink sleeve, or any combination thereof. In some embodiments, the ferromagnetic label is mechanically affixed on a surface of the plastic object. In some embodiments, the ferromagnetic label is transferred onto a plastic object using heat transfer printing or hot foil stamping. In some embodiments, the ferromagnetic label comprises a surface modification. In some embodiments, the surface modification comprises at least one microwell or a saw tooth design. In some embodiments, the microwell or the saw tooth design increase a printable surface area of the label. In some embodiments, the ferromagnetic label has a sufficient magnetic strength suitable for a magnet-induced separation process. In some embodiments, the magnet-induced separation process occurs at a Materials Recovery Facility (MRF). In some embodiments, the ferromagnetic ink composition further comprises a colored pigment.

In yet another aspect, the present disclosure provides a plastic object comprising a ferromagnetic element in the form of a film or ink deposited on the surface of the plastic object, wherein the plastic object is less than about 20 grams in weight, and wherein the film or ink is a food contact substance.

In some embodiments, the ferromagnetic element is directly printed onto the surface of the plastic object. In some embodiments, the ferromagnetic element is directly deposited on the surface of the plastic object in the presence of a magnetic field to increase a magnetic permeability of the ferromagnetic element. In some embodiments, the surface of the plastic object comprises a surface modification. In some embodiments, the surface modification comprises at least one microwell or a saw tooth design. In some embodiments, the microwell or the saw tooth design increase a printable surface area of the plastic object. In some embodiments, the ferromagnetic element is printed onto a film. In some embodiments, the film is a shrink sleeve. In some embodiments, the ferromagnetic element is directly deposited onto the film in the presence of a magnetic field to increase a magnetic permeability of the ferromagnetic element. In some embodiments, the film adheres to the surface of the plastic object upon application of heat and/or pressure. In some embodiments, the film is mechanically affixed on the surface of the plastic object. In some embodiments, the film is transferred onto the plastic object using heat transfer printing or hot foil stamping. In some embodiments, the film comprises a surface modification. In some embodiments, the surface modification comprises at least one microwell or a saw tooth design. In some embodiments, the microwell or the saw tooth design increase a printable surface area of the label. In some embodiments, the weight of the ferromagnetic element ranges from about 0.05% to 2% of the total weight of the plastic object.

In some embodiments, the plastic object is less than about 4 inches in any one dimension. In some embodiments, the ferromagnetic element comprises a ferromagnetic ink composition. In some embodiments, the ferromagnetic ink composition comprises a ferromagnetic material, a resin, and a wetting and/or a dispersing agent. In some embodiments, the ferromagnetic material comprises at least 20% of the weight of the ferromagnetic ink composition. In some embodiments, the ferromagnetic material is unadulterated iron powder, carbonyl iron, carbonyl cobalt, carbonyl nickel, iron alloy, iron oxide, low carbon steel grade, nickel, cobalt, ferritic stainless steel, atomized stainless steel, or any combination thereof. In some embodiments, the unadulterated iron powder is electrolytic iron, atomized iron, or reduced iron. In some embodiments, the iron alloy is cobalt, vanadium manganese, molybdenum, silicon, nickel. In some embodiments, the iron oxide is iron (III) oxide or iron (II, III) oxide. In some embodiments, the resin comprises at least 5% of the weight of the ferromagnetic ink composition. In some embodiments, the resin is a vinyl chloride vinyl acetate copolymer, nitrocellulose, polyurethane, a ketone aldehyde polymer, an alcohol-soluble polyamide, a co-solvent polyamide, a maleic resin, an ester gum resin, an acrylic resin, a cellulose acetate butyrate resin, cellulose acetate propionate, an amorphous polyester resin, a chlorinated rubber, an ethyl vinyl acetate resin, or any combination thereof.

In some embodiments, the wetting and/or the dispersing agent is Solsperse 8000, Solsperse 8200, Solsperse 2000, Solsperse 24000, Solsperse 17000, Disperbyk 108, Disperbyk 2155, Disperbyk 9077, WA5013, 98C, BYK 111, or any combination thereof. In some embodiments, the ferromagnetic ink composition further comprises at least one solvent, wherein the solvent comprises at least 25% of the weight of the ferromagnetic ink composition. In some embodiments, the solvent is methanol, ethanol, n-propanol, isopropyl alcohol, ethyl acetate, n-propyl acetate, isopropyl acetate, n-butyl acetate, toluene, methyl ethyl ketone, acetone, or any combination thereof. In some embodiments, the ferromagnetic ink composition comprises a ferromagnetic material/resin ratio ranging from about 2/1 to about 6/1. In some embodiments, the ferromagnetic ink composition comprises a ferromagnetic material/resin ratio ranging from about 3/1 to about 5/1. In some embodiments, all components of the ferromagnetic ink composition are indirect food additives. In some embodiments, the indirect food additives are Generally Recognized as Safe (GRAS) substances. In some embodiments, all components of the ferromagnetic ink composition have a migration of 10 milligrams (mg) per squared decimeter ($dm^2$) at most.

In some embodiments, the ferromagnetic ink composition is temporarily magnetized when exposed to a magnetic field.

In some embodiments, the ferromagnetic ink composition is printable. In some embodiments, the ferromagnetic ink composition is deposited in at least one layer. In some embodiments, the plastic object is a single-use bottle, a bottle cap, a single-use coffee cup, plastic cutlery, an eating utensil, a cutting utensil, a plastic tray, a plastic container, a food packaging container, a shrink sleeve, or any combination thereof. In some embodiments, the ferromagnetic ink composition further comprises a colored pigment.

In another aspect, the present disclosure provides a method of sorting a mixed stream of objects, comprising: a) providing a mixed stream of objects that comprises at least one non-metallic object comprising a ferromagnetic material deposited thereupon, and at least one object not comprising a ferromagnetic or magnetic component; b) contacting the stream of objects to a magnetic field; c) separating the at least one non-metallic object comprising a ferromagnetic material deposited thereupon from the mixed stream of objects based on attraction of the at least one non-metallic object comprising a ferromagnetic material deposited thereupon to the magnetic field.

In some embodiments, the non-metallic object is a plastic object. In some embodiments, the plastic object is a single-use bottle, a bottle cap, a single-use coffee cup, plastic cutlery, an eating utensil, a cutting utensil, a plastic tray, a plastic container, a food packaging container, a shrink sleeve, or any combination thereof. In some embodiments, the non-metallic object is less than about 20 grams in weight. In some embodiments, the ferromagnetic material is a ferromagnetic ink composition. In some embodiments, the ferromagnetic ink composition is directly printed onto the surface of the object. In some embodiments, the ferromagnetic ink composition is directly printed onto the surface of the object in the presence of a magnetic field to increase a magnetic permeability of the ferromagnetic element. In some embodiments, the surface of the non-metallic object comprises a surface modification. In some embodiments, the surface modification comprises at least one microwell or a saw tooth design. In some embodiments, the microwell or the saw tooth design increase a printable surface area of the object. In some embodiments, the non-metallic object comprises a label. In some embodiments, the ferromagnetic material is deposited onto a label. In some embodiments, the ferromagnetic material is directly printed onto the label in the presence of a magnetic field to increase a magnetic permeability of the ferromagnetic element. In some embodiments, the label adheres to the surface of the non-metallic object upon application of heat and/or pressure. In some embodiments, the label is mechanically affixed on the surface of the non-metallic object. In some embodiments, the label is transferred onto the non-metallic object using heat transfer printing or hot foil stamping. In some embodiments, the label comprises a surface modification.

In some embodiments, the surface modification comprises at least one microwell or a saw tooth design. In some embodiments, the microwell or the saw tooth design increase a printable surface area of the label. In some embodiments, the weight of the ferromagnetic ink composition ranges from about 0.05% to about 2% of the total weight of the object. In some embodiments, the non-metallic object is less than about 4 inches in any one dimension. In some embodiments, the ferromagnetic ink composition is a food contact substance. In some embodiments, the ferromagnetic ink composition comprises a ferromagnetic material, a resin, and a wetting and/or dispersing agent. In some embodiments, the ferromagnetic material comprises at least 20% of the weight of the magnetic ink composition. In some embodiments, the ferromagnetic material is unadulterated iron powder, carbonyl iron, carbonyl cobalt, carbonyl nickel, iron alloy, iron oxide, low carbon steel grade, nickel, cobalt, ferritic stainless steel, atomized stainless steel, or any combination thereof. In some embodiments, the unadulterated iron powder is electrolytic iron, atomized iron, or reduced iron. In some embodiments, the iron alloy is cobalt, vanadium manganese, molybdenum, silicon, nickel. In some embodiments, the iron oxide is iron (III) oxide or iron (II, III) oxide.

In some embodiments, the resin comprises at least 5% of the weight of the magnetic ink composition. In some embodiments, the resin is a vinyl chloride vinyl acetate copolymer, nitrocellulose, polyurethane, a ketone aldehyde polymer, an alcohol-soluble polyamide, a co-solvent polyamide, a maleic resin, an ester gum resin, an acrylic resin, a cellulose acetate butyrate resin, cellulose acetate propionate, an amorphous polyester resin, a chlorinated rubber, an ethyl vinyl acetate resin, or any combination thereof. In some embodiments, the wetting and/or dispersing agent is Solsperse 8000, Solsperse 8200, Solsperse 2000, Solsperse 24000, Solsperse 17000, Disperbyk 108, Disperbyk 2155, Disperbyk 9077, WA5013, 98C, BYK 111, or any combination thereof. In some embodiments, the ferromagnetic ink composition further comprises at least one solvent, wherein the solvent comprises about 25% of the weight of the magnetic ink composition. In some embodiments, the solvent is methanol, ethanol, n-propanol, isopropyl alcohol, ethyl acetate, n-propyl acetate, isopropyl acetate, n-butyl acetate, toluene, methyl ethyl ketone, acetone, or any combination thereof. In some embodiments, the ferromagnetic ink composition comprises a ferromagnetic material/resin ratio ranging from about 2/1 to about 6/1. In some embodiments, the ferromagnetic ink composition comprises a ferromagnetic material/resin ratio ranging from about 3/1 to about 5/1. In some embodiments, all components of the ferromagnetic ink composition are indirect food additives. In some embodiments, the indirect food additives are Generally Recognized as Safe (GRAS) substances. In some embodiments, all components of the ferromagnetic ink composition have a migration of 10 milligrams (mg) per squared decimeter ($dm^2$) at most.

In some embodiments, the ferromagnetic ink composition is temporarily magnetized when exposed to the magnetic field. In some embodiments, the ferromagnetic ink composition is printable. In some embodiments, the ferromagnetic ink composition further comprises a colored pigment. In some embodiments, the magnetic field has a magnetic flux density ranging from about 3,000 gauss (G) to about 12,000 G. In some embodiments, the magnetic field is produced by a commercial drum-type separator, an over-band magnetic separator, a magnetic head pulley or a combination thereof.

In yet another aspect, the present disclosure provides a composition, comprising: a plurality of non-metallic objects, and at least one ferromagnetic plastic object; wherein the at least one ferromagnetic plastic object is less than about 4 inches in any one dimension.

In some embodiments, the plurality of non-metallic objects is a plurality of paper objects. In some embodiments, the about 90% of the plurality of non-metallic objects, by weight, is a plurality of paper objects. In some embodiments, the ferromagnetic plastic object is temporarily magnetized upon exposure to a magnetic field. In some embodiments, the ferromagnetic plastic object is separated from the plurality of non-metallic objects when temporarily magnetized. In some embodiments, the magnetic field has a magnetic flux density ranging from about 3,000 gauss (G) to about 12,000 G. In some embodiments, the magnetic field is produced by a commercial drum-type separator, an overband magnetic separator, a magnetic head pulley or a combination thereof. In some embodiments, the composition further comprises at least one metal object. In some embodiments, the composition further comprises at least one glass object. In some embodiments, the ferromagnetic plastic object comprises a ferromagnetic ink composition. In some embodiments, the ferromagnetic ink composition comprises a ferromagnetic material, a resin, and at least one of a wetting agent and a dispersing agent. In some embodiments, the ferromagnetic material comprises at least 20% of the weight of the ferromagnetic ink composition. In some embodiments, the ferromagnetic material is unadulterated iron powder, carbonyl iron, carbonyl cobalt, carbonyl nickel, iron alloy, iron oxide, low carbon steel grade, nickel, cobalt, ferritic stainless steel, atomized stainless steel, or any combination thereof. In some embodiments, the unadulterated iron powder is electrolytic iron, atomized iron, or reduced iron. In some embodiments, the iron alloy is cobalt, vanadium manganese, molybdenum, silicon, nickel. In some embodiments, the iron oxide is iron (III) oxide or iron (II, III) oxide.

In some embodiments, the resin comprises at least 5% of the weight of the ferromagnetic ink composition. In some embodiments, the resin is a vinyl chloride vinyl acetate copolymer, nitrocellulose, polyurethane, a ketone aldehyde polymer, an alcohol-soluble polyamide, a co-solvent polyamide, a maleic resin, an ester gum resin, an acrylic resin, a cellulose acetate butyrate resin, cellulose acetate propionate, an amorphous polyester resin, a chlorinated rubber, an ethyl vinyl acetate resin, or any combination thereof. In some embodiments, the wetting and/or the dispersing agent is Solsperse 8000, Solsperse 8200, Solsperse 2000, Solsperse 24000, Solsperse 17000, Disperbyk 108, Disperbyk 2155, Disperbyk 9077, WA5013, 98C, BYK 111, or any combination thereof. In some embodiments, the ferromagnetic ink composition further comprises at least one solvent, wherein the solvent comprises at least 25% of the weight of the ferromagnetic ink composition. In some embodiments, the solvent is methanol, ethanol, n-propanol, isopropyl alcohol, ethyl acetate, n-propyl acetate, isopropyl acetate, n-butyl acetate, toluene, methyl ethyl ketone, acetone, or any combination thereof. In some embodiments, the ferromagnetic ink composition comprises a ferromagnetic material/resin ratio ranging from about 2/1 to about 6/1. In some embodiments, the ferromagnetic ink composition comprises a ferromagnetic material/resin ratio ranging from about 3/1 to about 5/1. In some embodiments, all components of the ferromagnetic ink composition are indirect food additives. In some embodiments, the indirect food additives are Generally Recognized as Safe (GRAS) food contact substances. In some embodiments, all components of the ferromagnetic ink composition have a migration of 10 milligrams (mg) per squared decimeter ($dm^2$) at most. In some embodiments, the ferromagnetic ink composition further comprises a colored pigment.

In another aspect, the present disclosure provides a method comprising: contacting a composition of claim 137 with a magnetic field of a predetermined intensity for a predetermined time, sufficient to separate the ferromagnetic plastic object from the composition.

In some embodiments, the magnetic field has a magnetic flux density ranging from about 3000 gauss (G) to about 12,000 G. In some embodiments, the magnetic field is produced by a commercial drum-type separator, an overband magnetic separator, a magnetic head pulley or a combination thereof.

In yet another aspect, the present disclosure provides a method of printing a ferromagnetic ink composition onto a substrate, the method comprising: a) providing the substrate, wherein at least one surface of the substrate is a plastic surface comprising a surface modification; and b) depositing the ferromagnetic ink composition on the modified surface; wherein the ferromagnetic ink composition is a food contact substance.

In some embodiments, the ferromagnetic ink composition comprises a ferromagnetic material, a resin, and at least one of a wetting agent and a dispersing agent. In some embodiments, the ferromagnetic material comprises at least 20% of the weight of the ferromagnetic ink composition. In some embodiments, the ferromagnetic material is unadulterated iron powder, carbonyl iron, carbonyl cobalt, carbonyl nickel, iron alloy, iron oxide, low carbon steel grade, nickel, cobalt, ferritic stainless steel, atomized stainless steel, or any combination thereof. In some embodiments, the unadulterated iron powder is electrolytic iron, atomized iron, or reduced iron. In some embodiments, the iron alloy is cobalt, vanadium manganese, molybdenum, silicon, nickel. In some embodiments, the iron oxide is iron (III) oxide or iron (II, III) oxide. In some embodiments, the resin comprises at least 5% of the weight of the ferromagnetic ink composition.

In some embodiments, the resin is a vinyl chloride vinyl acetate copolymer, nitrocellulose, polyurethane, a ketone aldehyde polymer, an alcohol-soluble polyamide, a co-solvent polyamide, a maleic resin, an ester gum resin, an acrylic resin, a cellulose acetate butyrate resin, cellulose acetate propionate, an amorphous polyester resin, a chlorinated rubber, an ethyl vinyl acetate resin, or any combination thereof. In some embodiments, the wetting and/or the dispersing agent is Solsperse 8000, Solsperse 8200, Solsperse 2000, Solsperse 24000, Solsperse 17000, Disperbyk 108, Disperbyk 2155, Disperbyk 9077, WA5013, 98C, BYK 111, or any combination thereof. In some embodiments, the ferromagnetic ink composition further comprises at least one solvent, wherein the solvent comprises about 25% of the weight of the ferromagnetic ink composition. In some embodiments, the solvent is methanol, ethanol, n-propanol, isopropyl alcohol, ethyl acetate, n-propyl acetate, isopropyl acetate, n-butyl acetate, toluene, methyl ethyl ketone, acetone, or any combination thereof. In some embodiments, the ferromagnetic ink composition comprises a ferromagnetic material/resin ratio ranging from about 2/1 to about 6/1. In some embodiments, the ferromagnetic ink composition comprises a ferromagnetic material/resin ratio ranging from about 3/1 to about 5/1.

In some embodiments, all components of the ferromagnetic ink composition are indirect food additives. In some embodiments, the indirect food additives are Generally Recognized as Safe (GRAS) substances. In some embodiments, all components of the ferromagnetic ink composition have a migration of 10 milligrams (mg) per squared decimeter ($dm^2$) at most. In some embodiments, the substrate is a plastic object. In some embodiments, the plastic object is a single-use bottle, a bottle cap, a single-use coffee cup, plastic cutlery, an eating utensil, a cutting utensil, a plastic tray, a plastic container, a food packaging container, a shrink sleeve, or any combination thereof. In some embodiments, the substrate is a label or a film. In some embodiments, the substrate is a shrink sleeve. In some embodiments, the surface modification is at least one microwell. In some embodiments, the surface modification is at least one a saw tooth design. In some embodiments, the surface modification increases a printable surface area of the at least one surface. In some embodiments, the ferromagnetic ink composition further comprises a colored pigment.

In another aspect, the present disclosure provides a method of fabricating a ferromagnetic plastic object, the method comprising: a) printing a ferromagnetic ink composition on a surface of a film; and b) transferring the film onto a surface of a non-ferromagnetic plastic object to produce the ferromagnetic plastic object; wherein the ferromagnetic ink composition is a food contact substance.

In some embodiments, the method comprises intaglio printing. In some embodiments, the method comprises a gravure printing. In some embodiments, the film is a synthetic resin or a plastic. In some embodiments, the film is a polyester film. In some embodiments, the film comprises a surface modification. In some embodiments, the surface modification is at least one microwell. In some embodiments, the surface modification is at least one a saw tooth design. In some embodiments, the surface modification increases a printable surface area of the surface of the film. In some embodiments, the method further comprises printing a release varnish onto the surface of the film. In some embodiments, the release varnish facilitates release of at least one ferromagnetic ink composition layer. In some embodiments, the method further comprises printing an adhesive onto the surface of the film. In some embodiments, the adhesive adheres the film onto the surface of the non-ferromagnetic plastic object. In some embodiments, the method comprises transferring the film by the application of heat and/or pressure. In some embodiments, the method comprises transferring the film by using heat transfer printing or hot foil stamping.

In some embodiments, the ferromagnetic plastic object is a single-use bottle, a bottle cap, a single-use coffee cup, plastic cutlery, an eating utensil, a cutting utensil, a plastic tray, a plastic container, a food packaging container, a shrink sleeve, or any combination thereof. In some embodiments, the ferromagnetic ink composition comprises a ferromagnetic material, a resin, and at least one of a wetting agent and a dispersing agent. In some embodiments, the ferromagnetic material comprises at least 20% of the weight of the ferromagnetic ink composition. In some embodiments, the ferromagnetic material is unadulterated iron powder, carbonyl iron, carbonyl cobalt, carbonyl nickel, iron alloy, iron oxide, low carbon steel grade, nickel, cobalt, ferritic stainless steel, atomized stainless steel, or any combination thereof. In some embodiments, the unadulterated iron powder is electrolytic iron, atomized iron, or reduced iron. In some embodiments, the iron alloy is cobalt, vanadium manganese, molybdenum, silicon, nickel.

In some embodiments, the iron oxide is iron (III) oxide or iron (II, III) oxide. In some embodiments, the resin comprises at least 5% of the weight of the ferromagnetic ink composition. In some embodiments, the resin is a vinyl chloride vinyl acetate copolymer, nitrocellulose, polyurethane, a ketone aldehyde polymer, an alcohol-soluble polyamide, a co-solvent polyamide, a maleic resin, an ester gum resin, an acrylic resin, a cellulose acetate butyrate resin, cellulose acetate propionate, an amorphous polyester resin, a chlorinated rubber, an ethyl vinyl acetate resin, or any combination thereof. In some embodiments, the wetting and/or the dispersing agent is Solsperse 8000, Solsperse 8200, Solsperse 2000, Solsperse 24000, Solsperse 17000, Disperbyk 108, Disperbyk 2155, Disperbyk 9077, WA5013, 98C, BYK 111, or any combination thereof. In some embodiments, the ferromagnetic ink composition comprises at least one solvent. In some embodiments, the solvent comprises at least 25% of the weight of the ferromagnetic ink composition. In some embodiments, the solvent is methanol, ethanol, n-propanol, isopropyl alcohol, ethyl acetate, n-propyl acetate, isopropyl acetate, n-butyl acetate, toluene, methyl ethyl ketone, acetone, or any combination thereof. In some embodiments, the ferromagnetic ink composition comprises a ferromagnetic material/resin ratio ranging from about 2/1 to about 6/1. In some embodiments, the ferromagnetic ink composition comprises a ferromagnetic material/resin ratio ranging from about 3/1 to about 5/1.

In some embodiments, all components of the ferromagnetic ink composition are indirect food additives. In some embodiments, the indirect food additives are Generally Recognized as Safe (GRAS) substances. In some embodiments, all components of the ferromagnetic ink composition have a migration of 10 milligrams (mg) per squared decimeter ($dm^2$) at most. In some embodiments, the ferromagnetic ink composition further comprises a colored pigment.

In yet another aspect, the present disclosure provides a system for fabricating a ferromagnetic plastic object, comprising: a non-ferromagnetic plastic object; a film; a ferromagnetic ink composition; a modular marker transfer station; and a computing device comprising a processor operatively coupled to the modular marker transfer station, and a non-transitory computer readable storage medium with a computer program including instructions executable by the processor causing the processor to: i) direct the modular marker transfer station, wherein the ferromagnetic ink composition is a food contact substance.

In some embodiments, the ferromagnetic plastic object is a single-use bottle, a bottle cap, a single-use coffee cup, plastic cutlery, an eating utensil, a cutting utensil, a plastic tray, a plastic container, a food packaging container, a shrink sleeve, or any combination thereof. In some embodiments, the non-ferromagnetic plastic object is a single-use bottle, a bottle cap, a single-use coffee cup, plastic cutlery, an eating utensil, a cutting utensil, a plastic tray, a plastic container, a food packaging container, a shrink sleeve, or any combination thereof. In some embodiments, the film is a synthetic resin or a plastic. In some embodiments, the film is a polyester film. In some embodiments, the film comprises a surface modification. In some embodiments, the surface modification is at least one microwell. In some embodiments, the surface modification is at least one a saw tooth design. In some embodiments, the surface modification increases a printable surface area of the surface of the film. In some embodiments, the film comprises a release varnish. In some embodiments, the release varnish facilitates release of at least one ferromagnetic ink composition layer. In some embodiments, the film comprises an adhesive layer. In some embodiments, the adhesive layer adheres the film onto the surface of the non-ferromagnetic plastic object.

In some embodiments, the ferromagnetic ink composition comprises a ferromagnetic material, a resin, and at least one of a wetting agent and a dispersing agent. In some embodiments, the ferromagnetic material comprises at least 20% of the weight of the ferromagnetic ink composition. In some embodiments, the ferromagnetic material is unadulterated iron powder, carbonyl iron, carbonyl cobalt, carbonyl nickel, iron alloy, iron oxide, low carbon steel grade, nickel, cobalt, ferritic stainless steel, atomized stainless steel, or any combination thereof. In some embodiments, the unadulterated iron powder is electrolytic iron, atomized iron, or reduced iron. In some embodiments, the iron alloy is cobalt, vanadium manganese, molybdenum, silicon, nickel. In some embodiments, the iron oxide is iron (III) oxide or iron (II, III) oxide. In some embodiments, the resin comprises at least 5% of the weight of the ferromagnetic ink composition.

In some embodiments, the resin is a vinyl chloride vinyl acetate copolymer, nitrocellulose, polyurethane, a ketone aldehyde polymer, an alcohol-soluble polyamide, a co-solvent polyamide, a maleic resin, an ester gum resin, an acrylic resin, a cellulose acetate butyrate resin, cellulose acetate propionate, an amorphous polyester resin, a chlorinated rubber, an ethyl vinyl acetate resin, or any combination thereof. In some embodiments, the wetting and/or the dispersing agent is Solsperse 8000, Solsperse 8200, Solsperse 2000, Solsperse 24000, Solsperse 17000, Disperbyk 108, Disperbyk 2155, Disperbyk 9077, WA5013, 98C, BYK 111, or any combination thereof. In some embodiments, the ferromagnetic ink composition comprises at least one solvent. In some embodiments, the solvent comprises at least 25% of the weight of the ferromagnetic ink composition. In some embodiments, the solvent is methanol, ethanol, n-propanol, isopropyl alcohol, ethyl acetate, n-propyl acetate, isopropyl acetate, n-butyl acetate, toluene, methyl ethyl ketone, acetone, or any combination thereof.

In some embodiments, the ferromagnetic ink composition comprises a ferromagnetic material/resin ratio ranging from about 2/1 to about 6/1. ferromagnetic ink composition comprises a ferromagnetic material/resin ratio ranging from about 3/1 to about 5/1. In some embodiments, all components of the ferromagnetic ink composition are indirect food additives. In some embodiments, the indirect food additives are Generally Recognized as Safe (GRAS) substances. In some embodiments, the ferromagnetic ink composition has a migration of 10 milligrams (mg) per squared decimeter ($dm^2$) at most. In some embodiments, the modular marker transfer station comprises a stamping block attachment. In some embodiments, the modular marker transfer station comprises a hot foil stamping device. In some embodiments, the modular marker transfer station comprises a sensor. In some embodiments, the sensor is a hologram sensor or a black mark sensor. In some embodiments, the modular marker transfer station comprises a numerator attachment for serial numbering. In some embodiments, the system further comprises an automated part-loading system and/or a pneumatic actuation system. In some embodiments, the ferromagnetic ink composition further comprises a colored pigment.

INCORPORATION BY REFERENCE

All publications, patents, patent applications, and NCBI accession numbers mentioned in this specification are herein incorporated by reference to the same extent as if each individual publication, patent, or patent application was specifically and individually indicated to be incorporated by reference, and as if set forth in their entireties. In the event of a conflict between a term as used herein and the term as defined in the incorporated reference, the definition of this disclosure controls.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

FIG. 2A illustrates a direct coating of the surface of the object with the ferromagnetic ink. FIG. 2B illustrates microwells on the surface of the object coated with the ferromagnetic ink. FIG. 2C illustrates a saw tooth design on the surface of the object coated with the ferromagnetic ink. FIG. 2D illustrates an embossed design coated with the ferromagnetic ink.

FIG. 4A illustrates an example of a heat transfer foil. FIG. 4B illustrates an example of a plastic object on which a ferromagnetic marker is to be printed on it.

DETAILED DESCRIPTION

Figure 1:
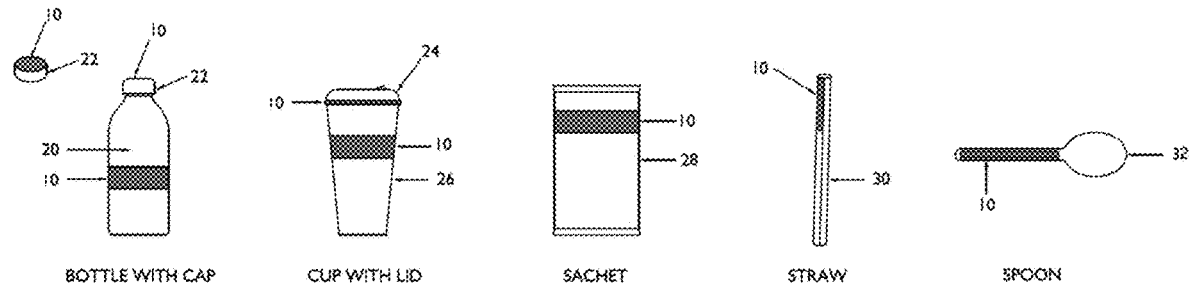
FIG. 1 illustrates examples of objects comprising the ferromagnetic ink.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The terminology used herein is for the purpose of describing particular cases only and is not intended to be limiting. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

The term "about" or "approximately" refers to an amount that is near the stated amount by about 99%, 95%, 80%, 50%, 10%, 5%, or 1%, including increments therein. For example, "about" or "approximately" can mean a range including the particular value and ranging from 10% below that particular value and spanning to 10% above that particular value.

The term "recyclate," as used herein, generally refers to a raw material that is sent to, and processed in a waste recycling plant or materials recovery facility (MRF) which can be used to form new products. The recyclates can be collected via various methods and delivered to a facility where it undergoes re-manufacturing so that it can be used in the production of new materials or products. The recyclates may be, for example, a plastic object, a non-metallic object, a metallic object, a single-use bottle, a bottle cap, a single-use coffee cup, plastic cutlery, an eating utensil, a cutting utensil, a plastic tray, a plastic container, a food packaging container, a shrink sleeve, or any combinations thereof.

The term "small object," as used herein, generally refers to an object measuring about 4 inches in any one dimension.

The term "ferromagnetic ink," as used herein, generally refers to a magnetizable ink composition.

The term "ferromagnetic marker," as used herein, generally refers to and is used interchangeably with the term "ferromagnetic label."

The term "ferromagnetic element," as used herein, generally refers to a ferromagnetic ink and can include, for example, a self-adhesive label. In other cases, the ferromagnetic element can include a ferromagnetic ink, a release varnish, and an adhesive varnish. In yet another case, the ferromagnetic element can include a ferromagnetic ink that is directly printed onto an object.

The term "unadulterated iron powder," as used herein, generally refers to a high purity iron powder comprising at least 99.5% iron.

The term "indirect food additive," as used herein, generally refers to a substance or material that may come into contact with food as part of packaging or processing equipment, but are not intended to be added directly to food.

The term "food contact substance," as used herein, generally refers to a substance or material that is intended for use as a component in manufacturing, packing, packaging, transporting, or holding food wherein such use is not intended to have any technical effect in such food. For example, the food contact substance is a plastic object. Non-limiting, additional examples of a food contact substance include a plastic bottle, a bottle cap, a single-use coffee cup, plastic cutlery, an eating utensil, a cutting utensil, a plastic tray, a plastic container, a food packaging container, and a shrink sleeve.

Waste Sorting

During the course of a lifetime, an individual may generate up to 600 times their weight in waste materials. Consequently, there has been an increasing focus on reducing, reusing, and recycling since the 1970s. Recycling is a key component of modern day waste reduction. A number of different systems have been implemented to collect recyclates from the general waste stream. Once the recyclates are collected and delivered to a central collection facility, such as a materials recovery facility (MRF), the different types of collected materials must undergo sorting. Automated machinery such as disk screens and air classifiers separate the recyclates such as plastics and paper by weight. In addition, commercial magnetic separators separate out ferrous metals, such as iron, steel, and tin cans.

Non-durable plastic goods that are discarded in waste streams often need to be retrieved and sorted before recycling. While advances in optical sensing have automated the process of sorting plastic objects into respective resin-type, the process of retrieval is often manual and inefficient. The problem is especially acute for small-format and/or lightweight plastic packaging items. Small plastic items (i.e., less than about 4 inches in any dimension) may be unable to be sorted out from a pool of recyclates and/or from a waste stream, and consequently, may be unable to be recycled (i.e., may be placed in a landfill) due to their size. Furthermore, unsorted small plastic items can contaminate glass or other sorted material waste streams. Currently, there does not exist a method to retrieve plastic objects in the waste stream through the process of magnetic separation.

Non-durable plastic goods such as packaging often have graphics or information displayed on them. This is done by either printing on them either directly or by means of a pre-printed label. Such designs or prints often have functional uses. A common example is a barcode pre-printed label affixed on a plastic object which is used to identify the object in a warehouse or retail store. However, no labels or prints currently exist to enable mechanical separation of such plastic objects under a magnetic field.

Recognized herein are various issues with previously described methods of waste and/or recyclate sorting. Such methods may be limited by an inability to sort and/or recycle small objects such as non-metallic objects, an inability identify small objects from a waste stream (e.g., by use of a label or a graphic design), and an inability to retrieve small objects such as non-metallic objects through a magnetic separation process. The present disclosure addresses these issues.

Ferromagnetic Ink Compositions

In an aspect, the present disclosure provides a ferromagnetic ink composition. In some embodiments, the ferromagnetic ink composition comprises a ferromagnetic material, a resin, and at least one of a wetting agent and a dispersing agent.

In some embodiments, the ferromagnetic ink composition is safe for food contact. In some embodiments, the ferromagnetic ink composition is a food contact substance. In some embodiments, all elements of the ferromagnetic ink composition are FDA-approved food additives as listed in Title 21 of the Code of Federal Regulations (see sections 175-178). In some embodiments, all elements of the ferromagnetic ink composition are selected from the list of generally recognized as safe (GRAS) substances, as listed by the Food and Drug Safety Administration (FDA) in Title 21 of the Code of Federal Regulations (CFR) (see sections 182, 184, 186). In some embodiments, the ferromagnetic ink composition is safe to be in contact with foodstuffs. In some embodiments, the ferromagnetic ink composition is a "generally recognized as safe" (GRAS) composition. In some embodiments, the ferromagnetic ink composition is capable of direct or indirect contact with foodstuffs.

Figures 2A, 2B, 2C, 2D:
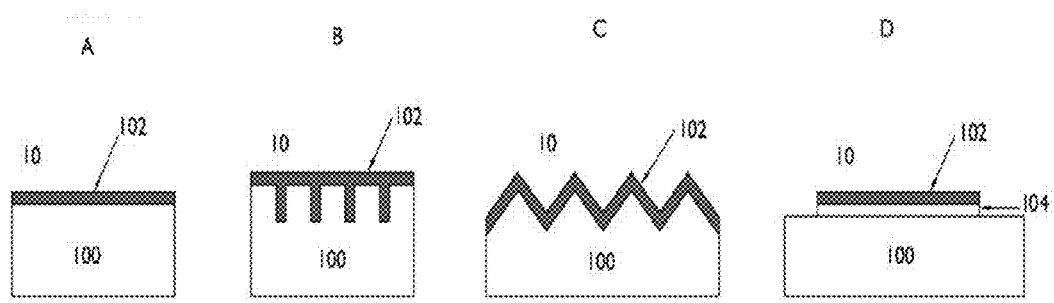
FIGS. 2A, 2B, 2C, and 2D illustrate examples of different types of surface modifications.

The present disclosure describes the chemical composition of a ferromagnetic ink. Referring to FIG. 2, the ferromagnetic ink 102 can be printed on the surface of a plastic object 100 directly or on labels 104. FIG. 2A illustrates a direct coating of the surface of the plastic object 100 with a ferromagnetic label 10 comprising the ferromagnetic ink 102. FIG. 2B illustrates microwells on the surface of the plastic object 100 with a ferromagnetic label 10 subsequently coated with the ferromagnetic ink 102. FIG. 2C illustrates a saw tooth design on the surface of the plastic object 100 coated with a ferromagnetic label 10 comprising the ferromagnetic ink 102. FIG. 2D illustrates a label 104 placed on the surface of the plastic object 100. The label 104 is shown to be coated with the ferromagnetic ink 102; thus, forming a ferromagnetic label 10. In some embodiments, the labels 104 can be subsequently affixed on a plastic object and/or a plastic film. In some embodiments, the ferromagnetic markers are transferred on to the on the surface of the plastic object 100 using heat transfer printing or hot foil stamping.

The present disclosure relates the use of soft ferromagnetic pigments in inks, which imparts temporary magnetic behavior under the influence of a magnetic field. A range of suitable solid phase soft-magnetic, low coercivity materials can be used to impart such ferromagnetic behavior. Non-limiting examples include unadulterated iron powder (includes electrolytic iron, atomized iron, reduced iron) carbonyl iron, carbonyl cobalt, carbonyl nickel, iron alloys (incl. cobalt, vanadium manganese, molybdenum, silicon, nickel), iron oxides (incl. Fe2O3, Fe3O4), low carbon steel grades, nickel, cobalt, ferritic stainless steel and atomized stainless steel. In order to be used as a pigment in the formulation of a ferromagnetic ink, such ferromagnetic pigment would be preferably used in the form of dry powder with sizes below 100 micrometers (μm) and most suitably below 10 micrometers (μm).

In some embodiments, the ferromagnetic pigment sizes preferably range from 0.5-5 micrometers (μm). In some embodiments, the ferromagnetic pigment size ranges from about 0.1 μm to about 10 μm. In some embodiments, the ferromagnetic pigment size ranges from about 0.1 μm. In some embodiments, the ferromagnetic pigment size ranges from about 10 μm. In some embodiments, the ferromagnetic pigment size ranges from about 0.1 μm to about 0.5 μm, about 0.1 μm to about 0.6 μm, about 0.1 μm to about 0.7 μm, about 0.1 μm to about 0.8 μm, about 0.1 μm to about 0.9 μm, about 0.1 μm to about 1 μm, about 0.1 μm to about 2 μm, about 0.1 μm to about 3 μm, about 0.1 μm to about 4 μm, about 0.1 μm to about 5 μm, about 0.1 μm to about 10 μm, about 0.5 μm to about 0.6 μm, about 0.5 μm to about 0.7 μm, about 0.5 μm to about 0.8 μm, about 0.5 μm to about 0.9 μm, about 0.5 μm to about 1 μm, about 0.5 μm to about 2 μm, about 0.5 μm to about 3 μm, about 0.5 μm to about 4 μm, about 0.5 μm to about 5 μm, about 0.5 μm to about 10 μm, about 0.6 μm to about 0.7 μm, about 0.6 μm to about 0.8 μm, about 0.6 μm to about 0.9 μm, about 0.6 μm to about 1 μm, about 0.6 μm to about 2 μm, about 0.6 μm to about 3 μm, about 0.6 μm to about 4 μm, about 0.6 μm to about 5 μm, about 0.6 μm to about 10 μm, about 0.7 μm to about 0.8 μm, about 0.7 μm to about 0.9 μm, about 0.7 μm to about 1 μm, about 0.7 μm to about 2 μm, about 0.7 μm to about 3 μm, about 0.7 μm to about 4 μm, about 0.7 μm to about 5 μm, about 0.7 μm to about 10 μm, about 0.8 μm to about 0.9 μm, about 0.8 μm to about 1 μm, about 0.8 μm to about 2 μm, about 0.8 μm to about 3 μm, about 0.8 μm to about 4 μm, about 0.8 μm to about 5 μm, about 0.8 μm to about 10 μm, about 0.9 μm to about 1 μm, about 0.9 μm to about 2 μm, about 0.9 μm to about 3 μm, about 0.9 μm to about 4 μm, about 0.9 μm to about 5 μm, about 0.9 μm to about 10 μm, about 1 μm to about 2 μm, about 1 μm to about 3 μm, about 1 μm to about 4 μm, about 1 μm to about 5 μm, about 1 μm to about 10 μm, about 2 μm to about 3 μm, about 2 μm to about 4 μm, about 2 μm to about 5 μm, about 2 μm to about 10 μm, about 3 μm to about 4 μm, about 3 μm to about 5 μm, about 3 μm to about 10 μm, about 4 μm to about 5 μm, about 4 μm to about 10 μm, or about 5 μm to about 10 μm. In some embodiments, the ferromagnetic pigment size ranges from about 0.1 μm, about 0.5 μm, about 0.6 μm, about 0.7 μm, about 0.8 μm, about 0.9 μm, about 1 μm, about 2 μm, about 3 μm, about 4 μm, about 5 μm, or about 10 μm.

In some embodiments, the ferromagnetic material comprises at least 1% of the weight of the ferromagnetic ink composition. In some embodiments, the ferromagnetic material comprises at least 5% of the weight of the ferromagnetic ink composition. In some embodiments, the ferromagnetic material comprises at least 10% of the weight of the ferromagnetic ink composition. In some embodiments, the ferromagnetic material comprises at least 20% of the weight of the ferromagnetic ink composition. In some embodiments, the ferromagnetic material comprises at least 25% of the weight of the ferromagnetic ink composition. In some embodiments, the ferromagnetic material comprises about 30% of the weight of the ferromagnetic ink composition. In some embodiments, the ferromagnetic material comprises at least 40% of the weight of the ferromagnetic ink composition. In some embodiments, the ferromagnetic material comprises about 1% to about 90% of the weight of the ferromagnetic ink composition. In some embodiments, the ferromagnetic material comprises at least about 1% of the weight of the ferromagnetic ink composition. In some embodiments, the ferromagnetic material comprises at most about 90% of the weight of the ferromagnetic ink composition. In some embodiments, the ferromagnetic material comprises about 1% to about 10%, about 1% to about 20%, about 1% to about 30%, about 1% to about 40%, about 1% to about 50%, about 1% to about 60%, about 1% to about 70%, about 1% to about 80%, about 1% to about 90%, about 10% to about 20%, about 10% to about 30%, about 10% to about 40%, about 10% to about 50%, about 10% to about 60%, about 10% to about 70%, about 10% to about 80%, about 10% to about 90%, about 20% to about 30%, about 20% to about 40%, about 20% to about 50%, about 20% to about 60%, about 20% to about 70%, about 20% to about 80%, about 20% to about 90%, about 30% to about 40%, about 30% to about 50%, about 30% to about 60%, about 30% to about 70%, about 30% to about 80%, about 30% to about 90%, about 40% to about 50%, about 40% to about 60%, about 40% to about 70%, about 40% to about 80%, about 40% to about 90%, about 50% to about 60%, about 50% to about 70%, about 50% to about 80%, about 50% to about 90%, about 60% to about 70%, about 60% to about 80%, about 60% to about 90%, about 70% to about 80%, about 70% to about 90%, or about 80% to about 90% of the weight of the ferromagnetic ink composition. In some embodiments, the ferromagnetic material comprises about 1%, about 10%, about 20%, about 30%, about 40%, about 50%, about 60%, about 70%, about 80%, or about 90% of the weight of the ferromagnetic ink composition.

In some embodiments, the ferromagnetic material is unadulterated iron powder, carbonyl iron, carbonyl cobalt, carbonyl nickel, iron alloy, iron oxide, low carbon steel grade, nickel, cobalt, ferritic stainless steel, atomized stainless steel, or any combination thereof. In some embodiments, the unadulterated iron powder is electrolytic iron, atomized iron, or reduced iron. In some embodiments, the iron alloy is cobalt, vanadium manganese, molybdenum, silicon, nickel. In some embodiments, the iron oxide is iron (III) oxide or iron (II, III) oxide. In some embodiments, the ferromagnetic material is a soft ferromagnetic material with small particle sizes ranging from 0.5-5 micrometers (μm).

In some embodiments, the resin comprises about 5% of the weight of the ferromagnetic ink composition. In some embodiments, the resin comprises about 10% of the weight of the ferromagnetic ink composition. In some embodiments, the resin comprises about 0.5% to about 70%. In some embodiments, the resin comprises at least about 0.5% of the weight of the ferromagnetic ink composition. In some embodiments, the resin comprises at most about 70% of the weight of the ferromagnetic ink composition. In some embodiments, the resin comprises about 0.5% to about 1%, about 0.5% to about 5%, about 0.5% to about 10%, about 0.5% to about 15%, about 0.5% to about 20%, about 0.5% to about 25%, about 0.5% to about 30%, about 0.5% to about 40%, about 0.5% to about 50%, about 0.5% to about 60%, about 0.5% to about 70%, about 1% to about 5%, about 1% to about 10%, about 1% to about 15%, about 1% to about 20%, about 1% to about 25%, about 1% to about 30%, about 1% to about 40%, about 1% to about 50%, about 1% to about 60%, about 1% to about 70%, about 5% to about 10%, about 5% to about 15%, about 5% to about 20%, about 5% to about 25%, about 5% to about 30%, about 5% to about 40%, about 5% to about 50%, about 5% to about 60%, about 5% to about 70%, about 10% to about 15%, about 10% to about 20%, about 10% to about 25%, about 10% to about 30%, about 10% to about 40%, about 10% to about 50%, about 10% to about 60%, about 10% to about 70%, about 15% to about 20%, about 15% to about 25%, about 15% to about 30%, about 15% to about 40%, about 15% to about 50%, about 15% to about 60%, about 15% to about 70%, about 20% to about 25%, about 20% to about 30%, about 20% to about 40%, about 20% to about 50%, about 20% to about 60%, about 20% to about 70%, about 25% to about 30%, about 25% to about 40%, about 25% to about 50%, about 25% to about 60%, about 25% to about 70%, about 30% to about 40%, about 30% to about 50%, about 30% to about 60%, about 30% to about 70%, about 40% to about 50%, about 40% to about 60%, about 40% to about 70%, about 50% to about 60%, about 50% to about 70%, or about 60% to about 70% of the weight of the ferromagnetic ink composition. In some embodiments, the resin comprises about 0.5%, about 1%, about 5%, about 10%, about 15%, about 20%, about 25%, about 30%, about 40%, about 50%, about 60%, or about 70% of the weight of the ferromagnetic ink composition.

In some embodiments, the resin is a vinyl chloride vinyl acetate copolymer, nitrocellulose, polyurethane, a ketone aldehyde polymer, an alcohol-soluble polyamide, a co-solvent polyamide, a maleic resin, an ester gum resin, an acrylic resin, a cellulose acetate butyrate resin, cellulose acetate propionate, an amorphous polyester resin, a chlorinated rubber, an ethyl vinyl acetate resin, or any combination thereof. In some embodiments, the resin is a mixture of vinyl chloride, vinyl acetate co-polymers, and acrylic resins. In some embodiments, the resin is a mixture of vinyl acetate co-polymers and acrylic resins. In some embodiments, the resin is a mixture of vinyl chloride and acrylic resins. In some embodiments, the resin is a mixture of vinyl chloride and vinyl acetate co-polymers.

In some embodiments, a wetting and/or a dispersing agent solves potential printing issues and/or reduced magnetic strength overtime caused by a heavy thixotropic rheology of the ferromagnetic ink and/or a soft settling of ferromagnetic pigments upon aging of the ferromagnetic ink. In some embodiments, the ferromagnetic ink comprises an anti-settling agent. In some embodiments, the wetting, dispersing, and/or anti-settling agent comprises a carboxyl functionality. In some embodiments, the wetting, dispersing, and/or anti-settling agent comprises a hydroxyl functionality. In some embodiments, the wetting, dispersing, and/or anti-settling agent comprises an amphoteric functionality. In some embodiments, the wetting, dispersing, and/or anti-settling agent is amine-based. In some embodiments, the wetting and/or the dispersing agent is Solsperse 8000, Solsperse 8200, Solsperse 2000, Solsperse 24000, Solsperse 17000, Disperbyk 108, Disperbyk 2155, Disperbyk 9077, WA5013, 98C, BYK 111, or any combination thereof.

In some embodiments, the ferromagnetic ink composition comprises a wetting and/or dispersing agent. In some embodiments, the wetting and/or dispersing agent comprises about 1% of the weight of the ferromagnetic ink composition. In some embodiments, the wetting and/or dispersing agent comprises about 2% of the weight of the ferromagnetic ink composition. In some embodiments, the wetting and/or dispersing agent comprises about 3% of the weight of the ferromagnetic ink composition. In some embodiments, the wetting and/or dispersing agent comprises about 4% of the weight of the ferromagnetic ink composition. In some embodiments, the wetting and/or dispersing agent comprises about 5% of the weight of the ferromagnetic ink composition. In some embodiments, the wetting and/or dispersing agent comprises about 0.5% to about 50% of the weight of the ferromagnetic ink composition. In some embodiments, the wetting and/or dispersing agent comprises at least about 0.5% of the weight of the ferromagnetic ink composition. In some embodiments, the wetting and/or dispersing agent comprises at most about 50% of the weight of the ferromagnetic ink composition. In some embodiments, the wetting and/or dispersing agent comprises about 0.5% to about 1%, about 0.5% to about 2%, about 0.5% to about 3%, about 0.5% to about 4%, about 0.5% to about 5%, about 0.5% to about 10%, about 0.5% to about 15%, about 0.5% to about 20%, about 0.5% to about 30%, about 0.5% to about 40%, about 0.5% to about 50%, about 1% to about 2%, about 1% to about 3%, about 1% to about 4%, about 1% to about 5%, about 1% to about 10%, about 1% to about 15%, about 1% to about 20%, about 1% to about 30%, about 1% to about 40%, about 1% to about 50%, about 2% to about 3%, about 2% to about 4%, about 2% to about 5%, about 2% to about 10%, about 2% to about 15%, about 2% to about 20%, about 2% to about 30%, about 2% to about 40%, about 2% to about 50%, about 3% to about 4%, about 3% to about 5%, about 3% to about 10%, about 3% to about 15%, about 3% to about 20%, about 3% to about 30%, about 3% to about 40%, about 3% to about 50%, about 4% to about 5%, about 4% to about 10%, about 4% to about 15%, about 4% to about 20%, about 4% to about 30%, about 4% to about 40%, about 4% to about 50%, about 5% to about 10%, about 5% to about 15%, about 5% to about 20%, about 5% to about 30%, about 5% to about 40%, about 5% to about 50%, about 10% to about 15%, about 10% to about 20%, about 10% to about 30%, about 10% to about 40%, about 10% to about 50%, about 15% to about 20%, about 15% to about 30%, about 15% to about 40%, about 15% to about 50%, about 20% to about 30%, about 20% to about 40%, about 20% to about 50%, about 30% to about 40%, about 30% to about 50%, or about 40% to about 50% of the weight of the ferromagnetic ink composition. In some embodiments, the wetting and/or dispersing agent comprises about 0.5%, about 1%, about 2%, about 3%, about 4%, about 5%, about 10%, about 15%, about 20%, about 30%, about 40%, or about 50% of the weight of the ferromagnetic ink composition.

In some embodiments, the ferromagnetic ink composition further comprises at least one solvent. In some embodiments, at least one solvent is safe for food contact. In some embodiments, at least one solvent is a food contact substance. In some embodiments, the solvent comprises at least 25% of the weight of the ferromagnetic ink composition. In some embodiments, the solvent comprises about 50% of the weight of the ferromagnetic ink composition. In some embodiments, the solvent comprises about 55% of the weight of the ferromagnetic ink composition. In some embodiments, the solvent comprises about 56% of the weight of the ferromagnetic ink composition. In some embodiments, the solvent comprises about 57% of the weight of the ferromagnetic ink composition. In some embodiments, the solvent comprises about 58% of the weight of the ferromagnetic ink composition. In some embodiments, the solvent comprises about 59% of the weight of the ferromagnetic ink composition. In some embodiments, the solvent comprises about 60% of the weight of the ferromagnetic ink composition. In some embodiments, the solvent comprises about 5% to about 90% of the weight of the ferromagnetic ink composition. In some embodiments, the solvent comprises at least about 5% of the weight of the ferromagnetic ink composition. In some embodiments, the solvent comprises at most about 90%. In some embodiments, the solvent comprises about 5% to about 10%, about 5% to about 20%, about 5% to about 30%, about 5% to about 40%, about 5% to about 50%, about 5% to about 55%, about 5% to about 60%, about 5% to about 65%, about 5% to about 70%, about 5% to about 80%, about 5% to about 90%, about 10% to about 20%, about 10% to about 30%, about 10% to about 40%, about 10% to about 50%, about 10% to about 55%, about 10% to about 60%, about 10% to about 65%, about 10% to about 70%, about 10% to about 80%, about 10% to about 90%, about 20% to about 30%, about 20% to about 40%, about 20% to about 50%, about 20% to about 55%, about 20% to about 60%, about 20% to about 65%, about 20% to about 70%, about 20% to about 80%, about 20% to about 90%, about 30% to about 40%, about 30% to about 50%, about 30% to about 55%, about 30% to about 60%, about 30% to about 65%, about 30% to about 70%, about 30% to about 80%, about 30% to about 90%, about 40% to about 50%, about 40% to about 55%, about 40% to about 60%, about 40% to about 65%, about 40% to about 70%, about 40% to about 80%, about 40% to about 90%, about 50% to about 55%, about 50% to about 60%, about 50% to about 65%, about 50% to about 70%, about 50% to about 80%, about 50% to about 90%, about 55% to about 60%, about 55% to about 65%, about 55% to about 70%, about 55% to about 80%, about 55% to about 90%, about 60% to about 65%, about 60% to about 70%, about 60% to about 80%, about 60% to about 90%, about 65% to about 70%, about 65% to about 80%, about 65% to about 90%, about 70% to about 80%, about 70% to about 90%, or about 80% to about 90% of the weight of the ferromagnetic ink composition. In some embodiments, the solvent comprises about 5%, about 10%, about 20%, about 30%, about 40%, about 50%, about 55%, about 60%, about 65%, about 70%, about 80%, or about 90% of the weight of the ferromagnetic ink composition.

In some embodiments, the solvent is methanol, ethanol, n-propanol, isopropyl alcohol, ethyl acetate, n-propyl acetate, isopropyl acetate, n-butyl acetate, toluene, methyl ethyl ketone, acetone, or any combination thereof.

In some embodiments, the ferromagnetic ink composition further comprises a ferromagnetic material/resin ratio ranging from about 2/1 to about 6/1. In some embodiments, the ferromagnetic ink composition further comprises a ferromagnetic material/resin ratio ranging from about 3/1 to about 5/1. In some embodiments, the ferromagnetic material and resin has a printed coating weight of about 10 grams per square meter. In some embodiments, the ferromagnetic material and resin has a printed coating weight of about 0.5 grams per square meters to about 15 grams per square meters. In some embodiments, the ferromagnetic material and resin has a printed coating weight of about 0.5 grams per square meters. In some embodiments, the ferromagnetic material and resin has a printed coating weight of about 15 grams per square meters. In some embodiments, the ferromagnetic material and resin has a printed coating weight of about 0.5 grams per square meters to about 1 gram per square meter, about 0.5 grams per square meters to about 2 grams per square meters, about 0.5 grams per square meters to about 3 grams per square meters, about 0.5 grams per square meters to about 4 grams per square meters, about 0.5 grams per square meters to about 5 grams per square meters, about 0.5 grams per square meters to about 6 grams per square meters, about 0.5 grams per square meters to about 7 grams per square meters, about 0.5 grams per square meters to about 8 grams per square meters, about 0.5 grams per square meters to about 9 grams per square meters, about 0.5 grams per square meters to about 10 grams per square meters, about 0.5 grams per square meters to about 15 grams per square meters, about 1 gram per square meter to about 2 grams per square meters, about 1 gram per square meter to about 3 grams per square meters, about 1 gram per square meter to about 4 grams per square meters, about 1 gram per square meter to about 5 grams per square meters, about 1 gram per square meter to about 6 grams per square meters, about 1 gram per square meter to about 7 grams per square meters, about 1 gram per square meter to about 8 grams per square meters, about 1 gram per square meter to about 9 grams per square meters, about 1 gram per square meter to about 10 grams per square meters, about 1 gram per square meter to about 15 grams per square meters, about 2 grams per square meters to about 3 grams per square meters, about 2 grams per square meters to about 4 grams per square meters, about 2 grams per square meters to about 5 grams per square meters, about 2 grams per square meters to about 6 grams per square meters, about 2 grams per square meters to about 7 grams per square meters, about 2 grams per square meters to about 8 grams per square meters, about 2 grams per square meters to about 9 grams per square meters, about 2 grams per square meters to about 10 grams per square meters, about 2 grams per square meters to about 15 grams per square meters, about 3 grams per square meters to about 4 grams per square meters, about 3 grams per square meters to about 5 grams per square meters, about 3 grams per square meters to about 6 grams per square meters, about 3 grams per square meters to about 7 grams per square meters, about 3 grams per square meters to about 8 grams per square meters, about 3 grams per square meters to about 9 grams per square meters, about 3 grams per square meters to about 10 grams per square meters, about 3 grams per square meters to about 15 grams per square meters, about 4 grams per square meters to about 5 grams per square meters, about 4 grams per square meters to about 6 grams per square meters, about 4 grams per square meters to about 7 grams per square meters, about 4 grams per square meters to about 8 grams per square meters, about 4 grams per square meters to about 9 grams per square meters, about 4 grams per square meters to about 10 grams per square meters, about 4 grams per square meters to about 15 grams per square meters, about 5 grams per square meters to about 6 grams per square meters, about 5 grams per square meters to about 7 grams per square meters, about 5 grams per square meters to about 8 grams per square meters, about 5 grams per square meters to about 9 grams per square meters, about 5 grams per square meters to about 10 grams per square meters, about 5 grams per square meters to about 15 grams per square meters, about 6 grams per square meters to about 7 grams per square meters, about 6 grams per square meters to about 8 grams per square meters, about 6 grams per square meters to about 9 grams per square meters, about 6 grams per square meters to about 10 grams per square meters, about 6 grams per square meters to about 15 grams per square meters, about 7 grams per square meters to about 8 grams per square meters, about 7 grams per square meters to about 9 grams per square meters, about 7 grams per square meters to about 10 grams per square meters, about 7 grams per square meters to about 15 grams per square meters, about 8 grams per square meters to about 9 grams per square meters, about 8 grams per square meters to about 10 grams per square meters, about 8 grams per square meters to about 15 grams per square meters, about 9 grams per square meters to about 10 grams per square meters, about 9 grams per square meters to about 15 grams per square meters, or about 10 grams per square meters to about 15 grams per square meters. In some embodiments, the ferromagnetic material and resin has a printed coating weight of about 0.5 grams per square meters, about 1 gram per square meter, about 2 grams per square meters, about 3 grams per square meters, about 4 grams per square meters, about 5 grams per square meters, about 6 grams per square meters, about 7 grams per square meters, about 8 grams per square meters, about 9 grams per square meters, about 10 grams per square meters, or about 15 grams per square meters.

In some embodiments, the ferromagnetic ink comprises soft ferromagnetic particles. In some embodiments, the use of soft ferromagnetic particles allows the ferromagnetic ink to not retain their magnetization in the absence of an applied magnetic field. In some embodiments, the ferromagnetic ink comprises soft ferromagnetic particles. In some embodiments, the use of soft ferromagnetic particles allows the ferromagnetic ink to not retain their magnetization in the absence of an applied magnetic field. In some embodiments, the soft ferromagnetic particles spontaneously demagnetize in the absence of a magnetic field. In some embodiments, the soft ferromagnetic particles spontaneously magnetize in the presence of a magnetic field. In some embodiments, the ferromagnetic ink spontaneously demagnetizes in the absence of a magnetic field. In some embodiments, the ferromagnetic ink spontaneously magnetizes in the presence of a magnetic field.

In some embodiments, the ferromagnetic ink is characterized by a low coercivity (denoted as $H_C$). In some embodiments, the ferromagnetic ink retains its magnetization, after exposure and removal of a magnetic field, for an amount of time that is dependent on coercivity. In some embodiments, a ferromagnetic ink with a low coercivity has a quicker demagnetization than a ferromagnetic ink with a high coercivity. In some embodiments, the ferromagnetic ink is characterized by a low coercivity ranging from about 0.8 8 A/m to about 8 A/m. In some embodiments, the ferromagnetic ink is characterized by a low coercivity ranging from about 0.5 A/m to about 10 A/m. In some embodiments, the ferromagnetic ink is characterized by a low coercivity ranging from about 0.5 A/m. In some embodiments, the ferromagnetic ink is characterized by a low coercivity ranging from about 10 A/m. In some embodiments, the ferromagnetic ink is characterized by a low coercivity ranging from about 0.5 A/m to about 0.6 A/m, about 0.5 A/m to about 0.7 A/m, about 0.5 A/m to about 0.8 A/m, about 0.5 A/m to about 0.9 A/m, about 0.5 A/m to about 1 A/m, about 0.5 A/m to about 2 A/m, about 0.5 A/m to about 3 A/m, about 0.5 A/m to about 4 A/m, about 0.5 A/m to about 5 A/m, about 0.5 A/m to about 8 A/m, about 0.5 A/m to about 10 A/m, about 0.6 A/m to about 0.7 A/m, about 0.6 A/m to about 0.8 A/m, about 0.6 A/m to about 0.9 A/m, about 0.6 A/m to about 1 A/m, about 0.6 A/m to about 2 A/m, about 0.6 A/m to about 3 A/m, about 0.6 A/m to about 4 A/m, about 0.6 A/m to about 5 A/m, about 0.6 A/m to about 8 A/m, about 0.6 A/m to about 10 A/m, about 0.7 A/m to about 0.8 A/m, about 0.7 A/m to about 0.9 A/m, about 0.7 A/m to about 1 A/m, about 0.7 A/m to about 2 A/m, about 0.7 A/m to about 3 A/m, about 0.7 A/m to about 4 A/m, about 0.7 A/m to about 5 A/m, about 0.7 A/m to about 8 A/m, about 0.7 A/m to about 10 A/m, about 0.8 A/m to about 0.9 A/m, about 0.8 A/m to about 1 A/m, about 0.8 A/m to about 2 A/m, about 0.8 A/m to about 3 A/m, about 0.8 A/m to about 4 A/m, about 0.8 A/m to about 5 A/m, about 0.8 A/m to about 8 A/m, about 0.8 A/m to about 10 A/m, about 0.9 A/m to about 1 A/m, about 0.9 A/m to about 2 A/m, about 0.9 A/m to about 3 A/m, about 0.9 A/m to about 4 A/m, about 0.9 A/m to about 5 A/m, about 0.9 A/m to about 8 A/m, about 0.9 A/m to about 10 A/m, about 1 A/m to about 2 A/m, about 1 A/m to about 3 A/m, about 1 A/m to about 4 A/m, about 1 A/m to about 5 A/m, about 1 A/m to about 8 A/m, about 1 A/m to about 10 A/m, about 2 A/m to about 3 A/m, about 2 A/m to about 4 A/m, about 2 A/m to about 5 A/m, about 2 A/m to about 8 A/m, about 2 A/m to about 10 A/m, about 3 A/m to about 4 A/m, about 3 A/m to about 5 A/m, about 3 A/m to about 8 A/m, about 3 A/m to about 10 A/m, about 4 A/m to about 5 A/m, about 4 A/m to about 8 A/m, about 4 A/m to about 10 A/m, about 5 A/m to about 8 A/m, about 5 A/m to about 10 A/m, or about 8 A/m to about 10 A/m. In some embodiments, the ferromagnetic ink is characterized by a low coercivity ranging from about 0.5 A/m, about 0.6 A/m, about 0.7 A/m, about 0.8 A/m, about 0.9 A/m, about 1 A/m, about 2 A/m, about 3 A/m, about 4 A/m, about 5 A/m, about 8 A/m, or about 10 A/m.

In some embodiments, the ferromagnetic ink is characterized by low magnetic hysteresis losses per remagnetization cycle. In some embodiments, the ferromagnetic ink has a magnetic hysteresis loss per remagnetization cycle ranging from about 1 to about $10^3$ joules per cubic meter ($J/m^3$). In some embodiments, the ferromagnetic ink has a magnetic hysteresis loss per remagnetization cycle ranging from about 0.1 joules per cubic meter to about 10,000 joules per cubic meter. In some embodiments, the ferromagnetic ink has a magnetic hysteresis loss per remagnetization cycle ranging from about 0.1 joules per cubic meter. In some embodiments, the ferromagnetic ink has a magnetic hysteresis loss per remagnetization cycle ranging from about 10,000 joules per cubic meter. In some embodiments, the ferromagnetic ink has a magnetic hysteresis loss per remagnetization cycle ranging from about 0.1 joules per cubic meter to about 1 joule per cubic meter, about 0.1 joules per cubic meter to about 10 joules per cubic meter, about 0.1 joules per cubic meter to about 50 joules per cubic meter, about 0.1 joules per cubic meter to about 100 joules per cubic meter, about 0.1 joules per cubic meter to about 500 joules per cubic meter, about 0.1 joules per cubic meter to about 1,000 joules per cubic meter, about 0.1 joules per cubic meter to about 1,500 joules per cubic meter, about 0.1 joules per cubic meter to about 10,000 joules per cubic meter, about 1 joule per cubic meter to about 10 joules per cubic meter, about 1 joule per cubic meter to about 50 joules per cubic meter, about 1 joule per cubic meter to about 100 joules per cubic meter, about 1 joule per cubic meter to about 500 joules per cubic meter, about 1 joule per cubic meter to about 1,000 joules per cubic meter, about 1 joule per cubic meter to about 1,500 joules per cubic meter, about 1 joule per cubic meter to about 10,000 joules per cubic meter, about 10 joules per cubic meter to about 50 joules per cubic meter, about 10 joules per cubic meter to about 100 joules per cubic meter, about 10 joules per cubic meter to about 500 joules per cubic meter, about 10 joules per cubic meter to about 1,000 joules per cubic meter, about 10 joules per cubic meter to about 1,500 joules per cubic meter, about 10 joules per cubic meter to about 10,000 joules per cubic meter, about 50 joules per cubic meter to about 100 joules per cubic meter, about 50 joules per cubic meter to about 500 joules per cubic meter, about 50 joules per cubic meter to about 1,000 joules per cubic meter, about 50 joules per cubic meter to about 1,500 joules per cubic meter, about 50 joules per cubic meter to about 10,000 joules per cubic meter, about 100 joules per cubic meter to about 500 joules per cubic meter, about 100 joules per cubic meter to about 1,000 joules per cubic meter, about 100 joules per cubic meter to about 1,500 joules per cubic meter, about 100 joules per cubic meter to about 10,000 joules per cubic meter, about 500 joules per cubic meter to about 1,000 joules per cubic meter, about 500 joules per cubic meter to about 1,500 joules per cubic meter, about 500 joules per cubic meter to about 10,000 joules per cubic meter, about 1,000 joules per cubic meter to about 1,500 joules per cubic meter, about 1,000 joules per cubic meter to about 10,000 joules per cubic meter, or about 1,500 joules per cubic meter to about 10,000 joules per cubic meter. In some embodiments, the ferromagnetic ink has a magnetic hysteresis loss per remagnetization cycle ranging from about 0.1 joules per cubic meter, about 1 joule per cubic meter, about 10 joules per cubic meter, about 50 joules per cubic meter, about 100 joules per cubic meter, about 500 joules per cubic meter, about 1,000 joules per cubic meter, about 1,500 joules per cubic meter, or about 10,000 joules per cubic meter.

In some embodiments, the ferromagnetic ink is magnetized spontaneously. In some embodiments, the ferromagnetic ink is magnetized spontaneously when placed in contact with a magnetic field. In some embodiments, at temperatures below the Curie point, the ferromagnetic ink is magnetized spontaneously but does not manifest magnetic properties externally.

In some embodiments, all components of the ferromagnetic ink composition are indirect food additives. In some embodiments, all components of the ferromagnetic ink composition may come into contact with food as part of packaging or processing equipment, but are not intended to be added directly to food. In some embodiments, all components of the ferromagnetic ink composition are additives permitted for food contact applications, as listed in Title 21 of the Code of Federal Regulations (CFR) of the Food and Drug Administration (FDA). In some embodiments, all components of the ferromagnetic ink composition are food contact substances. A food contact substance is defined by Title 21 of the CFR, Part 170, Section 170.3 as any substance that is intended for use as a component of materials used in manufacturing, packing, packaging, transporting, or holding food if such use is not intended to have any technical effect in such food. In some embodiments, all components of the ferromagnetic ink composition are safe food contact materials. In some embodiments, a food contact material is a material that is intended to be in contact with food. In some embodiments, a safe food contact material is a material whose surface is free of any toxic contaminants which may be contacted during the manufacturing process. Furthermore, in some embodiments, a material that is safe for food contact does not become a source of toxic contamination through usage (i.e., degeneration). The safety of the food contact material is assured by estimating and regulating the "migration limits" of the material. In some embodiments, the overall migration of all of the components of the ferromagnetic ink composition is limited to about 10 milligrams (mg) of substances per squared decimeter (dm$^2$) of a potential contact surface. In some embodiments, all of the components of the ferromagnetic ink composition meet the migration limit requirements of a safe food contact material. In some embodiments, the all components of the ferromagnetic ink composition are Generally Recognized as Safe (GRAS) substances.

In some embodiments, the ferromagnetic ink composition is temporarily magnetized when exposed to a magnetic field. In some embodiments, the ferromagnetic ink composition is printable. In some embodiments, the printing technique used to print the inks onto desired substrates is a significant determinant of ink composition. In some embodiments, the ink is printed using flexographic or gravure or intaglio or screen or pad or offset print press. In some embodiments, the ferromagnetic ink composition is printed using flexographic printing. In some embodiments, the ferromagnetic ink composition is printed using gravure printing. In some embodiments, the ferromagnetic ink composition is printed using intaglio printing. In some embodiments, the ferromagnetic ink composition is printed using screen printing. In some embodiments, the ferromagnetic ink composition is printed using pad printing. In some embodiments, the ferromagnetic ink composition is printed using offset print press. Inks used in such high speed commercial printers are characterized by viscosity ranges of >10 cP. In some embodiments, the ferromagnetic ink composition has a viscosity that is about 10 centipoise (cP).

In some embodiments, a ferromagnetic ink composition having a viscosity from about 100 cP to about 200 cP is used with flexographic printing methods. In some embodiments, the ferromagnetic ink composition has a viscosity of about 100 cP to about 200 cP. In some embodiments, the ferromagnetic ink composition has a viscosity of about 100 cP. In some embodiments, the ferromagnetic ink composition has a viscosity of about 200 cP. In some embodiments, the ferromagnetic ink composition has a viscosity of about 100 cP to about 110 cP, about 100 cP to about 120 cP, about 100 cP to about 130 cP, about 100 cP to about 140 cP, about 100 cP to about 150 cP, about 100 cP to about 160 cP, about 100 cP to about 170 cP, about 100 cP to about 180 cP, about 100 cP to about 190 cP, about 100 cP to about 200 cP, about 110 cP to about 120 cP, about 110 cP to about 130 cP, about 110 cP to about 140 cP, about 110 cP to about 150 cP, about 110 cP to about 160 cP, about 110 cP to about 170 cP, about 110 cP to about 180 cP, about 110 cP to about 190 cP, about 110 cP to about 200 cP, about 120 cP to about 130 cP, about 120 cP to about 140 cP, about 120 cP to about 150 cP, about 120 cP to about 160 cP, about 120 cP to about 170 cP, about 120 cP to about 180 cP, about 120 cP to about 190 cP, about 120 cP to about 200 cP, about 130 cP to about 140 cP, about 130 cP to about 150 cP, about 130 cP to about 160 cP, about 130 cP to about 170 cP, about 130 cP to about 180 cP, about 130 cP to about 190 cP, about 130 cP to about 200 cP, about 140 cP to about 150 cP, about 140 cP to about 160 cP, about 140 cP to about 170 cP, about 140 cP to about 180 cP, about 140 cP to about 190 cP, about 140 cP to about 200 cP, about 150 cP to about 160 cP, about 150 cP to about 170 cP, about 150 cP to about 180 cP, about 150 cP to about 190 cP, about 150 cP to about 200 cP, about 160 cP to about 170 cP, about 160 cP to about 180 cP, about 160 cP to about 190 cP, about 160 cP to about 200 cP, about 170 cP to about 180 cP, about 170 cP to about 190 cP, about 170 cP to about 200 cP, about 180 cP to about 190 cP, about 180 cP to about 200 cP, or about 190 cP to about 200 cP. In some embodiments, the ferromagnetic ink composition has a viscosity of about 100 cP, about 110 cP, about 120 cP, about 130 cP, about 140 cP, about 150 cP, about 160 cP, about 170 cP, about 180 cP, about 190 cP, or about 200 cP.

In some embodiments, a ferromagnetic ink composition having a viscosity from about 40 cP to about 80 cP is used with gravure printing methods. In some embodiments, the ferromagnetic ink composition has a viscosity of about 40 cP to about 80 cP. In some embodiments, the ferromagnetic ink composition has a viscosity of about 40 cP. In some embodiments, the ferromagnetic ink composition has a viscosity of about 80 cP. In some embodiments, the ferromagnetic ink composition has a viscosity of about 40 cP to about 45 cP, about 40 cP to about 50 cP, about 40 cP to about 55 cP, about 40 cP to about 60 cP, about 40 cP to about 65 cP, about 40 cP to about 70 cP, about 40 cP to about 75 cP, about 40 cP to about 80 cP, about 45 cP to about 50 cP, about 45 cP to about 55 cP, about 45 cP to about 60 cP, about 45 cP to about 65 cP, about 45 cP to about 70 cP, about 45 cP to about 75 cP, about 45 cP to about 80 cP, about 50 cP to about 55 cP, about 50 cP to about 60 cP, about 50 cP to about 65 cP, about 50 cP to about 70 cP, about 50 cP to about 75 cP, about 50 cP to about 80 cP, about 55 cP to about 60 cP, about 55 cP to about 65 cP, about 55 cP to about 70 cP, about 55 cP to about 75 cP, about 55 cP to about 80 cP, about 60 cP to about 65 cP, about 60 cP to about 70 cP, about 60 cP to about 75 cP, about 60 cP to about 80 cP, about 65 cP to about 70 cP, about 65 cP to about 75 cP, about 65 cP to about 80 cP, about 70 cP to about 75 cP, about 70 cP to about 80 cP, or about 75 cP to about 80 cP. In some embodiments, the ferromagnetic ink composition has a viscosity of about 40 cP, about 45 cP, about 50 cP, about 55 cP, about 60 cP, about 65 cP, about 70 cP, about 75 cP, or about 80 cP.

In some embodiments, a ferromagnetic ink composition having a viscosity from about 100 cP to about 150 cP is used with offset printing methods. In some embodiments, a ferromagnetic ink composition having a viscosity from about 100 cP to about 150 cP is used with offset printing methods. In some embodiments, a ferromagnetic ink composition having a viscosity from about 100 cP is used with offset printing methods. In some embodiments, a ferromagnetic ink composition having a viscosity from about 150 cP is used with offset printing methods. In some embodiments, a ferromagnetic ink composition having a viscosity from about 100 cP to about 105 cP, about 100 cP to about 110 cP, about 100 cP to about 115 cP, about 100 cP to about 120 cP, about 100 cP to about 125 cP, about 100 cP to about 130 cP, about 100 cP to about 135 cP, about 100 cP to about 140 cP, about 100 cP to about 145 cP, about 100 cP to about 150 cP, about 105 cP to about 110 cP, about 105 cP to about 115 cP, about 105 cP to about 120 cP, about 105 cP to about 125 cP, about 105 cP to about 130 cP, about 105 cP to about 135 cP, about 105 cP to about 140 cP, about 105 cP to about 145 cP, about 105 cP to about 150 cP, about 110 cP to about 115 cP, about 110 cP to about 120 cP, about 110 cP to about 125 cP, about 110 cP to about 130 cP, about 110 cP to about 135 cP, about 110 cP to about 140 cP, about 110 cP to about 145 cP, about 110 cP to about 150 cP, about 115 cP to about 120 cP, about 115 cP to about 125 cP, about 115 cP to about 130 cP, about 115 cP to about 135 cP, about 115 cP to about 140 cP, about 115 cP to about 145 cP, about 115 cP to about 150 cP, about 120 cP to about 125 cP, about 120 cP to about 130 cP, about 120 cP to about 135 cP, about 120 cP to about 140 cP, about 120 cP to about 145 cP, about 120 cP to about 150 cP, about 125 cP to about 130 cP, about 125 cP to about 135 cP, about 125 cP to about 140 cP, about 125 cP to about 145 cP, about 125 cP to about 150 cP, about 130 cP to about 135 cP, about 130 cP to about 140 cP, about 130 cP to about 145 cP, about 130 cP to about 150 cP, about 135 cP to about 140 cP, about 135 cP to about 145 cP, about 135 cP to about 150 cP, about 140 cP to about 145 cP, about 140 cP to about 150 cP, or about 145 cP to about 150 cP is used with offset printing methods. In some embodiments, a ferromagnetic ink composition having a viscosity from about 100 cP, about 105 cP, about 110 cP, about 115 cP, about 120 cP, about 125 cP, about 130 cP, about 135 cP, about 140 cP, about 145 cP, or about 150 cP is used with offset printing methods.

In some embodiments, the ferromagnetic ink composition has optimum rheology properties. In some embodiments, the ferromagnetic ink has optimum stability during ink manufacturing, storage, and throughout the printing process. In some embodiments, the ferromagnetic ink components do not separate out during manufacturing, storage, and throughout the printing process. In some embodiments, the ferromagnetic ink composition does not degrade during manufacturing, storage, and throughout the printing process. In some embodiments, no sedimentation of the ferromagnetic ink components occurs during manufacturing, storage, and throughout the printing process. In some embodiments, stability of the ferromagnetic ink is characterized by a lack of settling. In some embodiments, the ferromagnetic ink remains stable for at least three weeks. In some embodiments, no settling of the ferromagnetic ink occurs for at least three weeks.

In some embodiments, the ferromagnetic ink composition has a sufficient magnetic strength required for successful magnet induced separation of recyclates in an MRF separation facility. In some embodiments, the ferromagnetic ink composition maintains this magnetic strength throughout the processes of ink manufacturing, storage, printing, and/or heat transfer when part of a ferromagnetic label.

In some embodiments, the ferromagnetic ink composition has optimum grinding efficiency. In some embodiments, the ferromagnetic ink composition has a grinding efficiency of at most 5 micrometers or microns (μm). In some embodiments, the grinding efficiency of the ferromagnetic ink composition is measured using a grind gauge comprising a National Printing Inks Research Institute (NPIRI) scale. The NPIRI Scale is a scale designed for ink gauge by the National Printing Ink Research Institute. The scale begins with "0" at the infinite point and extends to "10" at a depth of 0.001 inches. While it is an arbitrary scale, it is a logical one in that these divisions are equivalent of tenths of mils, or 2½ microns. In some embodiments, the ferromagnetic ink composition has a grinding efficiency of at least 5 μm, based on the NPIRI scale. In some embodiments, the grinding efficiency of the ferromagnetic ink composition is measured by using a grind gauge or a precision grindometer. In some embodiments, the grind gauge or the precision grindometer is used to indicate the fineness of grind or the presence of coarse particles or agglomerates or the "grind of the ink" in a dispersion (e.g., in the ferromagnetic ink composition). In some embodiments, the grind gauge comprises a rectangular channel of varying depth from about 0 μm to about 10 μm. In some embodiments, ink is placed at the 10 μm depth end and scraped along the channel with a scraper. In some embodiments, the measured depth (in microns) along the channel where particle streaks are first observed is labeled as grind of the ink.

In some embodiments, the grind of the ferromagnetic ink composition is about 0.01 microns to about 5 microns. In some embodiments, the grind of the ferromagnetic ink composition is about 0.01 microns. In some embodiments, the grind of the ferromagnetic ink composition is about 5 microns. In some embodiments, the grind of the ferromagnetic ink composition is about 0.01 microns to about 0.05 microns, about 0.01 microns to about 1 micron, about 0.01 microns to about 1.5 microns, about 0.01 microns to about 2 microns, about 0.01 microns to about 2.5 microns, about 0.01 microns to about 3 microns, about 0.01 microns to about 3.5 microns, about 0.01 microns to about 4 microns, about 0.01 microns to about 4.5 microns, about 0.01 microns to about 5 microns, about 0.05 microns to about 1 micron, about 0.05 microns to about 1.5 microns, about 0.05 microns to about 2 microns, about 0.05 microns to about 2.5 microns, about 0.05 microns to about 3 microns, about 0.05 microns to about 3.5 microns, about 0.05 microns to about 4 microns, about 0.05 microns to about 4.5 microns, about 0.05 microns to about 5 microns, about 1 micron to about 1.5 microns, about 1 micron to about 2 microns, about 1 micron to about 2.5 microns, about 1 micron to about 3 microns, about 1 micron to about 3.5 microns, about 1 micron to about 4 microns, about 1 micron to about 4.5 microns, about 1 micron to about 5 microns, about 1.5 microns to about 2 microns, about 1.5 microns to about 2.5 microns, about 1.5 microns to about 3 microns, about 1.5 microns to about 3.5 microns, about 1.5 microns to about 4 microns, about 1.5 microns to about 4.5 microns, about 1.5 microns to about 5 microns, about 2 microns to about 2.5 microns, about 2 microns to about 3 microns, about 2 microns to about 3.5 microns, about 2 microns to about 4 microns, about 2 microns to about 4.5 microns, about 2 microns to about 5 microns, about 2.5 microns to about 3 microns, about 2.5 microns to about 3.5 microns, about 2.5 microns to about 4 microns, about 2.5 microns to about 4.5 microns, about 2.5 microns to about 5 microns, about 3 microns to about 3.5 microns, about 3 microns to about 4 microns, about 3 microns to about 4.5 microns, about 3 microns to about 5 microns, about 3.5 microns to about 4 microns, about 3.5 microns to about 4.5 microns, about 3.5 microns to about 5 microns, about 4 microns to about 4.5 microns, about 4 microns to about 5 microns, or about 4.5 microns to about 5 microns. In some embodiments, the grind of the ferromagnetic ink composition is about 0.01 microns, about 0.05 microns, about 1 micron, about 1.5 microns, about 2 microns, about 2.5 microns, about 3 microns, about 3.5 microns, about 4 microns, about 4.5 microns, or about 5 microns.

In some embodiments, the ferromagnetic ink composition has optimum heat transfer performance. In some embodiments, optimum heat transfer performance is defined as a complete transfer of the ferromagnetic ink composition onto the surface of an object when using heat transfer methods. For example, in some embodiments, the ferromagnetic ink composition is fully transferred onto the surface of an object (e.g., a plastic object) using a hot plate.

In some embodiments, the ferromagnetic ink composition comprises variation in color. In some embodiments, the ferromagnetic ink composition comprises different colored pigments. In some embodiments, the colored pigments are non-ferromagnetic pigments. In some embodiments, the ferromagnetic ink composition comprises a colored pigment at a level ranging from about 5% to about 10% of the ferromagnetic ink formula weight. In some embodiments, the ferromagnetic ink composition comprises a colored pigment at a level ranging from about 1% to about 60% of the ferromagnetic ink formula weight. In some embodiments, the ferromagnetic ink composition comprises a colored pigment at a level ranging from at least about 1% of the ferromagnetic ink formula weight. In some embodiments, the ferromagnetic ink composition comprises a colored pigment at a level ranging from at most about 60% of the ferromagnetic ink formula weight. In some embodiments, the ferromagnetic ink composition comprises a colored pigment at a level ranging from about 1% to about 2%, about 1% to about 3%, about 1% to about 4%, about 1% to about 5%, about 1% to about 10%, about 1% to about 15%, about 1% to about 20%, about 1% to about 30%, about 1% to about 40%, about 1% to about 50%, about 1% to about 60%, about 2% to about 3%, about 2% to about 4%, about 2% to about 5%, about 2% to about 10%, about 2% to about 15%, about 2% to about 20%, about 2% to about 30%, about 2% to about 40%, about 2% to about 50%, about 2% to about 60%, about 3% to about 4%, about 3% to about 5%, about 3% to about 10%, about 3% to about 15%, about 3% to about 20%, about 3% to about 30%, about 3% to about 40%, about 3% to about 50%, about 3% to about 60%, about 4% to about 5%, about 4% to about 10%, about 4% to about 15%, about 4% to about 20%, about 4% to about 30%, about 4% to about 40%, about 4% to about 50%, about 4% to about 60%, about 5% to about 10%, about 5% to about 15%, about 5% to about 20%, about 5% to about 30%, about 5% to about 40%, about 5% to about 50%, about 5% to about 60%, about 10% to about 15%, about 10% to about 20%, about 10% to about 30%, about 10% to about 40%, about 10% to about 50%, about 10% to about 60%, about 15% to about 20%, about 15% to about 30%, about 15% to about 40%, about 15% to about 50%, about 15% to about 60%, about 20% to about 30%, about 20% to about 40%, about 20% to about 50%, about 20% to about 60%, about 30% to about 40%, about 30% to about 50%, about 30% to about 60%, about 40% to about 50%, about 40% to about 60%, or about 50% to about 60% of the ferromagnetic ink formula weight. In some embodiments, the ferromagnetic ink composition comprises a colored pigment at a level ranging from about 1%, about 2%, about 3%, about 4%, about 5%, about 10%, about 15%, about 20%, about 30%, about 40%, about 50%, or about 60% of the ferromagnetic ink formula weight.

In some embodiments, the ferromagnetic ink composition comprises a non-ferromagnetic pigment to provide color to the composition. In some embodiments, the ferromagnetic ink composition comprises a non-ferromagnetic, colored pigment to improve aesthetic appeal. In some embodiments, the ferromagnetic ink composition comprises a colored pigment to provide markings to printed plastic. In some embodiments, the colored pigment is a yellow pigment, a cyan pigment, a magenta pigment, and a black pigment. In some embodiments, the yellow pigment is Yellow 12, Yellow 13, Yellow 14, Yellow 17, Yellow 74, or a combination thereof. In some embodiments, the cyan pigment is Blue 15:1, Blue 15:3, Blue 15:4, or a combination thereof. In some embodiments, the magenta pigment is Red 57:1, Red 48:2, Red 146, Red 122, or a combination thereof. In some embodiments, the black pigment is Black 7. In some embodiments, the ferromagnetic ink composition shows no variation and/or loss of performance due to the addition or change in the non-ferromagnetic pigments.

In some embodiments, the non-ferromagnetic colored pigment is an FDA-approved food additives as listed in Title 21 of the Code of Federal Regulations (see sections 175-178). In some embodiments, the non-ferromagnetic colored pigment is selected from the list of generally recognized as safe (GRAS) substances, as listed by the Food and Drug Safety Administration (FDA) in Title 21 of the Code of Federal Regulations (CFR) (see sections 182, 184, 186). In some embodiments, the non-ferromagnetic colored pigment is safe to be in contact with foodstuffs. In some embodiments, the non-ferromagnetic colored pigment is a "generally recognized as safe" (GRAS) substance.

Other Compositions

Another aspect of the disclosure provides a composition comprising a plurality of non-metallic objects, and at least one ferromagnetic plastic object; wherein the at least one ferromagnetic plastic object is less than about 4 inches in any one dimension.

In some embodiments, the plurality of non-metallic objects is a plurality of paper objects. In some embodiments, the plurality of paper objects is a plurality of waste paper objects. Non-limiting examples of waste paper objects include cardboard, magazines, newspapers, books, office paper, sheets of paper, paperboard, paper cardboard dairy, juice cartons, mixed paper and phone books. In some embodiments, about 90% of the plurality of non-metallic objects, by weight, is a plurality of paper objects. In some embodiments, the ferromagnetic plastic object is temporarily magnetized upon exposure to a magnetic field. In some embodiments, the ferromagnetic plastic object is separated from the plurality of non-metallic objects when temporarily magnetized. In some embodiments, the magnetic field has a magnetic flux density ranging from about 3000 gauss (G) to about 12,000 G. In some embodiments, the magnetic field is produced by a commercial drum-type separator, an overband magnetic separator, a magnetic head pulley or a combination thereof.

In some embodiments, the composition further comprises at least one metal object. Non-limiting examples of the metal object include aluminum cans, aluminum foil, bakeware, steel cans, and tin cans. In some embodiments, the composition further comprises at least one glass object. Non-limiting examples of the metal object include clear glass, flint glass, brown glass, amber glass, green glass, and emerald glass. In some embodiments, the ferromagnetic plastic object comprises a ferromagnetic ink composition (e.g., as described supra).

Magnetizable Plastic Objects

Another aspect of the present disclosure provides a plastic object comprising a ferromagnetic element in the form of a film or ink deposited on the surface of the plastic object.

In some embodiments, the plastic object is less than about 20 grams (g) in weight. In some embodiments, the plastic object weighs about 0.5 g to about 20 g. In some embodiments, the plastic object weighs about 0.5 g. In some embodiments, the plastic object weighs about 20 g. In some embodiments, the plastic object weighs about 0.5 g to about 1 g, about 0.5 g to about 2 g, about 0.5 g to about 3 g, about 0.5 g to about 4 g, about 0.5 g to about 5 g, about 0.5 g to about 6 g, about 0.5 g to about 7 g, about 0.5 g to about 8 g, about 0.5 g to about 9 g, about 0.5 g to about 10 g, about 0.5 g to about 20 g, about 1 g to about 2 g, about 1 g to about 3 g, about 1 g to about 4 g, about 1 g to about 5 g, about 1 g to about 6 g, about 1 g to about 7 g, about 1 g to about 8 g, about 1 g to about 9 g, about 1 g to about 10 g, about 1 g to about 20 g, about 2 g to about 3 g, about 2 g to about 4 g, about 2 g to about 5 g, about 2 g to about 6 g, about 2 g to about 7 g, about 2 g to about 8 g, about 2 g to about 9 g, about 2 g to about 10 g, about 2 g to about 20 g, about 3 g to about 4 g, about 3 g to about 5 g, about 3 g to about 6 g, about 3 g to about 7 g, about 3 g to about 8 g, about 3 g to about 9 g, about 3 g to about 10 g, about 3 g to about 20 g, about 4 g to about 5 g, about 4 g to about 6 g, about 4 g to about 7 g, about 4 g to about 8 g, about 4 g to about 9 g, about 4 g to about 10 g, about 4 g to about 20 g, about 5 g to about 6 g, about 5 g to about 7 g, about 5 g to about 8 g, about 5 g to about 9 g, about 5 g to about 10 g, about 5 g to about 20 g, about 6 g to about 7 g, about 6 g to about 8 g, about 6 g to about 9 g, about 6 g to about 10 g, about 6 g to about 20 g, about 7 g to about 8 g, about 7 g to about 9 g, about 7 g to about 10 g, about 7 g to about 20 g, about 8 g to about 9 g, about 8 g to about 10 g, about 8 g to about 20 g, about 9 g to about 10 g, about 9 g to about 20 g, or about 10 g to about 20 g. In some embodiments, the plastic object weighs about 0.5 g, about 1 g, about 2 g, about 3 g, about 4 g, about 5 g, about 6 g, about 7 g, about 8 g, about 9 g, about 10 g, or about 20 g.

In some embodiments, the film or ink is a food contact substance. In some embodiments, all elements of the film or ink are FDA-approved food additives as listed in Title 21 of the Code of Federal Regulations (see sections 175-178). In some embodiments, all elements of the film or ink are selected from the list of generally recognized as safe (GRAS) substances, as listed by the Food and Drug Safety Administration (FDA) in Title 21 of the Code of Federal Regulations (see sections 182, 184, 186).

In some embodiments, the ferromagnetic element is directly printed onto the surface of the plastic object. In some embodiments, the ferromagnetic element is directly deposited on the surface of the plastic object in the presence of a magnetic field to increase a magnetic permeability of the ferromagnetic element. In some embodiments, the design of a plastic object which is imprinted with ink or affixed with a pre-printed label containing ink enables the separation of the desired object from a mixed-waste stream under application of a magnetic field. In some embodiments, when exposed to a magnetic field of about 3000 to about 7000 gauss (G) in strength with a magnetic gradient of about 2 Tesla/meter, the plastic object described above is able to experience a force comparable to its own weight. In some embodiments, the plastic object described in the present disclosure is capable of being attracted by a magnetic field of a commercial drum-type, over band magnetic separator or a magnetic head pulley.

In some embodiments, the present disclosure provides methods to employ the use of novel geometric surface designs on a plastic object which is imprinted with ferromagnetic coating. In some embodiments, these designs can be directly on the final plastic object 100 or plastic film labels 104 which will be subsequently affixed on a plastic object. In some embodiments, the surface of the plastic object or film label is designed in such a way that increases printable surface area on the plastic object without significant change in dimensions of the object. An embodiment of such a design can be found in FIG. 2B where microwells are designed on plastic object 100 and are subsequently coated with printable ferromagnetic ink 102. Another embodiment of such design can be found in FIG. 2C where a saw tooth shape is designed on the plastic object 100 and subsequently coated with printable ink 102. In some embodiments, such designs can be applied on a removable label 104 which are pre-printed with a ferromagnetic ink 102. In some embodiments, the surface of the plastic object comprises a surface modification. In some embodiments, the surface modification comprises at least one microwell or a saw tooth design. In some embodiments, the microwell or the saw tooth design increase a printable surface area of the plastic object.

In some embodiments, the present disclosure provides methods to manufacture a plastic object with a surface modification. In some embodiments, the present disclosure provides methods to manufacture a plastic object with a surface modification and a ferromagnetic ink deposited therein. In some embodiments, the plastic object is manufactured using injection molding methods. In some embodiments, the plastic object is manufactured using extrusion molding methods. In some embodiments, the plastic object is manufactured using three-dimensional printing methods. In some embodiments, the surface modifications are generated by inserting appropriate inserts into the molds during the manufacturing process. In some embodiments, the surface modification is a microwell. In some embodiments, the surface modification is a saw tooth design.

In some embodiments, the microwell has a diameter of about 0.25 mm and a depth of about 0.25 mm depth. In some embodiments, the distance between two microwells is about 0.5 mm.

In some embodiments, the microwell has a diameter of about 0.25 mm to about 1 mm. In some embodiments, the microwell has a diameter of about 0.25 mm. In some embodiments, the microwell has a diameter of about 1 mm. In some embodiments, the microwell has a diameter of about 0.25 mm to about 0.3 mm, about 0.25 mm to about 0.4 mm, about 0.25 mm to about 0.5 mm, about 0.25 mm to about 0.6 mm, about 0.25 mm to about 0.7 mm, about 0.25 mm to about 0.8 mm, about 0.25 mm to about 0.9 mm, about 0.25 mm to about 1 mm, about 0.3 mm to about 0.4 mm, about 0.3 mm to about 0.5 mm, about 0.3 mm to about 0.6 mm, about 0.3 mm to about 0.7 mm, about 0.3 mm to about 0.8 mm, about 0.3 mm to about 0.9 mm, about 0.3 mm to about 1 mm, about 0.4 mm to about 0.5 mm, about 0.4 mm to about 0.6 mm, about 0.4 mm to about 0.7 mm, about 0.4 mm to about 0.8 mm, about 0.4 mm to about 0.9 mm, about 0.4 mm to about 1 mm, about 0.5 mm to about 0.6 mm, about 0.5 mm to about 0.7 mm, about 0.5 mm to about 0.8 mm, about 0.5 mm to about 0.9 mm, about 0.5 mm to about 1 mm, about 0.6 mm to about 0.7 mm, about 0.6 mm to about 0.8 mm, about 0.6 mm to about 0.9 mm, about 0.6 mm to about 1 mm, about 0.7 mm to about 0.8 mm, about 0.7 mm to about 0.9 mm, about 0.7 mm to about 1 mm, about 0.8 mm to about 0.9 mm, about 0.8 mm to about 1 mm, or about 0.9 mm to about 1 mm. In some embodiments, the microwell has a diameter of about 0.25 mm, about 0.3 mm, about 0.4 mm, about 0.5 mm, about 0.6 mm, about 0.7 mm, about 0.8 mm, about 0.9 mm, or about 1 mm.

In some embodiments, the microwell has a depth of about 0.1 mm to about 1 mm. In some embodiments, the microwell has a depth of about 0.1 mm. In some embodiments, the microwell has a depth of about 1 mm. In some embodiments, the microwell has a depth of about 0.1 mm to about 0.25 mm, about 0.1 mm to about 0.3 mm, about 0.1 mm to about 0.4 mm, about 0.1 mm to about 0.5 mm, about 0.1 mm to about 0.6 mm, about 0.1 mm to about 0.7 mm, about 0.1 mm to about 0.8 mm, about 0.1 mm to about 0.9 mm, about 0.1 mm to about 1 mm, about 0.25 mm to about 0.3 mm, about 0.25 mm to about 0.4 mm, about 0.25 mm to about 0.5 mm, about 0.25 mm to about 0.6 mm, about 0.25 mm to about 0.7 mm, about 0.25 mm to about 0.8 mm, about 0.25 mm to about 0.9 mm, about 0.25 mm to about 1 mm, about 0.3 mm to about 0.4 mm, about 0.3 mm to about 0.5 mm, about 0.3 mm to about 0.6 mm, about 0.3 mm to about 0.7 mm, about 0.3 mm to about 0.8 mm, about 0.3 mm to about 0.9 mm, about 0.3 mm to about 1 mm, about 0.4 mm to about 0.5 mm, about 0.4 mm to about 0.6 mm, about 0.4 mm to about 0.7 mm, about 0.4 mm to about 0.8 mm, about 0.4 mm to about 0.9 mm, about 0.4 mm to about 1 mm, about 0.5 mm to about 0.6 mm, about 0.5 mm to about 0.7 mm, about 0.5 mm to about 0.8 mm, about 0.5 mm to about 0.9 mm, about 0.5 mm to about 1 mm, about 0.6 mm to about 0.7 mm, about 0.6 mm to about 0.8 mm, about 0.6 mm to about 0.9 mm, about 0.6 mm to about 1 mm, about 0.7 mm to about 0.8 mm, about 0.7 mm to about 0.9 mm, about 0.7 mm to about 1 mm, about 0.8 mm to about 0.9 mm, about 0.8 mm to about 1 mm, or about 0.9 mm to about 1 mm. In some embodiments, the microwell has a depth of about 0.1 mm, about 0.25 mm, about 0.3 mm, about 0.4 mm, about 0.5 mm, about 0.6 mm, about 0.7 mm, about 0.8 mm, about 0.9 mm, or about 1 mm.

In some embodiments, the distance between two microwells is about 0.1 mm to about 1 mm. In some embodiments, the distance between two microwells is about 0.1 mm. In some embodiments, the distance between two microwells is about 1 mm. In some embodiments, the distance between two microwells is about 0.1 mm to about 0.25 mm, about 0.1 mm to about 0.3 mm, about 0.1 mm to about 0.4 mm, about 0.1 mm to about 0.5 mm, about 0.1 mm to about 0.6 mm, about 0.1 mm to about 0.7 mm, about 0.1 mm to about 0.8 mm, about 0.1 mm to about 0.9 mm, about 0.1 mm to about 1 mm, about 0.25 mm to about 0.3 mm, about 0.25 mm to about 0.4 mm, about 0.25 mm to about 0.5 mm, about 0.25 mm to about 0.6 mm, about 0.25 mm to about 0.7 mm, about 0.25 mm to about 0.8 mm, about 0.25 mm to about 0.9 mm, about 0.25 mm to about 1 mm, about 0.3 mm to about 0.4 mm, about 0.3 mm to about 0.5 mm, about 0.3 mm to about 0.6 mm, about 0.3 mm to about 0.7 mm, about 0.3 mm to about 0.8 mm, about 0.3 mm to about 0.9 mm, about 0.3 mm to about 1 mm, about 0.4 mm to about 0.5 mm, about 0.4 mm to about 0.6 mm, about 0.4 mm to about 0.7 mm, about 0.4 mm to about 0.8 mm, about 0.4 mm to about 0.9 mm, about 0.4 mm to about 1 mm, about 0.5 mm to about 0.6 mm, about 0.5 mm to about 0.7 mm, about 0.5 mm to about 0.8 mm, about 0.5 mm to about 0.9 mm, about 0.5 mm to about 1 mm, about 0.6 mm to about 0.7 mm, about 0.6 mm to about 0.8 mm, about 0.6 mm to about 0.9 mm, about 0.6 mm to about 1 mm, about 0.7 mm to about 0.8 mm, about 0.7 mm to about 0.9 mm, about 0.7 mm to about 1 mm, about 0.8 mm to about 0.9 mm, about 0.8 mm to about 1 mm, or about 0.9 mm to about 1 mm. In some embodiments, the distance between two microwells is about 0.1 mm, about 0.25 mm, about 0.3 mm, about 0.4 mm, about 0.5 mm, about 0.6 mm, about 0.7 mm, about 0.8 mm, about 0.9 mm, or about 1 mm.

In some embodiments, the vertical height of the "tooth" in the saw tooth design is about 0.25 mm. In some embodiments, the angle of the saw tooth cut is about 45°.

In some embodiments, the vertical height of the "tooth" in the saw tooth design is about 0.1 mm to about 1 mm. In some embodiments, the vertical height of the "tooth" in the saw tooth design is about 0.1 mm. In some embodiments, the vertical height of the "tooth" in the saw tooth design is about 1 mm. In some embodiments, the vertical height of the "tooth" in the saw tooth design is about 0.1 mm to about 0.25 mm, about 0.1 mm to about 0.3 mm, about 0.1 mm to about 0.4 mm, about 0.1 mm to about 0.5 mm, about 0.1 mm to about 0.6 mm, about 0.1 mm to about 0.7 mm, about 0.1 mm to about 0.8 mm, about 0.1 mm to about 0.9 mm, about 0.1 mm to about 1 mm, about 0.25 mm to about 0.3 mm, about 0.25 mm to about 0.4 mm, about 0.25 mm to about 0.5 mm, about 0.25 mm to about 0.6 mm, about 0.25 mm to about 0.7 mm, about 0.25 mm to about 0.8 mm, about 0.25 mm to about 0.9 mm, about 0.25 mm to about 1 mm, about 0.3 mm to about 0.4 mm, about 0.3 mm to about 0.5 mm, about 0.3 mm to about 0.6 mm, about 0.3 mm to about 0.7 mm, about 0.3 mm to about 0.8 mm, about 0.3 mm to about 0.9 mm, about 0.3 mm to about 1 mm, about 0.4 mm to about 0.5 mm, about 0.4 mm to about 0.6 mm, about 0.4 mm to about 0.7 mm, about 0.4 mm to about 0.8 mm, about 0.4 mm to about 0.9 mm, about 0.4 mm to about 1 mm, about 0.5 mm to about 0.6 mm, about 0.5 mm to about 0.7 mm, about 0.5 mm to about 0.8 mm, about 0.5 mm to about 0.9 mm, about 0.5 mm to about 1 mm, about 0.6 mm to about 0.7 mm, about 0.6 mm to about 0.8 mm, about 0.6 mm to about 0.9 mm, about 0.6 mm to about 1 mm, about 0.7 mm to about 0.8 mm, about 0.7 mm to about 0.9 mm, about 0.7 mm to about 1 mm, about 0.8 mm to about 0.9 mm, about 0.8 mm to about 1 mm, or about 0.9 mm to about 1 mm. In some embodiments, the vertical height of the "tooth" in the saw tooth design is about 0.1 mm, about 0.25 mm, about 0.3 mm, about 0.4 mm, about 0.5 mm, about 0.6 mm, about 0.7 mm, about 0.8 mm, about 0.9 mm, or about 1 mm.

In some embodiments, the angle of the saw tooth cut is about 5 degrees to about 90 degrees. In some embodiments, the angle of the saw tooth cut is about 5 degrees. In some embodiments, the angle of the saw tooth cut is about 90 degrees. In some embodiments, the angle of the saw tooth cut is about 5 degrees to about 10 degrees, about 5 degrees to about 15 degrees, about 5 degrees to about 20 degrees, about 5 degrees to about 25 degrees, about 5 degrees to about 30 degrees, about 5 degrees to about 40 degrees, about 5 degrees to about 45 degrees, about 5 degrees to about 50 degrees, about 5 degrees to about 60 degrees, about 5 degrees to about 70 degrees, about 5 degrees to about 90 degrees, about 10 degrees to about 15 degrees, about 10 degrees to about 20 degrees, about 10 degrees to about 25 degrees, about 10 degrees to about 30 degrees, about 10 degrees to about 40 degrees, about 10 degrees to about 45 degrees, about 10 degrees to about 50 degrees, about 10 degrees to about 60 degrees, about 10 degrees to about 70 degrees, about 10 degrees to about 90 degrees, about 15 degrees to about 20 degrees, about 15 degrees to about 25 degrees, about 15 degrees to about 30 degrees, about 15 degrees to about 40 degrees, about 15 degrees to about 45 degrees, about 15 degrees to about 50 degrees, about 15 degrees to about 60 degrees, about 15 degrees to about 70 degrees, about 15 degrees to about 90 degrees, about 20 degrees to about 25 degrees, about 20 degrees to about 30 degrees, about 20 degrees to about 40 degrees, about 20 degrees to about 45 degrees, about 20 degrees to about 50 degrees, about 20 degrees to about 60 degrees, about 20 degrees to about 70 degrees, about 20 degrees to about 90 degrees, about 25 degrees to about 30 degrees, about 25 degrees to about 40 degrees, about 25 degrees to about 45 degrees, about 25 degrees to about 50 degrees, about 25 degrees to about 60 degrees, about 25 degrees to about 70 degrees, about 25 degrees to about 90 degrees, about 30 degrees to about 40 degrees, about 30 degrees to about 45 degrees, about 30 degrees to about 50 degrees, about 30 degrees to about 60 degrees, about 30 degrees to about 70 degrees, about 30 degrees to about 90 degrees, about 40 degrees to about 45 degrees, about 40 degrees to about 50 degrees, about 40 degrees to about 60 degrees, about 40 degrees to about 70 degrees, about 40 degrees to about 90 degrees, about 45 degrees to about 50 degrees, about 45 degrees to about 60 degrees, about 45 degrees to about 70 degrees, about 45 degrees to about 90 degrees, about 50 degrees to about 60 degrees, about 50 degrees to about 70 degrees, about 50 degrees to about 90 degrees, about 60 degrees to about 70 degrees, about 60 degrees to about 90 degrees, or about 70 degrees to about 90 degrees. In some embodiments, the angle of the saw tooth cut is about 5 degrees, about 10 degrees, about 15 degrees, about 20 degrees, about 25 degrees, about 30 degrees, about 40 degrees, about 45 degrees, about 50 degrees, about 60 degrees, about 70 degrees, or about 90 degrees.

In some embodiments, the ferromagnetic element is printed onto a film. In some embodiments, the ferromagnetic element is directly deposited onto the film in the presence of a magnetic field to increase a magnetic permeability of the ferromagnetic element. In some embodiments, the film adheres to the surface of the plastic object upon application of heat and/or pressure. In some embodiments, the film is mechanically affixed on the surface of the plastic object. In some embodiments, the film is transferred onto the plastic object using heat transfer printing or hot foil stamping.

In some embodiments, the film comprises a surface modification. In some embodiments, the surface modification comprises at least one microwell or a saw tooth design. In some embodiments, the microwell or the saw tooth design increase a printable surface area of the label.

In some embodiments, the weight of the ferromagnetic element ranges from about 0.05% to 2% of the total weight of the plastic object. In some embodiments, the total weight of ferromagnetic element 10 on the surface of the plastic object 100, as shown in FIGS. 2A-D, is intended to be in the range of 0.05%-2% of the total weight of the final designed plastic object. In some embodiments, the ferromagnetic element is about 0.05% to about 2% of the total weight of the plastic object. In some embodiments, the ferromagnetic element is about 0.05% of the total weight of the plastic object. In some embodiments, the ferromagnetic element is about 2% of the total weight of the plastic object. In some embodiments, the ferromagnetic element is about 0.05% to about 0.06%, about 0.05% to about 0.07%, about 0.05% to about 0.08%, about 0.05% to about 0.09%, about 0.05% to about 0.1%, about 0.05% to about 0.5%, about 0.05% to about 1%, about 0.05% to about 1.5%, about 0.05% to about 2%, about 0.06% to about 0.07%, about 0.06% to about 0.08%, about 0.06% to about 0.09%, about 0.06% to about 0.1%, about 0.06% to about 0.5%, about 0.06% to about 1%, about 0.06% to about 1.5%, about 0.06% to about 2%, about 0.07% to about 0.08%, about 0.07% to about 0.09%, about 0.07% to about 0.1%, about 0.07% to about 0.5%, about 0.07% to about 1%, about 0.07% to about 1.5%, about 0.07% to about 2%, about 0.08% to about 0.09%, about 0.08% to about 0.1%, about 0.08% to about 0.5%, about 0.08% to about 1%, about 0.08% to about 1.5%, about 0.08% to about 2%, about 0.09% to about 0.1%, about 0.09% to about 0.5%, about 0.09% to about 1%, about 0.09% to about 1.5%, about 0.09% to about 2%, about 0.1% to about 0.5%, about 0.1% to about 1%, about 0.1% to about 1.5%, about 0.1% to about 2%, about 0.5% to about 1%, about 0.5% to about 1.5%, about 0.5% to about 2%, about 1% to about 1.5%, about 1% to about 2%, or about 1.5% to about 2% of the total weight of the plastic object. In some embodiments, the ferromagnetic element is about 0.05%, about 0.06%, about 0.07%, about 0.08%, about 0.09%, about 0.1%, about 0.5%, about 1%, about 1.5%, or about 2% of the total weight of the plastic object.

In some embodiments, the weight of ferromagnetic element 10 is preferably in the range of 0.3%-0.8% of the total weight of the final designed plastic object. In some embodiments, the ferromagnetic element is about 0.3% to about 0.8% of the total weight of the plastic object. In some embodiments, the ferromagnetic element is about 0.3% of the total weight of the plastic object. In some embodiments, the ferromagnetic element is about 0.8% of the total weight of the plastic object. In some embodiments, the ferromagnetic element is about 0.3% to about 0.4%, about 0.3% to about 0.5%, about 0.3% to about 0.6%, about 0.3% to about 0.7%, about 0.3% to about 0.8%, about 0.4% to about 0.5%, about 0.4% to about 0.6%, about 0.4% to about 0.7%, about 0.4% to about 0.8%, about 0.5% to about 0.6%, about 0.5% to about 0.7%, about 0.5% to about 0.8%, about 0.6% to about 0.7%, about 0.6% to about 0.8%, or about 0.7% to about 0.8% of the total weight of the plastic object. In some embodiments, the ferromagnetic element is about 0.3%, about 0.4%, about 0.5%, about 0.6%, about 0.7%, or about 0.8% of the total weight of the plastic object.

In some embodiments, the plastic object is less than about 4 inches in any one dimension. In some embodiments, the plastic object has a length of about 0.5 cm to about 15 cm. In some embodiments, the plastic object has a length of about 0.5 cm. In some embodiments, the plastic object has a length of about 15 cm. In some embodiments, the plastic object has a length of about 0.5 cm to about 1 cm, about 0.5 cm to about 2 cm, about 0.5 cm to about 3 cm, about 0.5 cm to about 4 cm, about 0.5 cm to about 5 cm, about 0.5 cm to about 6 cm, about 0.5 cm to about 7 cm, about 0.5 cm to about 8 cm, about 0.5 cm to about 9 cm, about 0.5 cm to about 10 cm, about 0.5 cm to about 15 cm, about 1 cm to about 2 cm, about 1 cm to about 3 cm, about 1 cm to about 4 cm, about 1 cm to about 5 cm, about 1 cm to about 6 cm, about 1 cm to about 7 cm, about 1 cm to about 8 cm, about 1 cm to about 9 cm, about 1 cm to about 10 cm, about 1 cm to about 15 cm, about 2 cm to about 3 cm, about 2 cm to about 4 cm, about 2 cm to about 5 cm, about 2 cm to about 6 cm, about 2 cm to about 7 cm, about 2 cm to about 8 cm, about 2 cm to about 9 cm, about 2 cm to about 10 cm, about 2 cm to about 15 cm, about 3 cm to about 4 cm, about 3 cm to about 5 cm, about 3 cm to about 6 cm, about 3 cm to about 7 cm, about 3 cm to about 8 cm, about 3 cm to about 9 cm, about 3 cm to about 10 cm, about 3 cm to about 15 cm, about 4 cm to about 5 cm, about 4 cm to about 6 cm, about 4 cm to about 7 cm, about 4 cm to about 8 cm, about 4 cm to about 9 cm, about 4 cm to about 10 cm, about 4 cm to about 15 cm, about 5 cm to about 6 cm, about 5 cm to about 7 cm, about 5 cm to about 8 cm, about 5 cm to about 9 cm, about 5 cm to about 10 cm, about 5 cm to about 15 cm, about 6 cm to about 7 cm, about 6 cm to about 8 cm, about 6 cm to about 9 cm, about 6 cm to about 10 cm, about 6 cm to about 15 cm, about 7 cm to about 8 cm, about 7 cm to about 9 cm, about 7 cm to about 10 cm, about 7 cm to about 15 cm, about 8 cm to about 9 cm, about 8 cm to about 10 cm, about 8 cm to about 15 cm, about 9 cm to about 10 cm, about 9 cm to about 15 cm, or about 10 cm to about 15 cm. In some embodiments, the plastic object has a length of about 0.5 cm, about 1 cm, about 2 cm, about 3 cm, about 4 cm, about 5 cm, about 6 cm, about 7 cm, about 8 cm, about 9 cm, about 10 cm, or about 15 cm.

In some embodiments, the plastic object has a width of about 0.5 cm to about 15 cm. In some embodiments, the plastic object has a width of about 0.5 cm. In some embodiments, the plastic object has a width of about 15 cm. In some embodiments, the plastic object has a width of about 0.5 cm to about 1 cm, about 0.5 cm to about 2 cm, about 0.5 cm to about 3 cm, about 0.5 cm to about 4 cm, about 0.5 cm to about 5 cm, about 0.5 cm to about 6 cm, about 0.5 cm to about 7 cm, about 0.5 cm to about 8 cm, about 0.5 cm to about 9 cm, about 0.5 cm to about 10 cm, about 0.5 cm to about 15 cm, about 1 cm to about 2 cm, about 1 cm to about 3 cm, about 1 cm to about 4 cm, about 1 cm to about 5 cm, about 1 cm to about 6 cm, about 1 cm to about 7 cm, about 1 cm to about 8 cm, about 1 cm to about 9 cm, about 1 cm to about 10 cm, about 1 cm to about 15 cm, about 2 cm to about 3 cm, about 2 cm to about 4 cm, about 2 cm to about 5 cm, about 2 cm to about 6 cm, about 2 cm to about 7 cm, about 2 cm to about 8 cm, about 2 cm to about 9 cm, about 2 cm to about 10 cm, about 2 cm to about 15 cm, about 3 cm to about 4 cm, about 3 cm to about 5 cm, about 3 cm to about 6 cm, about 3 cm to about 7 cm, about 3 cm to about 8 cm, about 3 cm to about 9 cm, about 3 cm to about 10 cm, about 3 cm to about 15 cm, about 4 cm to about 5 cm, about 4 cm to about 6 cm, about 4 cm to about 7 cm, about 4 cm to about 8 cm, about 4 cm to about 9 cm, about 4 cm to about 10 cm, about 4 cm to about 15 cm, about 5 cm to about 6 cm, about 5 cm to about 7 cm, about 5 cm to about 8 cm, about 5 cm to about 9 cm, about 5 cm to about 10 cm, about 5 cm to about 15 cm, about 6 cm to about 7 cm, about 6 cm to about 8 cm, about 6 cm to about 9 cm, about 6 cm to about 10 cm, about 6 cm to about 15 cm, about 7 cm to about 8 cm, about 7 cm to about 9 cm, about 7 cm to about 10 cm, about 7 cm to about 15 cm, about 8 cm to about 9 cm, about 8 cm to about 10 cm, about 8 cm to about 15 cm, about 9 cm to about 10 cm, about 9 cm to about 15 cm, or about 10 cm to about 15 cm. In some embodiments, the plastic object has a width of about 0.5 cm, about 1 cm, about 2 cm, about 3 cm, about 4 cm, about 5 cm, about 6 cm, about 7 cm, about 8 cm, about 9 cm, about 10 cm, or about 15 cm.

In some embodiments, the plastic object has a height of about 0.5 cm to about 15 cm. In some embodiments, the plastic object has a height of about 0.5 cm. In some embodiments, the plastic object has a height of about 15 cm. In some embodiments, the plastic object has a height of about 0.5 cm to about 1 cm, about 0.5 cm to about 2 cm, about 0.5 cm to about 3 cm, about 0.5 cm to about 4 cm, about 0.5 cm to about 5 cm, about 0.5 cm to about 6 cm, about 0.5 cm to about 7 cm, about 0.5 cm to about 8 cm, about 0.5 cm to about 9 cm, about 0.5 cm to about 10 cm, about 0.5 cm to about 15 cm, about 1 cm to about 2 cm, about 1 cm to about 3 cm, about 1 cm to about 4 cm, about 1 cm to about 5 cm, about 1 cm to about 6 cm, about 1 cm to about 7 cm, about 1 cm to about 8 cm, about 1 cm to about 9 cm, about 1 cm to about 10 cm, about 1 cm to about 15 cm, about 2 cm to about 3 cm, about 2 cm to about 4 cm, about 2 cm to about 5 cm, about 2 cm to about 6 cm, about 2 cm to about 7 cm, about 2 cm to about 8 cm, about 2 cm to about 9 cm, about 2 cm to about 10 cm, about 2 cm to about 15 cm, about 3 cm to about 4 cm, about 3 cm to about 5 cm, about 3 cm to about 6 cm, about 3 cm to about 7 cm, about 3 cm to about 8 cm, about 3 cm to about 9 cm, about 3 cm to about 10 cm, about 3 cm to about 15 cm, about 4 cm to about 5 cm, about 4 cm to about 6 cm, about 4 cm to about 7 cm, about 4 cm to about 8 cm, about 4 cm to about 9 cm, about 4 cm to about 10 cm, about 4 cm to about 15 cm, about 5 cm to about 6 cm, about 5 cm to about 7 cm, about 5 cm to about 8 cm, about 5 cm to about 9 cm, about 5 cm to about 10 cm, about 5 cm to about 15 cm, about 6 cm to about 7 cm, about 6 cm to about 8 cm, about 6 cm to about 9 cm, about 6 cm to about 10 cm, about 6 cm to about 15 cm, about 7 cm to about 8 cm, about 7 cm to about 9 cm, about 7 cm to about 10 cm, about 7 cm to about 15 cm, about 8 cm to about 9 cm, about 8 cm to about 10 cm, about 8 cm to about 15 cm, about 9 cm to about 10 cm, about 9 cm to about 15 cm, or about 10 cm to about 15 cm. In some embodiments, the plastic object has a height of about 0.5 cm, about 1 cm, about 2 cm, about 3 cm, about 4 cm, about 5 cm, about 6 cm, about 7 cm, about 8 cm, about 9 cm, about 10 cm, or about 15 cm.

In some embodiments, the ferromagnetic element comprises a ferromagnetic ink composition. In some embodiments, the ferromagnetic ink composition is deposited in at least one layer. In some embodiments, a generic plastic object 100, which contains a ferromagnetic element 10, comprises a coating of a ferromagnetic ink 102, as shown in FIGS. 2A-D. In some embodiments, the coating of a ferromagnetic ink 102 imprinted on the surface of any plastic object, shown as 100 in FIG. 2A-D, comprises soft, ferromagnetic particles. In some embodiments, the soft, ferromagnetic particles have a coercivity lower than or equal to 1000 amperes per meter (A/m). Soft, ferromagnetic particles are typically characterized by high values of magnetic permeability (e.g., an initial permeability $\mu_a$ ranging from about $10^2$ to about $10^5$ and a maximum permeability $\mu_{max}$ ranging from about $10^3$ to about $10^6$), low coercivity (denoted as $H_C$, ranging from about 0.8 to about 8 A/m or ranging from about 0.01 to about 0.1 oersted), and low magnetic hysteresis losses per remagnetization cycle (ranging from about 1 to about $10^3$ joules per cubic meter ($m^3$), or from about $10$-$10^4$ ergs per cubic centimeter ($cm^3$)). In some embodiments, at temperatures below the Curie point such soft, ferromagnetic materials are magnetized spontaneously but do not manifest magnetic properties externally.

In some embodiments, the plastic object described in the present disclosure can be in a variety of form-factors. Examples of objects include but are not limited to single-use bottles, bottle caps, single-use coffee cups, plastic cutlery, plastic trays, clamshells, general food-service packaging including sandwich bags, grocery bags, and shrink sleeves. A shown in FIG. 1, the plastic object can be in the form a plastic bottle 20 with cap 22, a plastic cup 26 with lid 24, a plastic sachet 28, a plastic straw 30, or a plastic spoon 32. In some embodiments, each of these objects (i.e., 20, 22, 24, 26, 28, 30, and 32) contains the ferromagnetic element 10. In some embodiments, the ferromagnetic element 10 is an area imprinted with an ink or affixed with a pre-printed label containing ferromagnetic ink, which enables the separation of the desired object application of a magnetic field. A preferred embodiment of the present disclosure is a single usable plastic object which is less than 20 grams in weight or single usable plastic object which has is no bigger than 4 inches in any one dimension.

In some embodiments, the plastic object is a single-use bottle, a bottle cap, a single-use coffee cup, plastic cutlery, an eating utensil, a cutting utensil, a plastic tray, a plastic container, a food packaging container, a shrink sleeve, or any combination thereof. In some embodiments, the food packaging container is a deli container, a flat lid hinged container, a clamshell container, a mini cupcake container, a cupcake and/or muffin container, or a dome lid hinged container. In some embodiments, the plastic object is a square receptacle, a round receptacle, a rectangular receptacle, a cylindrical receptacle, or an octagonal receptacle. In some embodiments, the plastic object is a receptacle lid. In some embodiments, the plastic object is a straw. In some embodiments, the eating utensil is a plastic chopstick. In some embodiments, the eating utensil is a plastic stirrer stick. In some embodiments, the plastic cutlery is a plastic spoon, a plastic fork, a plastic knife, a plastic spork (i.e., a combination of a spoon and a fork), a plastic spife (i.e., a combination of a spoon and knife), a plastic knork (i.e., a combination of a knife and fork), a plastic sporf (i.e., a combination of a spoon, knife, and a fork), or any combination thereof. In some embodiments, the plastic object is a plastic lid. In some embodiments, the plastic object is a plastic coffee cup lid. In some embodiments, the plastic object is a plastic sachet. In some embodiments, the plastic object is a plastic cup. In some embodiments, the plastic object is a plastic cup holder.

In some embodiments, the plastic object 100 can comprise of a single or multiple plastic resins. Type of plastic resins can include but are not limited to low or high density polyethylene (LDPE, HDPE), biaxially-oriented polypropylene (BOPP), Polyethylene terephthalate (PET), polypropylene (PP) and compostable plastics such as polylactic acid (PLA). In some embodiments, the plastic object is a low density polyethylene (LDPE) object. In some embodiments, the plastic object is a high density polyethylene (HDPE) object. In some embodiments, the plastic object is a biaxially-oriented polypropylene (BOPP) object. In some embodiments, the plastic object is a polyethylene terephthalate (PET) object. In some embodiments, the plastic object is a polypropylene (PP) object. In some embodiments, the plastic object is a biodegradable plastic object. In some embodiments, the plastic object is a compostable plastic object. In some embodiments, the compostable plastic object is a polylactic acid (PLA) object. In some embodiments, the biodegradable plastic object is a polyhydroxyalkanoate (PHA) object, a polybutylene succinate (PBS) object, a polycaprolactone (PCL) object, a polyanhydride object, a polyvinyl alcohol (PVA) object, a cellulose ester object, or any combination thereof.

Ferromagnetic Labels

Figure 4A:
FIGS. 4A-B illustrate the process of heat transfer printing.
Figure 4B:
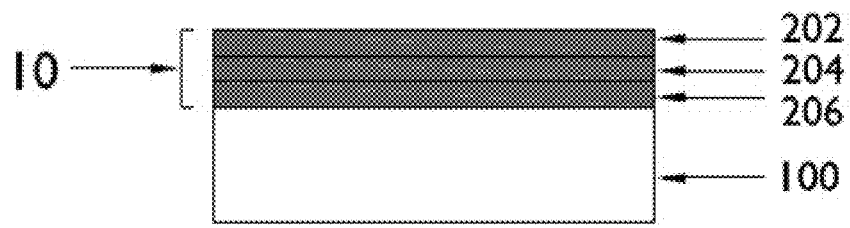

Another aspect of the present disclosure provides a ferromagnetic label, comprising: a ferromagnetic ink composition, a film, a release varnish, and an adhesive layer. FIG. 4A illustrates an example of a film 200 (e.g., a polyester film) comprising a ferromagnetic label 10. In some embodiments, the ferromagnetic label 10 comprises a release varnish 202, a ferromagnetic ink composition 204, and an adhesive layer 206, as shown in FIG. 4A. In another example, FIG. 4B illustrates a plastic object 100 comprising a ferromagnetic label 10. In this example, the ferromagnetic label 10 comprising a release varnish 202, a ferromagnetic ink composition 204, and an adhesive layer 206 is placed on the surface of the plastic object 100, as shown in FIG. 4B. In some embodiments, the three different layers (i.e., the release varnish 202, the ferromagnetic ink composition 204, and the adhesive layer 206) are deposited on the surface of the film 200 in the order shown in FIGS. 4A and 4B. In some embodiments, the three different layers are deposited on the surface of the film in the following order: a ferromagnetic ink composition, a release varnish, and an adhesive layer. In some embodiments, the ferromagnetic label comprises from about 1 layer of release varnish to about 10 layers of release varnish. In some embodiments, the ferromagnetic label comprises from about 1 adhesive layer to about 10 adhesive layers.

In some embodiments, the release varnish is SB-HT from Sungbo Inks or S-125B from Sungjin Inks. In some embodiments, the adhesive layer is SB-HT PP-1-A from Sungbo Inks or S-1042 from Sungjin Inks.

In some embodiments, the ferromagnetic ink composition is any ferromagnetic ink composition described elsewhere herein. In some embodiments, the ferromagnetic ink composition does not contaminate the underlying release layer and adhesive property of overlaying adhesive layer. In some embodiments, the ferromagnetic ink composition does not affect the release property of underlying release layer and adhesive property of overlaying adhesive layer.

In some embodiments, the ferromagnetic label comprises at least one layer of ferromagnetic ink composition. In some embodiments, the ferromagnetic label comprises at least two layers of ferromagnetic ink composition. In some embodiments, the ferromagnetic label comprises at least three layers of ferromagnetic ink composition. In some embodiments, the ferromagnetic label comprises at least four layers of ferromagnetic ink composition. In some embodiments, the ferromagnetic label comprises about five layers of ferromagnetic ink composition. In some embodiments, the ferromagnetic label comprises about six layers of ferromagnetic ink composition. In some embodiments, the ferromagnetic label comprises about seven layers of ferromagnetic ink composition. In some embodiments, the ferromagnetic label comprises about eight layers of ferromagnetic ink composition. In some embodiments, the ferromagnetic label comprises about ten layers of ferromagnetic ink composition.

In some embodiments, the ferromagnetic ink composition layers give aesthetic appeal to the label. In some embodiments, the ferromagnetic ink composition layers ensure label is ferromagnetic. In some embodiments, the ferromagnetic ink composition layers do not compromise the release property of underlying release varnish. In some embodiments, the ferromagnetic ink composition layers do not compromise the adhesive property of overlaying adhesive layer. In some embodiments, the ferromagnetic ink composition layers provide the functional characteristic of being ferromagnetic upon contact with a magnetic field.

In some embodiments, the ferromagnetic label comprises a ferromagnetic marker or a ferromagnetic element that is transferred onto an object (e.g., a plastic object) using heat transfer printing or hot foil stamping. In some embodiments, gravure printing is used during heat transfer printing. In some embodiments, gravure printing comprises printing of ferromagnetic ink composition layers on a film. In some embodiments, the film is a polyester film. Non-limiting examples of film material types that are used in ferromagnetic labels include polyvinylchloride, polypropylene, biaxially oriented polypropylene, low density polyethylene, and high density poly ethylene.

In some embodiments, the film has a thickness of about 15 micron (μm) to about 25 μm. In some embodiments, the film has a thickness of about 10 μm to about 25 μm. In some embodiments, the film has a thickness of about 10 μm. In some embodiments, the film has a thickness of about 25 μm. In some embodiments, the film has a thickness of about 10 μm to about 15 μm, about 10 μm to about 16 μm, about 10 μm to about 17 μm, about 10 μm to about 18 μm, about 10 μm to about 19 μm, about 10 μm to about 20 μm, about 10 μm to about 21 μm, about 10 μm to about 22 μm, about 10 μm to about 23 μm, about 10 μm to about 24 μm, about 10 μm to about 25 μm, about 15 μm to about 16 μm, about 15 μm to about 17 μm, about 15 μm to about 18 μm, about 15 μm to about 19 μm, about 15 μm to about 20 μm, about 15 μm to about 21 μm, about 15 μm to about 22 μm, about 15 μm to about 23 μm, about 15 μm to about 24 μm, about 15 μm to about 25 μm, about 16 μm to about 17 μm, about 16 μm to about 18 μm, about 16 μm to about 19 μm, about 16 μm to about 20 μm, about 16 μm to about 21 μm, about 16 μm to about 22 μm, about 16 μm to about 23 μm, about 16 μm to about 24 μm, about 16 μm to about 25 μm, about 17 μm to about 18 μm, about 17 μm to about 19 μm, about 17 μm to about 20 μm, about 17 μm to about 21 μm, about 17 μm to about 22 μm, about 17 μm to about 23 μm, about 17 μm to about 24 μm, about 17 μm to about 25 μm, about 18 μm to about 19 μm, about 18 μm to about 20 μm, about 18 μm to about 21 μm, about 18 μm to about 22 μm, about 18 μm to about 23 μm, about 18 μm to about 24 μm, about 18 μm to about 25 μm, about 19 μm to about 20 μm, about 19 μm to about 21 μm, about 19 μm to about 22 μm, about 19 μm to about 23 μm, about 19 μm to about 24 μm, about 19 μm to about 25 μm, about 20 μm to about 21 μm, about 20 μm to about 22 μm, about 20 μm to about 23 μm, about 20 μm to about 24 μm, about 20 μm to about 25 μm, about 21 μm to about 22 μm, about 21 μm to about 23 μm, about 21 μm to about 24 μm, about 21 μm to about 25 μm, about 22 μm to about 23 μm, about 22 μm to about 24 μm, about 22 μm to about 25 μm, about 23 μm to about 24 μm, about 23 μm to about 25 μm, or about 24 μm to about 25 μm. In some embodiments, the film has a thickness of about 10 μm, about 15 μm, about 16 μm, about 17 μm, about 18 μm, about 19 μm, about 20 μm, about 21 μm, about 22 μm, about 23 μm, about 24 μm, or about 25 μm.

In some embodiments, the release varnish facilitates release of ferromagnetic ink composition layers. In some embodiments, the function of the release varnish is to help in the release of subsequent printed layers during transfer process. In some embodiments, the ferromagnetic label is transferred to a material upon application of heat and/or pressure. In some embodiments, the ferromagnetic label is mechanically affixed on a surface of the plastic object. In some embodiments, the ferromagnetic label is transferred onto a plastic object using heat transfer printing or hot foil stamping. In some embodiments, the function of the release varnish is to help in the release of subsequent printed layers during application of heat and pressure. In some embodiments, upon completion of the transfer process, the release varnish acts a protective layer to underlying layers.

In some embodiments, the adhesive layer adheres to a material. In some embodiments, the material is a plastic object and/or a metal object. In some embodiments, the material is any of the plastic objects described supra. In some embodiments, the adhesive layer activates upon application of heat and pressure during transfer process (i.e., during the transfer of the ferromagnetic label to the surface of an object). In some embodiments, the adhesive layer forms a strong bond with the surface of the object (e.g., a plastic object). In some embodiments, after the transfer process (i.e., after the ferromagnetic label has been transferred to the surface of an object) the adhesive layer acts as an anchor layer between the surface of the object and the overlaying ferromagnetic ink composition plus the release varnish.

In some embodiments, the ferromagnetic ink composition is suitable for flexographic printing, gravure printing, intaglio printing, pad printing, screen printing, offset printing, or any combination thereof. In some embodiments, the ferromagnetic label comprises a surface modification. In some embodiments, the surface modification comprises at least one microwell or a saw tooth design. In some embodiments, the microwell or the saw tooth design increase a printable surface area of the label.

In some embodiments, the ferromagnetic label has a sufficient magnetic strength suitable for a magnet-induced separation process. In some embodiments, the magnet-induced separation process occurs at a Materials Recovery Facility (MRF).

Methods

Figure 5:
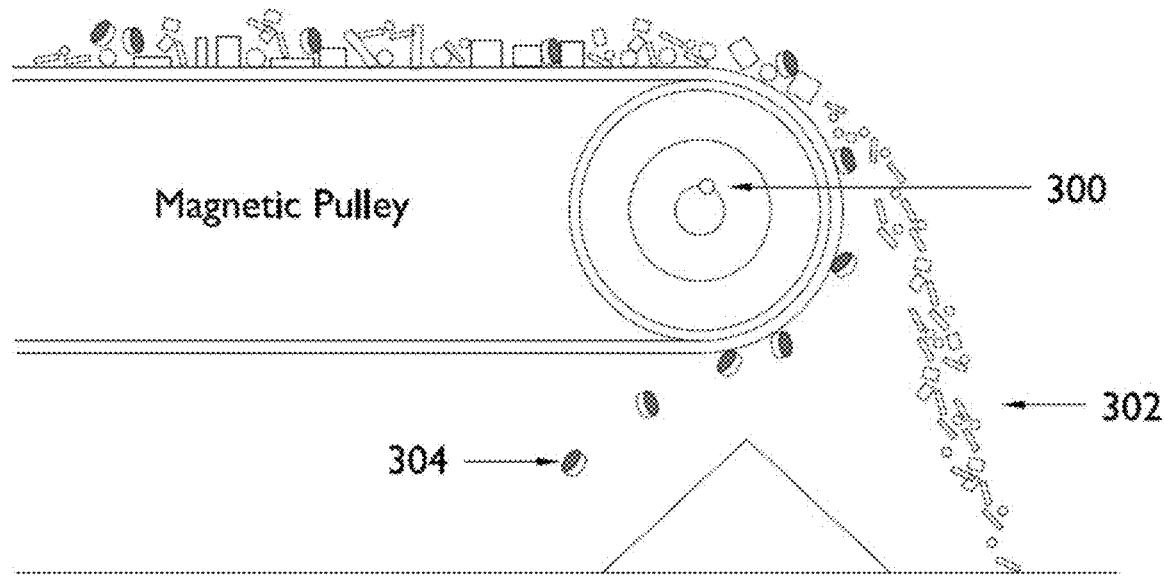
FIG. 5 illustrates a plastic object comprising the ferromagnetic label was separated using a commercial magnetic separator

Another aspect of the present disclosure provides for a method of sorting a mixed stream of objects, comprising providing a mixed stream of objects that comprises at least one non-metallic object comprising a ferromagnetic material deposited thereupon, and at least one object not comprising a ferromagnetic or magnetic component. In some embodiments, the mixed stream of objects is a mixed waste stream. In some embodiments, the non-metallic object is a plastic object. In some embodiments, the non-metallic object is any plastic object described supra. For example, in some embodiments, the plastic object is a single-use bottle, a bottle cap, a single-use coffee cup, plastic cutlery, an eating utensil, a cutting utensil, a plastic tray, a plastic container, a food packaging container, a shrink sleeve, or any combination thereof. In some embodiments, the non-metallic object is less than about 20 grams in weight. In other examples, the method of sorting a mixed stream of objects is illustrated in FIG. 5. FIG. 5 shows a mixed stream of objects, i.e., 28 millimeter (mm) "Alaska" bottle caps comprising the ferromagnetic label mixed with 28 millimeter (mm) "Alaska" bottle caps not comprising the ferromagnetic label. In this example, the bottle caps comprising the ferromagnetic label were separated from the mixed stream of objects using a commercial magnetic separator.

In some embodiments, the non-metallic object has a weight ranging from about 1 gram to about 20 grams. In some embodiments, the non-metallic object has a weight ranging from about 1 gram. In some embodiments, the non-metallic object has a weight ranging from about 20 grams. In some embodiments, the non-metallic object has a weight ranging from about 1 gram to about 2 grams, about 1 gram to about 3 grams, about 1 gram to about 4 grams, about 1 gram to about 5 grams, about 1 gram to about 6 grams, about 1 gram to about 7 grams, about 1 gram to about 8 grams, about 1 gram to about 9 grams, about 1 gram to about 10 grams, about 1 gram to about 15 grams, about 1 gram to about 20 grams, about 2 grams to about 3 grams, about 2 grams to about 4 grams, about 2 grams to about 5 grams, about 2 grams to about 6 grams, about 2 grams to about 7 grams, about 2 grams to about 8 grams, about 2 grams to about 9 grams, about 2 grams to about 10 grams, about 2 grams to about 15 grams, about 2 grams to about 20 grams, about 3 grams to about 4 grams, about 3 grams to about 5 grams, about 3 grams to about 6 grams, about 3 grams to about 7 grams, about 3 grams to about 8 grams, about 3 grams to about 9 grams, about 3 grams to about 10 grams, about 3 grams to about 15 grams, about 3 grams to about 20 grams, about 4 grams to about 5 grams, about 4 grams to about 6 grams, about 4 grams to about 7 grams, about 4 grams to about 8 grams, about 4 grams to about 9 grams, about 4 grams to about 10 grams, about 4 grams to about 15 grams, about 4 grams to about 20 grams, about 5 grams to about 6 grams, about 5 grams to about 7 grams, about 5 grams to about 8 grams, about 5 grams to about 9 grams, about 5 grams to about 10 grams, about 5 grams to about 15 grams, about 5 grams to about 20 grams, about 6 grams to about 7 grams, about 6 grams to about 8 grams, about 6 grams to about 9 grams, about 6 grams to about 10 grams, about 6 grams to about 15 grams, about 6 grams to about 20 grams, about 7 grams to about 8 grams, about 7 grams to about 9 grams, about 7 grams to about 10 grams, about 7 grams to about 15 grams, about 7 grams to about 20 grams, about 8 grams to about 9 grams, about 8 grams to about 10 grams, about 8 grams to about 15 grams, about 8 grams to about 20 grams, about 9 grams to about 10 grams, about 9 grams to about 15 grams, about 9 grams to about 20 grams, about 10 grams to about 15 grams, about 10 grams to about 20 grams, or about 15 grams to about 20 grams. In some embodiments, the non-metallic object has a weight ranging from about 1 gram, about 2 grams, about 3 grams, about 4 grams, about 5 grams, about 6 grams, about 7 grams, about 8 grams, about 9 grams, about 10 grams, about 15 grams, or about 20 grams.

In some embodiments, the ferromagnetic material does not retain its magnetic properties upon the absence of an applied magnetic field. In some embodiments, the ferromagnetic material activates its magnetic properties upon the presence of an applied magnetic field. In some embodiments, the ferromagnetic material is a ferromagnetic ink composition (i.e., any ferromagnetic ink compositions described supra). In some embodiments, the ferromagnetic material is a ferromagnetic label (i.e., any ferromagnetic labels described supra). In some embodiments, the ferromagnetic material is a ferromagnetic element 10 (i.e., any ferromagnetic elements described supra).

Next, the method comprises contacting the stream of objects to a magnetic field. In some embodiments, the magnetic field is produced by a commercial drum-type separator, an over-band magnetic separator, a magnetic head pulley or a combination thereof.

In some embodiments, the magnetic field has a magnetic flux density ranging from about 3000 gauss (G) to about 12,000 G. In some embodiments, the magnetic field does not have a magnetic flux density ranging from about 1 gauss to about 2999 gauss. In some embodiments, the magnetic field has a magnetic flux density of 7000 gauss. In some embodiments, the magnetic field has a magnetic flux density ranging from about 3,000 gauss to about 12,000 gauss. In some embodiments, the magnetic field has a magnetic flux density ranging from about 3,000 gauss. In some embodiments, the magnetic field has a magnetic flux density ranging from about 12,000 gauss. In some embodiments, the magnetic field has a magnetic flux density ranging from about 3,000 gauss to about 4,000 gauss, about 3,000 gauss to about 5,000 gauss, about 3,000 gauss to about 6,000 gauss, about 3,000 gauss to about 7,000 gauss, about 3,000 gauss to about 8,000 gauss, about 3,000 gauss to about 9,000 gauss, about 3,000 gauss to about 10,000 gauss, about 3,000 gauss to about 11,000 gauss, about 3,000 gauss to about 12,000 gauss, about 4,000 gauss to about 5,000 gauss, about 4,000 gauss to about 6,000 gauss, about 4,000 gauss to about 7,000 gauss, about 4,000 gauss to about 8,000 gauss, about 4,000 gauss to about 9,000 gauss, about 4,000 gauss to about 10,000 gauss, about 4,000 gauss to about 11,000 gauss, about 4,000 gauss to about 12,000 gauss, about 5,000 gauss to about 6,000 gauss, about 5,000 gauss to about 7,000 gauss, about 5,000 gauss to about 8,000 gauss, about 5,000 gauss to about 9,000 gauss, about 5,000 gauss to about 10,000 gauss, about 5,000 gauss to about 11,000 gauss, about 5,000 gauss to about 12,000 gauss, about 6,000 gauss to about 7,000 gauss, about 6,000 gauss to about 8,000 gauss, about 6,000 gauss to about 9,000 gauss, about 6,000 gauss to about 10,000 gauss, about 6,000 gauss to about 11,000 gauss, about 6,000 gauss to about 12,000 gauss, about 7,000 gauss to about 8,000 gauss, about 7,000 gauss to about 9,000 gauss, about 7,000 gauss to about 10,000 gauss, about 7,000 gauss to about 11,000 gauss, about 7,000 gauss to about 12,000 gauss, about 8,000 gauss to about 9,000 gauss, about 8,000 gauss to about 10,000 gauss, about 8,000 gauss to about 11,000 gauss, about 8,000 gauss to about 12,000 gauss, about 9,000 gauss to about 10,000 gauss, about 9,000 gauss to about 11,000 gauss, about 9,000 gauss to about 12,000 gauss, about 10,000 gauss to about 11,000 gauss, about 10,000 gauss to about 12,000 gauss, or about 11,000 gauss to about 12,000 gauss. In some embodiments, the magnetic field has a magnetic flux density ranging from about 3,000 gauss, about 4,000 gauss, about 5,000 gauss, about 6,000 gauss, about 7,000 gauss, about 8,000 gauss, about 9,000 gauss, about 10,000 gauss, about 11,000 gauss, or about 12,000 gauss.

Next, the method comprises separating the at least one non-metallic object comprising a ferromagnetic material deposited thereupon from the mixed stream of objects based on attraction of the at least one non-metallic object comprising a ferromagnetic material deposited thereupon to the magnetic field. In some embodiments, a commercial magnetic separator like an overband magnet, a drum separator, or a magnetic head pulley attracts the non-metallic object comprising the ferromagnetic material and thus, segregates the non-metallic object from the at least one object not comprising a ferromagnetic or magnetic component. In some embodiments, the magnetizability of the ferromagnetic label is tuned to ensure that magnetic separators with weak magnetic fields (i.e., magnetic fields weaker than 3000 gauss, which are used for segregation of metals in commercial MRFs) do not affect the non-metallic object comprising a ferromagnetic material deposited thereupon. In some embodiments, the non-metallic object comprising a ferromagnetic material is not sorted with a metal waste stream in commercial MRFs.

In some embodiments, the method comprises the separation of a non-metallic object comprising a ferromagnetic material deposited thereupon from a mixed waste stream. In some embodiments, the mixed waste stream is provided in a commercial single stream recycling facility (i.e., a materials recovery facility (MRF)). In some embodiments, a single stream MRF receives mixed waste comprising glass, plastic, metals (both magnetic and non-magnetic), cardboard, and paper. In some embodiments, the at least one object not comprising a ferromagnetic or magnetic component is glass, plastic, metals (both magnetic and non-magnetic), cardboard, and paper. In some embodiments, the MRFs use various techniques like size exclusion, density based separation, air/vacuum, and magnetic separation to sort and segregate the mixed waste into separate pure streams which are then sold for recycling. In some embodiments, small plastic items are not sorted cleanly and end up contaminating various waste streams like glass, paper, and cardboard depending on the weight and form factor of the plastic product. The present disclosure addresses this problem by enabling easy sorting of small plastic products by imprinting or attaching a ferromagnetic material (e.g., a ferromagnetic label, as described supra).

Another aspect of the present disclosure provides for a method comprising contacting a composition (e.g., any of the compositions described elsewhere herein) with a magnetic field of a predetermined intensity for a predetermined time, sufficient to separate the ferromagnetic plastic object the composition. In some embodiments, the intensity of the magnetic field is referred to the magnetic flux density. In some embodiments, magnetic field has a magnetic flux density ranging from about 3000 gauss (G) to about 12,000 G. In some embodiments, the predetermined time in which the composition is contacted with a magnetic field ranges from about 1 second to about 10 minutes. In some embodiments, the predetermined time in which the composition is contacted with a magnetic field is about 10 seconds. In some embodiments, the predetermined time in which the composition is contacted with a magnetic field is about 30 seconds. In some embodiments, the predetermined time in which the composition is contacted with a magnetic field is about 60 seconds.

In some embodiments, the magnetic field is produced by a commercial drum-type separator, an over-band magnetic separator, a magnetic head pulley or a combination thereof.

Another aspect of the present disclosure provides for a method of printing a ferromagnetic ink composition onto a substrate, the method comprising: a) providing the substrate, wherein at least one surface of the substrate is a plastic surface comprising a surface modification; and b) depositing the ferromagnetic ink composition on the modified surface; wherein the ferromagnetic ink composition is safe for a food contact substance.

In some embodiments, the ferromagnetic ink composition is any ferromagnetic ink composition as described elsewhere herein. In some embodiments, the ferromagnetic ink composition further comprises a colored pigment. In some embodiments, the substrate is a plastic object. In some embodiments, the plastic object is a single-use bottle, a bottle cap, a single-use coffee cup, plastic cutlery, an eating utensil, a cutting utensil, a plastic tray, a plastic container, a food packaging container, a shrink sleeve, or any combination thereof. In some embodiments, the substrate is a label or a film. In some embodiments, the substrate is a ferromagnetic label described elsewhere herein. In some embodiments, the substrate is a polymeric film. In some embodiments, the substrate is a film as described elsewhere herein. In some embodiments, the surface modification is at least one microwell. In some embodiments, the surface modification is at least one a saw tooth design. In some embodiments, the surface modification increases a printable surface area of the at least one surface. In some embodiments, the surface modification is done via extrusion molding. In some embodiments, the surface modification is done via injection molding. For example, in some cases, the plastic object can be manufactured via injection molding or extrusion molding. During the manufacturing process, an insert comprising the surface modification can be inserted into the mold used during the injection molding or extrusion molding processes, thereby producing a plastic object comprising the surface modification.

In another aspect, the present disclosure provides for a method fabricating a ferromagnetic plastic object, the method comprising: a) printing a ferromagnetic ink composition on a surface of a film; and b) transferring the film onto a surface of a non-ferromagnetic plastic object to produce the ferromagnetic plastic object; wherein the ferromagnetic ink composition is a food contact substance.

In some embodiments, the method comprises intaglio printing. In some embodiments, the method comprises gravure printing. For example, in some embodiments, printing of the ferromagnetic ink composition on a surface of a film is achieved by using intaglio printing. In other cases, printing of the ferromagnetic ink composition on a surface of a film is achieved by using gravure printing. In some embodiments, the ferromagnetic ink composition is directly printed onto the plastic object. In some embodiments, the ferromagnetic ink composition is mixed with a plastic object precursor material prior to generating the plastic object. For example, the ferromagnetic ink composition is added to the plastic object precursor material, mixed, and deposited into a mold to be used in either extrusion molding or injection molding processes, thereby generating a ferromagnetic plastic object. In this case, the ferromagnetic plastic object does not comprise a ferromagnetic label or a film because the ferromagnetic material is incorporated with the plastic object precursor material.

In some embodiments, the film is a synthetic resin or a plastic. In some embodiments, the film is a polyester film. In some embodiments, the film comprises a surface modification. In some embodiments, the surface modification is at least one microwell. In some embodiments, the surface modification is at least one a saw tooth design. In some embodiments, the surface modification increases a printable surface area of the surface of the film. In some embodiments, the surface modification is generated as described elsewhere herein.

In some embodiments, the method further comprises printing a release varnish onto the surface of the film. In some embodiments, the release varnish facilitates release of at least one ferromagnetic ink composition layer. In some embodiments, the method further comprises printing an adhesive onto the surface of the film. In some embodiments, the adhesive adheres the film onto the surface of the non-ferromagnetic plastic object. In some embodiments, the method comprises transferring the film by the application of heat and/or pressure. In some embodiments, the method comprises transferring the film by using heat transfer printing or hot foil stamping. In some embodiments, the ferromagnetic plastic object is a single-use bottle, a bottle cap, a single-use coffee cup, plastic cutlery, an eating utensil, a cutting utensil, a plastic tray, a plastic container, a food packaging container, a shrink sleeve, or any combination thereof.

Systems

Another aspect of the present disclosure provides systems for fabricating a ferromagnetic plastic object. In some embodiments, the ferromagnetic plastic object is a single-use bottle, a bottle cap, a single-use coffee cup, plastic cutlery, an eating utensil, a cutting utensil, a plastic tray, a plastic container, a food packaging container, a shrink sleeve, or any combination thereof. In some embodiments, the system comprises a non-ferromagnetic plastic object. In some embodiments, the non-ferromagnetic plastic object is a single-use bottle, a bottle cap, a single-use coffee cup, plastic cutlery, an eating utensil, a cutting utensil, a plastic tray, a plastic container, a food packaging container, a shrink sleeve, or any combination thereof. In some embodiments, the ferromagnetic or non-ferromagnetic plastic object is a plastic object as described elsewhere herein.

In some embodiments, the system comprises a film. In some embodiments, the film is a synthetic resin or a plastic. In some embodiments, the film is a polyester film. In some embodiments, the film comprises a surface modification. In some embodiments, the surface modification is at least one microwell. In some embodiments, the surface modification is at least one a saw tooth design. In some embodiments, the surface modification increases a printable surface area of the surface of the film. In some embodiments, the film comprises a release varnish. In some embodiments, the release varnish facilitates release of at least one ferromagnetic ink composition layer. In some embodiments, the film comprises at least one layer of ferromagnetic ink composition. In some embodiments, the film comprises an adhesive layer. In some embodiments, the adhesive layer adheres the film onto the surface of the non-ferromagnetic plastic object. In some embodiments, the film is a film as described elsewhere herein.

In some embodiments, the system comprises a ferromagnetic ink composition. In some embodiments, ferromagnetic ink composition is a food contact substance. In some embodiments, ferromagnetic ink composition is a ferromagnetic ink composition as described elsewhere herein. In some embodiments, the system comprises a modular marker transfer station. In some embodiments, the modular marker transfer station comprises a hot foil stamping device. In some embodiments, the modular marker transfer station comprises a stamping block attachment for printing onto a plastic object (e.g., a cutlery stem). In some embodiments, the modular marker transfer station comprises a stamping block attachment for printing onto a flat surface (e.g., a bottle cap). In some embodiments, the modular marker transfer station comprises a blow-molded bottle stamping attachment. In some embodiments, the modular marker transfer station comprises a blow-molded cup stamping attachment. In some embodiments, the modular marker transfer station comprises a black mark sensor for heat transfer foils. In some embodiments, the modular marker transfer station comprises a hologram sensor for hologram foil. In some embodiments, the modular marker transfer station comprises a numerator attachment with pneumatic actuation system for serial numbering. In some embodiments, the modular marker transfer station comprises an automated part loading system.

In some embodiments, the stamping block attachment has a length of about 150 mm and a width of about 200 mm. In some embodiments, the stamping block attachment has a length of about 200 mm and a width of about 150 mm.

In some embodiments, the stamping block attachment has a length of about 10 mm to about 200 mm. In some embodiments, the stamping block attachment has a length of about 10 mm. In some embodiments, the stamping block attachment has a length of about 200 mm. In some embodiments, the stamping block attachment has a length of about 10 mm to about 25 mm, about 10 mm to about 50 mm, about 10 mm to about 75 mm, about 10 mm to about 100 mm, about 10 mm to about 150 mm, about 10 mm to about 175 mm, about 10 mm to about 200 mm, about 25 mm to about 50 mm, about 25 mm to about 75 mm, about 25 mm to about 100 mm, about 25 mm to about 150 mm, about 25 mm to about 175 mm, about 25 mm to about 200 mm, about 50 mm to about 75 mm, about 50 mm to about 100 mm, about 50 mm to about 150 mm, about 50 mm to about 175 mm, about 50 mm to about 200 mm, about 75 mm to about 100 mm, about 75 mm to about 150 mm, about 75 mm to about 175 mm, about 75 mm to about 200 mm, about 100 mm to about 150 mm, about 100 mm to about 175 mm, about 100 mm to about 200 mm, about 150 mm to about 175 mm, about 150 mm to about 200 mm, or about 175 mm to about 200 mm. In some embodiments, the stamping block attachment has a length of about 10 mm, about 25 mm, about 50 mm, about 75 mm, about 100 mm, about 150 mm, about 175 mm, or about 200 mm.

In some embodiments, the stamping block attachment has a width of about 10 mm to about 200 mm. In some embodiments, the stamping block attachment has a width of about 10 mm. In some embodiments, the stamping block attachment has a width of about 200 mm. In some embodiments, the stamping block attachment has a width of about 10 mm to about 25 mm, about 10 mm to about 50 mm, about 10 mm to about 75 mm, about 10 mm to about 100 mm, about 10 mm to about 150 mm, about 10 mm to about 175 mm, about 10 mm to about 200 mm, about 25 mm to about 50 mm, about 25 mm to about 75 mm, about 25 mm to about 100 mm, about 25 mm to about 150 mm, about 25 mm to about 175 mm, about 25 mm to about 200 mm, about 50 mm to about 75 mm, about 50 mm to about 100 mm, about 50 mm to about 150 mm, about 50 mm to about 175 mm, about 50 mm to about 200 mm, about 75 mm to about 100 mm, about 75 mm to about 150 mm, about 75 mm to about 175 mm, about 75 mm to about 200 mm, about 100 mm to about 150 mm, about 100 mm to about 175 mm, about 100 mm to about 200 mm, about 150 mm to about 175 mm, about 150 mm to about 200 mm, or about 175 mm to about 200 mm. In some embodiments, the stamping block attachment has a width of about 10 mm, about 25 mm, about 50 mm, about 75 mm, about 100 mm, about 150 mm, about 175 mm, or about 200 mm.

In some embodiments, the modular marker transfer station prints onto different types of surfaces by changing the stamping block attachment on the device to suit the object onto which the label is to be transferred. In some embodiments, the stamping block attachment is used for stamping on a variety of objects. In some embodiments, the object is flat. In some embodiments, the object is not flat. Non-limiting examples of objects that are stamped on with the stamping block attachment include stems of plastic cutlery, small bottles, bottle caps, cups, pens, toothbrush handles, and other small flat and round articles.

In some embodiments, the object to be printed on has a height of about 200 mm at most. In some embodiments, the object to be printed on has a height of about 10 mm to about 200 mm. In some embodiments, the object to be printed on has a height of about 10 mm. In some embodiments, the object to be printed on has a height of about 200 mm. In some embodiments, the object to be printed on has a height of about 10 mm to about 25 mm, about 10 mm to about 50 mm, about 10 mm to about 75 mm, about 10 mm to about 100 mm, about 10 mm to about 150 mm, about 10 mm to about 175 mm, about 10 mm to about 200 mm, about 25 mm to about 50 mm, about 25 mm to about 75 mm, about 25 mm to about 100 mm, about 25 mm to about 150 mm, about 25 mm to about 175 mm, about 25 mm to about 200 mm, about 50 mm to about 75 mm, about 50 mm to about 100 mm, about 50 mm to about 150 mm, about 50 mm to about 175 mm, about 50 mm to about 200 mm, about 75 mm to about 100 mm, about 75 mm to about 150 mm, about 75 mm to about 175 mm, about 75 mm to about 200 mm, about 100 mm to about 150 mm, about 100 mm to about 175 mm, about 100 mm to about 200 mm, about 150 mm to about 175 mm, about 150 mm to about 200 mm, or about 175 mm to about 200 mm. In some embodiments, the object to be printed on has a height of about 10 mm, about 25 mm, about 50 mm, about 75 mm, about 100 mm, about 150 mm, about 175 mm, or about 200 mm.

In some embodiments, the width of the heat transfer foil is about 10 mm to about 150 mm. In some embodiments, the width of the heat transfer foil is about 10 mm. In some embodiments, the width of the heat transfer foil is about 150 mm. In some embodiments, the width of the heat transfer foil is about 10 mm to about 25 mm, about 10 mm to about 50 mm, about 10 mm to about 75 mm, about 10 mm to about 100 mm, about 10 mm to about 150 mm, about 25 mm to about 50 mm, about 25 mm to about 75 mm, about 25 mm to about 100 mm, about 25 mm to about 150 mm, about 50 mm to about 75 mm, about 50 mm to about 100 mm, about 50 mm to about 150 mm, about 75 mm to about 100 mm, about 75 mm to about 150 mm, or about 100 mm to about 150 mm. In some embodiments, the width of the heat transfer foil is about 10 mm, about 25 mm, about 50 mm, about 75 mm, about 100 mm, or about 150 mm.

In some embodiments, the system comprises a computing device comprising a processor operatively coupled to the modular marker transfer station, and a non-transitory computer readable storage medium with a computer program including instructions executable by the processor causing the processor to direct the modular marker transfer station. In some embodiments, the modular marker transfer station prints a ferromagnetic ink composition onto a surface of a film. In some embodiments, the modular marker transfer station prints a ferromagnetic ink composition onto a surface of a plastic object. In some embodiments, the modular marker transfer station prints a ferromagnetic ink composition onto a surface of a non-ferromagnetic plastic object. In some embodiments, the modular marker transfer station performs high throughput manufacturing of ferromagnetic labels and/or ferromagnetic plastic objects. In some embodiments, the modular marker transfer station generates surface modifications on the surface of plastic objects and/or labels. In some embodiments, the modular marker transfer station uses intaglio printing methods to transfer a label comprising a ferromagnetic ink onto the surface of a plastic object. In some embodiments, the intaglio printing methods comprise gravure printing methods. In some embodiments, the modular marker transfer station applies heat and/or pressure to transfer a label comprising a ferromagnetic ink onto the surface of a plastic object.

In some embodiments, the modular marker transfer station applies a temperature of about 130 degrees Celsius (C) to about 180 degrees C. to transfer a ferromagnetic label onto an object. In some embodiments, the modular marker transfer station applies a temperature of about 130 degrees C. to transfer a ferromagnetic label onto an object. In some embodiments, the modular marker transfer station applies a temperature of about 180 degrees C. to transfer a ferromagnetic label onto an object. In some embodiments, the modular marker transfer station applies a temperature of about 130 degrees C. to about 135 degrees C., about 130 degrees C. to about 140 degrees C., about 130 degrees C. to about 145 degrees C., about 130 degrees C. to about 150 degrees C., about 130 degrees C. to about 155 degrees C., about 130 degrees C. to about 160 degrees C., about 130 degrees C. to about 165 degrees C., about 130 degrees C. to about 170 degrees C., about 130 degrees C. to about 175 degrees C., about 130 degrees C. to about 180 degrees C., about 135 degrees C. to about 140 degrees C., about 135 degrees C. to about 145 degrees C., about 135 degrees C. to about 150 degrees C., about 135 degrees C. to about 155 degrees C., about 135 degrees C. to about 160 degrees C., about 135 degrees C. to about 165 degrees C., about 135 degrees C. to about 170 degrees C., about 135 degrees C. to about 175 degrees C., about 135 degrees C. to about 180 degrees C., about 140 degrees C. to about 145 degrees C., about 140 degrees C. to about 150 degrees C., about 140 degrees C. to about 155 degrees C., about 140 degrees C. to about 160 degrees C., about 140 degrees C. to about 165 degrees C., about 140 degrees C. to about 170 degrees C., about 140 degrees C. to about 175 degrees C., about 140 degrees C. to about 180 degrees C., about 145 degrees C. to about 150 degrees C., about 145 degrees C. to about 155 degrees C., about 145 degrees C. to about 160 degrees C., about 145 degrees C. to about 165 degrees C., about 145 degrees C. to about 170 degrees C., about 145 degrees C. to about 175 degrees C., about 145 degrees C. to about 180 degrees C., about 150 degrees C. to about 155 degrees C., about 150 degrees C. to about 160 degrees C., about 150 degrees C. to about 165 degrees C., about 150 degrees C. to about 170 degrees C., about 150 degrees C. to about 175 degrees C., about 150 degrees C. to about 180 degrees C., about 155 degrees C. to about 160 degrees C., about 155 degrees C. to about 165 degrees C., about 155 degrees C. to about 170 degrees C., about 155 degrees C. to about 175 degrees C., about 155 degrees C. to about 180 degrees C., about 160 degrees C. to about 165 degrees C., about 160 degrees C. to about 170 degrees C., about 160 degrees C. to about 175 degrees C., about 160 degrees C. to about 180 degrees C., about 165 degrees C. to about 170 degrees C., about 165 degrees C. to about 175 degrees C., about 165 degrees C. to about 180 degrees C., about 170 degrees C. to about 175 degrees C., about 170 degrees C. to about 180 degrees C., or about 175 degrees C. to about 180 degrees C. to transfer a ferromagnetic label onto an object. In some embodiments, the modular marker transfer station applies a temperature of about 130 degrees C., about 135 degrees C., about 140 degrees C., about 145 degrees C., about 150 degrees C., about 155 degrees C., about 160 degrees C., about 165 degrees C., about 170 degrees C., about 175 degrees C., or about 180 degrees C. to transfer a ferromagnetic label onto an object.

In some embodiments, the modular marker transfer station applies a pressure of about 1.5 bar to about 5 bar to transfer a ferromagnetic label onto an object. In some embodiments, the modular marker transfer station applies a pressure of about 1.5 bar to transfer a ferromagnetic label onto an object. In some embodiments, the modular marker transfer station applies a pressure of about 5 bar to transfer a ferromagnetic label onto an object. In some embodiments, the modular marker transfer station applies a pressure of about 1.5 bar to about 2 bar, about 1.5 bar to about 2.5 bar, about 1.5 bar to about 3 bar, about 1.5 bar to about 3.5 bar, about 1.5 bar to about 4 bar, about 1.5 bar to about 4.5 bar, about 1.5 bar to about 5 bar, about 2 bar to about 2.5 bar, about 2 bar to about 3 bar, about 2 bar to about 3.5 bar, about 2 bar to about 4 bar, about 2 bar to about 4.5 bar, about 2 bar to about 5 bar, about 2.5 bar to about 3 bar, about 2.5 bar to about 3.5 bar, about 2.5 bar to about 4 bar, about 2.5 bar to about 4.5 bar, about 2.5 bar to about 5 bar, about 3 bar to about 3.5 bar, about 3 bar to about 4 bar, about 3 bar to about 4.5 bar, about 3 bar to about 5 bar, about 3.5 bar to about 4 bar, about 3.5 bar to about 4.5 bar, about 3.5 bar to about 5 bar, about 4 bar to about 4.5 bar, about 4 bar to about 5 bar, or about 4.5 bar to about 5 bar to transfer a ferromagnetic label onto an object. In some embodiments, the modular marker transfer station applies a pressure of about 1.5 bar, about 2 bar, about 2.5 bar, about 3 bar, about 3.5 bar, about 4 bar, about 4.5 bar, or about 5 bar to transfer a ferromagnetic label onto an object.

Computer Control Systems

Figure 3:
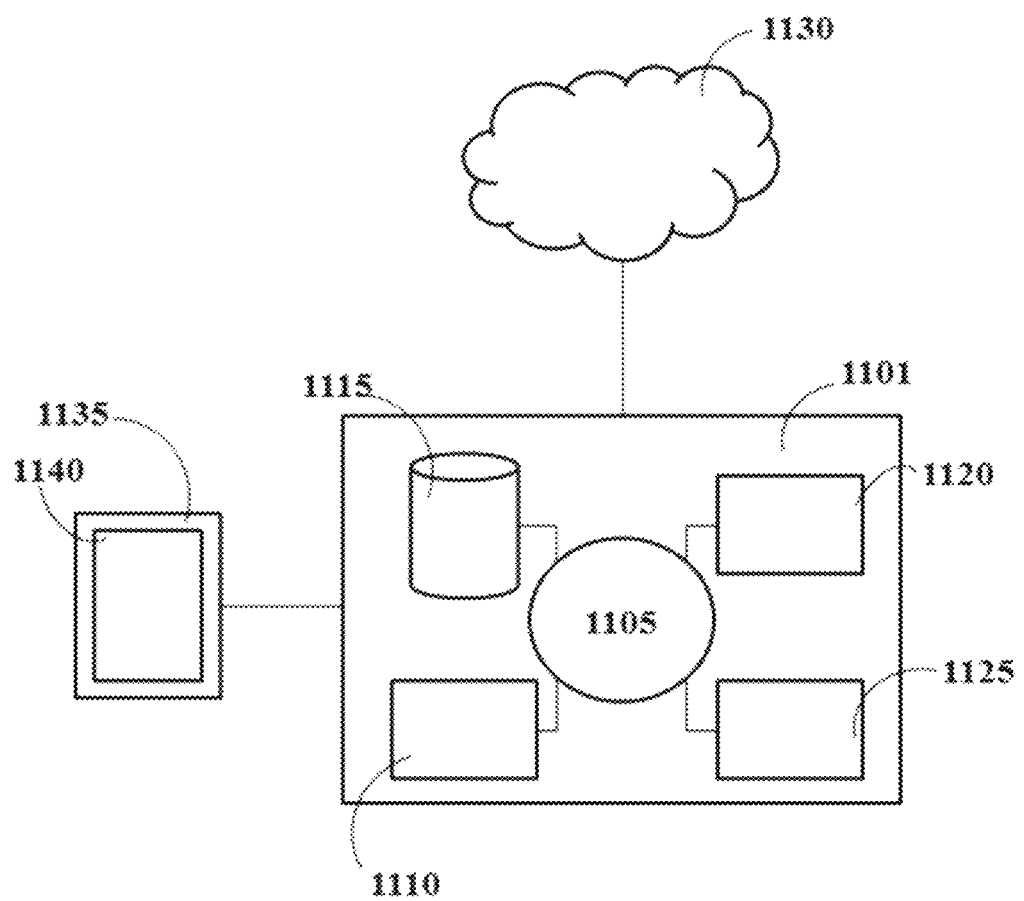
FIG. 3 illustrates a computer control system that is programmed or otherwise configured to implement methods provided herein.

The present disclosure provides computer control systems that are programmed to implement methods of the disclosure. FIG. 3 shows a computer system 1101 that is programmed or otherwise configured to direct a modular marker transfer station, manufacture a ferromagnetic plastic object, and/or sort a non-metallic object comprising a ferromagnetic material deposited thereupon from a mixed stream of objects. The computer system 1101 can regulate various aspects of manufacturing and sorting such as printing a ferromagnetic material onto a surface of a plastic object, regulating the application of a magnetic field, controlling the magnetic field strength, and/or directing the segregated non-metallic objects to a different stream of objects. The computer system 1101 can be an electronic device of a user or a computer system that is remotely located with respect to the electronic device. The electronic device can be a mobile electronic device.

The computer system 1101 includes a central processing unit (CPU, also "processor" and "computer processor" herein) 1105, which can be a single core or multi core processor, or a plurality of processors for parallel processing. The computer system 1101 also includes memory or memory location 1110 (e.g., random-access memory, read-only memory, flash memory), electronic storage unit 1115 (e.g., hard disk), communication interface 1120 (e.g., network adapter) for communicating with one or more other systems, and peripheral devices 1125, such as cache, other memory, data storage and/or electronic display adapters. The memory 1110, storage unit 1115, interface 1120 and peripheral devices 1125 are in communication with the CPU 1105 through a communication bus (solid lines), such as a motherboard. The storage unit 1115 can be a data storage unit (or data repository) for storing data. The computer system 1101 can be operatively coupled to a computer network ("network") 1130 with the aid of the communication interface 1120. The network 1130 can be the Internet, an internet and/or extranet, or an intranet and/or extranet that is in communication with the Internet. The network 1130 in some cases is a telecommunication and/or data network. The network 1130 can include one or more computer servers, which can enable distributed computing, such as cloud computing. The network 1130, in some cases with the aid of the computer system 1101, can implement a peer-to-peer network, which may enable devices coupled to the computer system 1101 to behave as a client or a server.

The CPU 1105 can execute a sequence of machine-readable instructions, which can be embodied in a program or software. The instructions may be stored in a memory location, such as the memory 1110. The instructions can be directed to the CPU 1105, which can subsequently program or otherwise configure the CPU 1105 to implement methods of the present disclosure. Examples of operations performed by the CPU 1105 can include fetch, decode, execute, and writeback.

The CPU 1105 can be part of a circuit, such as an integrated circuit. One or more other components of the system 1101 can be included in the circuit. In some cases, the circuit is an application specific integrated circuit (ASIC).

The storage unit 1115 can store files, such as drivers, libraries and saved programs. The storage unit 1115 can store user data, e.g., user preferences and user programs. The computer system 1101 in some cases can include one or more additional data storage units that are external to the computer system 1101, such as located on a remote server that is in communication with the computer system 1101 through an intranet or the Internet.

The computer system 1101 can communicate with one or more remote computer systems through the network 1130. For instance, the computer system 1101 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), cloud based computing services (e.g. Amazon Web Services), or personal digital assistants. The user can access the computer system 1101 via the network 1130.

Methods as described herein can be implemented by way of machine (e.g., computer processor) executable code stored on an electronic storage location of the computer system 1101, such as, for example, on the memory 1110 or electronic storage unit 1115. The machine executable or machine readable code can be provided in the form of software. During use, the code can be executed by the processor 1105. In some cases, the code can be retrieved from the storage unit 1115 and stored on the memory 1110 for ready access by the processor 1105. In some situations, the electronic storage unit 1115 can be precluded, and machine-executable instructions are stored on memory 1110.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 1101, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1101 can include or be in communication with an electronic display 1135 that comprises a user interface (UI) 1140 for providing, for example, status of a printing process, status of the sorting process (e.g. displaying an amount or weight of total material sorted), manual controls of the magnetic field (e.g. emergency stop buttons controlling the on/off states of the magnetic field), and display indicators designed to e.g., display number of ferromagnetic objects produced, ink levels, pressure levels, temperature levels, and/or applied magnetic flux density. Examples of UI's include, without limitation, a graphical user interface (GUI) and web-based user interface.

EXAMPLES

Example 1—Ferromagnetic Ink Composition #1

In an example, a ferromagnetic ink composition comprised 30 parts of a ferromagnetic pigment (from amongst electrolytic iron, atomized iron, carbonyl iron, carbonyl cobalt, carbonyl nickel, iron oxides, ferritic stainless steel or atomized stainless steel) was dispersed in 30 parts of ethyl acetate, 10 parts of toluene and 17 parts of methyl ethyl ketone. Ten parts of vinyl chloride vinyl acetate terpolymer resin and 3 parts of an amine based wetting and dispersing agent were used to stabilize the ink formulation.

Example 2—Ferromagnetic Ink Composition #2

In an example, a ferromagnetic ink composition comprised 30 parts of a ferromagnetic pigment (from amongst electrolytic iron, atomized iron, carbonyl iron, carbonyl cobalt, carbonyl nickel, iron oxides, ferritic stainless steel or atomized stainless steel) was dispersed in 30 parts of ethyl acetate, 10 parts of toluene and 17 parts of methyl ethyl ketone. Furthermore, 7 parts of vinyl chloride vinyl acetate terpolymer resin and 4 parts of amorphous polyester resin were used. In addition, 3 parts of an amine based wetting and dispersing agent were used to stabilize the ink formulation.

Example 3—Ferromagnetic Ink Composition #3

In an example, a ferromagnetic ink composition comprised 30 parts of a ferromagnetic pigment (from amongst electrolytic iron, atomized iron, carbonyl iron, carbonyl cobalt, carbonyl nickel, iron oxides, ferritic stainless steel or atomized stainless steel) was dispersed in 30 parts of ethyl acetate, 10 parts of toluene and 17 parts of methyl ethyl ketone. Furthermore, 6 parts of vinyl chloride vinyl acetate terpolymer resin and 6 parts of ethylene vinyl acetate resin were used. In addition, 3 parts of an amine based wetting and dispersing agent were used to stabilize the ink formulation.

Example 4—Ferromagnetic Ink Composition #4

In an example, a ferromagnetic ink composition comprised 30 parts of a ferromagnetic pigment (from amongst electrolytic iron, atomized iron, carbonyl iron, carbonyl cobalt, carbonyl nickel, iron oxides, ferritic stainless steel or atomized stainless steel) was dispersed in 30 parts of ethyl acetate, 10 parts of toluene and 17 parts of methyl ethyl ketone. Furthermore, 6 parts of vinyl chloride vinyl acetate terpolymer resin and 4 parts of acrylic resin were used. In addition, 3 parts of an amine based wetting and dispersing agent were used to stabilize the ink formulation.

Example 5—Method of Marking a Plastic Object with a Ferromagnetic Label Comprising 3 Layers In an example, the application of the ferromagnetic marker onto a plastic object was as follows: the ferromagnetic marker was applied to the plastic object using heat transfer printing or hot foil stamping. This was a two-step process, as illustrated in FIGS. 4A-B. In the first step, the heat transfer foil (e.g. a polyester film) was printed with the ferromagnetic ink composition (e.g., any composition as previously described in Examples 1-4), a release varnish, and an adhesive varnish. The release varnish was for example, SB-HT from Sungbo Inks or S-125B from Sungjin Inks. The adhesive varnish was for example, the SB-HT PP-1-A from Sungbo Inks or S-1042 from Sungjin Inks. The printing process was a gravure printing process with a printing speed of 50-150 meters/minute.

The three layers were printed onto the foil in the following order: release varnish, ferromagnetic ink, and adhesive varnish using engraved metal cylinders. Three cylinders were used to get a total of three layers of coatings onto the heat transfer foil.

In the second step, the marker was transferred from the heat transfer foil to the surface of a bottle cap using a hot foil stamping machine. The stamping pressure was adjusted to 50 bar and the temperature was adjusted to 150° C. so that all three layers were transferred from the heat transfer foil to the bottle cap to form a uniform scratch resistant coating/marker.

Example 6—Method of Marking a Plastic Object with a Ferromagnetic Label Comprising 5 Layers In an example, the application of the ferromagnetic marker onto a plastic object was as follows: the ferromagnetic marker was applied to the plastic object using heat transfer printing or hot foil stamping. This was a two-step process. In the first step, the heat transfer foil (e.g. a polyester film) was printed with the ferromagnetic ink composition (e.g., any composition as previously described in Examples 1-4), a release varnish, and an adhesive varnish. The release varnish was for example, SB-HT from Sungbo Inks or S-125B from Sungjin Inks. The adhesive varnish was for example, the SB-HT PP-1-A from Sungbo Inks or S-1042 from Sungjin Inks. The printing process was a gravure printing process with a printing speed of 50-150 meters/minute.

Five cylinders were used to get a total of five layers of coatings onto the heat transfer foil. In the second step, the marker was transferred from the heat transfer foil to the surface of a bottle cap using a hot foil stamping machine. The stamping pressure was adjusted to 50 bar and the temperature was adjusted to 150° C. so that all five layers were transferred from the heat transfer foil to the bottle cap to form a uniform scratch resistant coating/marker.

Example 7—Method of Marking a Plastic Object with a Ferromagnetic Label Comprising 8 Layers In an example, the application of the ferromagnetic marker onto a plastic object was as follows: the ferromagnetic marker was applied to the plastic object using heat transfer printing or hot foil stamping. This was a two-step process. In the first step, the heat transfer foil (e.g. a polyester film) was printed with the ferromagnetic ink composition (e.g., any composition as previously described in Examples 1-4), a release varnish, and an adhesive varnish. The release varnish was for example, SB-HT from Sungbo Inks or S-125B from Sungjin Inks. The adhesive varnish was for example, the SB-HT PP-1-A from Sungbo Inks or S-1042 from Sungjin Inks. The printing process was a gravure printing process with a printing speed of 50-150 meters/minute.

Eight cylinders were used to get a total of eight layers of coatings onto the heat transfer foil. In the second step, the marker was transferred from the heat transfer foil to the surface of a bottle cap using a hot foil stamping machine. The stamping pressure was adjusted to 50 bar and the temperature was adjusted to 150° C. so that all eight layers were transferred from the heat transfer foil to the bottle cap to form a uniform scratch resistant coating/marker.

Example 8—Method of Marking a Plastic Fork with a Ferromagnetic Label Comprising 3 Layers In an example, the application of the ferromagnetic marker onto a plastic object was as follows: the ferromagnetic marker was applied to the plastic object using heat transfer printing or hot foil stamping. This was a two-step process. In the first step, the heat transfer foil (e.g. a polyester film) was printed with the ferromagnetic ink composition (e.g., any composition as previously described in Examples 1-4), a release varnish, and an adhesive varnish. The release varnish was for example, SB-HT from Sungbo Inks or S-125B from Sungjin Inks. The adhesive varnish was for example, the SB-HT PP-1-A from Sungbo Inks or S-1042 from Sungjin Inks. The printing process was a gravure printing process with a printing speed of 50-150 meters/minute.

The three layers were printed onto the foil in the following order: release varnish, ferromagnetic ink, and adhesive varnish using engraved metal cylinders. Three cylinders were used to get a total of three layers of coatings onto the heat transfer foil.

In the second step, the marker was transferred from the heat transfer foil to the surface of a plastic fork using a hot foil stamping machine. The stamping pressure was adjusted to 50 bar and the temperature was adjusted to 150° C. so that all three layers were transferred from the heat transfer foil to the plastic fork to form a uniform scratch resistant coating/marker.

Example 9—Method of Applying a Ferromagnetic Label onto a Plastic Object

In another example, a self-adhesive label was printed with the ferromagnetic ink composition (e.g., any one of the ferromagnetic ink compositions described in Examples 1-4) using a flexographic printing press with a printing speed of 50-150 meters/minute. The label was then affixed to various plastic objects such as single use bottles, bottle caps, single use coffee cups, cutlery, a shrink sleeves, and clamshell containers.

Example 10—Method of Applying a Ferromagnetic Label onto a Shrink Sleeve Film In another example, a polyethylene terephthalate (PET) shrink sleeve film was printed with the ferromagnetic ink (e.g., any one of the ferromagnetic ink compositions described in Examples 1-4) in addition to 1-5 non-ferromagnetic ink layers for aesthetic purposes using a gravure printing press with a printing speed of 50-150 meters/minute.

Example 11—Method of Sorting a Plastic Object Comprising the Ferromagnetic Label In an example, a plastic object comprising the ferromagnetic label was separated using a commercial magnetic separator, as shown in FIG. 5. 28 millimeter (mm) "Alaska" bottle caps comprising the ferromagnetic label were fed onto a conveyor belt along with identical 28 mm "Alaska" bottle caps not comprising the ferromagnetic labels. The conveyor belt was equipped with a magnetic pulley with a magnetic field strength of 11,500+/−500 gauss at the magnet surface. The magnetic pulley was able to attract the bottle caps with the ferromagnetic labels inwards while the non-marked bottle caps (i.e., the bottle caps not comprising the ferromagnetic labels) were thrown away from the conveyor belt. The 28 millimeter (mm) "Alaska" bottle caps comprising the ferromagnetic label were separated with an average separation efficiency of 90.6%, as observed over the course of 20 runs.

Example 12—Method of Sorting a Plastic Object Comprising the Ferromagnetic Label in a Simulated Glass Waste Stream In an example, a 28 millimeter (mm) "Alaska" bottle caps comprising the ferromagnetic label were mixed with 28 millimeter (mm) "Alaska" bottle caps not comprising the ferromagnetic label using a commercial magnetic separator, as shown in FIG. 5. In addition, 3 mm polyethylene pellets were further mixed uniformly with the bottle caps (with and without ferromagnetic labels) in approximately a 95:5 weight ratio. The mixture of pellets and bottle caps with and without ferromagnetic labels were added onto the conveyor belt to simulate a contaminated recycled glass stream (i.e. a simulated glass stream contaminated with small plastic objects) in a commercial MRF. The 28 millimeter (mm) "Alaska" bottle caps comprising the ferromagnetic label were separated with an average separation efficiency of 77.4%, as observed over the course of 20 runs.

Example 13—Method of Sorting a Plastic Object Comprising the Ferromagnetic Label in a Simulated Glass Waste Stream with a Burden Depth of 1 Inch In an example, a 28 millimeter (mm) "Alaska" bottle caps comprising the ferromagnetic label were mixed with 28 millimeter (mm) "Alaska" bottle caps not comprising the ferromagnetic label using a commercial magnetic separator, as shown in FIG. 5. In addition, 3 mm polyethylene pellets were further mixed uniformly with the bottle caps (with and without ferromagnetic labels) in approximately a 95:5 weight ratio. The mixture of pellets and bottle caps with and without ferromagnetic labels were added onto the conveyor belt to simulate a contaminated recycled glass stream (i.e. a simulated glass stream contaminated with small plastic objects) in a commercial MRF. A burden depth of 1 inch of material on the conveyor belt was maintained to simulate the burden depth observed in a commercial MRF. The 28 millimeter (mm) "Alaska" bottle caps comprising the ferromagnetic label were separated with an average separation efficiency of 63.6%, as observed over the course of 20 runs.

Example 14—Stability of Ferromagnetic Ink Composition

In an example, a stability study of the ferromagnetic ink composition was performed. A plurality of ferromagnetic ink composition samples was stored at a temperature of 40° C. for a period of 7 days. The parameter used for assessing stability was observation of settling of particles of the ferromagnetic ink composition. Settling of the ferromagnetic ink composition samples was qualitatively judged. Settling of the ferromagnetic ink composition samples was rated from a scale from 1 to 5, where 1 indicated a complete settling and 5 indicated no settling. After 7 days, the plurality of ferromagnetic ink compositions were rated a 5. The plurality of ferromagnetic ink composition samples were kept at a temperature of 40° C. for an additional 2 weeks (3 weeks total). The samples were assessed at the end of the 3 week period and were rated a 5, indicating no settling was observed and thus, indicating the ferromagnetic ink composition was stable.

Example 15—Heat Transfer of Ferromagnetic Label

In an example, a heat transfer study of the ferromagnetic label comprising a ferromagnetic ink composition was performed. The ferromagnetic label comprised three layers in the following order: a release layer, a ferromagnetic ink composition, and an adhesive layer. The three layers of the ferromagnetic layer were printed in that order onto a polyester film. The polyester film comprising the ferromagnetic label was then pressed against a flat plastic (i.e., the same material as the desired plastic object to be printed on) for a duration of about 2 seconds using a hot plate with a surface temperature of about 180° C. The polyester film and the object were observed for a transfer of the film and judged qualitatively on a scale of 1-5, where 5 indicated complete transfer from the polyester film onto the plastic without any leftovers and 1 indicated no transfer of label from the polyester film. The ferromagnetic label was assessed after transfer and was rated a 5, indicating a complete transfer from the polyester film onto the plastic object occurred without any ink remnants left on the film surface.

Example 16—Magnetic Strength of Ferromagnetic Ink Compositions

In an example, a magnetic strength study of the ferromagnetic ink composition is performed. First, ferromagnetic pigments (FMP) are taken and ink formulations with varying FMP concentrations are created. The ferromagnetic ink compositions are deposited onto labels in order to create ferromagnetic labels, as described elsewhere herein. The ferromagnetic labels are applied to plastic re-sealable bags (i.e., one ferromagnetic label per one plastic bag). The amount of weight lifted by a bucking magnet with a strength of about 7000 gauss at the surface is measured. The plastic bags comprising the ferromagnetic labels are able to be magnetically lifted with and without additional weight added to the plastic bags. For example, in the cases where the plastic bags with additional weight added are lifted, the ferromagnetic ink composition comprises increasing concentrations of FMP or multiple layers of the ferromagnetic ink composition. An increasing number of layers of ferromagnetic ink compositions or an increasing concentration of FMP in the ferromagnetic ink compositions increase overall magnetic strength of the ferromagnetic label and its lifting ability.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A ferromagnetic ink composition comprising: a ferromagnetic material, a resin, and at least one of a wetting agent and a dispersing agent,
    wherein said ferromagnetic ink composition is a food contact substance, and
    wherein said ferromagnetic ink composition has a migration of less than 10 milligrams (mg) per squared decimeter ($dm^2$) of a contact surface, a coercivity ranging from 0.8 A/m to 8 A/m, and a viscosity up to 200 cP; and wherein the ferromagnetic ink composition is compatible with flexographic printing, gravure printing, offset printing, or any combination thereof.

2. The ferromagnetic ink composition of claim 1, wherein said ferromagnetic material comprises at least 1% of the weight of said ferromagnetic ink composition.

3. The ferromagnetic ink composition of claim 1, wherein said ferromagnetic material is unadulterated iron powder, carbonyl iron, carbonyl cobalt, carbonyl nickel, iron alloy, iron oxide, low carbon steel grade, nickel, cobalt, ferritic stainless steel, atomized stainless steel, or any combination thereof.

4. The ferromagnetic ink composition of claim 1, wherein said resin comprises at least 5% of the weight of said ferromagnetic ink composition, and
    wherein said resin is a vinyl chloride vinyl acetate copolymer, nitrocellulose, polyurethane, a ketone aldehyde polymer, an alcohol-soluble polyamide, a co-solvent polyamide, a maleic resin, an ester gum resin, an acrylic resin, a cellulose acetate butyrate resin, cellulose acetate propionate, an amorphous polyester resin, a chlorinated rubber, an ethyl vinyl acetate resin, or any combination thereof.

5. The ferromagnetic ink composition of claim 1, further comprising at least one solvent,
wherein said solvent comprises about 25% of the weight of said ferromagnetic ink composition, and
wherein said solvent is methanol, ethanol, n-propanol, isopropyl alcohol, ethyl acetate, n-propyl acetate, isopropyl acetate, n-butyl acetate, toluene, methyl ethyl ketone, acetone, or any combination thereof.

6. The ferromagnetic ink composition of claim 1, wherein a ferromagnetic material/resin ratio is from about 2/1 to about 6/1.

7. The ferromagnetic ink composition of claim 1, further comprising a colored pigment.

8. The ferromagnetic ink composition of claim 1, wherein said ferromagnetic ink composition is temporarily magnetized when exposed to a magnetic field,
wherein said magnetic field has a magnetic flux density ranging from about 3,000 gauss (G) to about 12,000 G.

9. A method of manufacturing said ferromagnetic ink composition of claim 1.

10. A ferromagnetic film or label comprising: a ferromagnetic ink composition, a film, and an adhesive layer,
wherein said ferromagnetic ink composition comprises a ferromagnetic material, a resin, and at least one of a wetting agent and a dispersing agent, and
wherein said ferromagnetic ink composition is a food contact substance that has a migration of less than 10 milligrams (mg) per squared decimeter (dm$^2$) of a contact surface, a coercivity ranging from 0.8 A/m to 8 A/m, and a viscosity up to 200 cP; and wherein the ferromagnetic ink composition is compatible with flexographic printing, gravure printing, offset printing, or any combination thereof.

11. The ferromagnetic film or label of claim 10, wherein said ferromagnetic material comprises at least 1% of the weight of said ferromagnetic ink composition.

12. The ferromagnetic film or label of claim 10, wherein a ferromagnetic material/resin ratio is from about 2/1 to about 6/1.

13. The ferromagnetic film or label of claim 10, further comprising a release varnish.

14. The ferromagnetic film or label of claim 10, further comprising a colored pigment.

15. The ferromagnetic film or label of claim 10, wherein said ferromagnetic film or label is deposited upon an object by application of heat, pressure, or a combination thereof.

16. The ferromagnetic film or label of claim 15, wherein said ferromagnetic film or label adheres to a surface of said object by application of heat, pressure, or a combination thereof.

17. The ferromagnetic film or label of claim 15, wherein said ferromagnetic film or label is mechanically affixed on a surface of said object.

18. The ferromagnetic film or label of claim 15, wherein said object is plastic or metal.

19. The ferromagnetic film or label of claim 18, wherein said object is a single-use bottle, a bottle cap, a single-use coffee cup, plastic cutlery, an eating utensil, a cutting utensil, a plastic tray, a plastic container, a food packaging container, a shrink sleeve, or any combination thereof.

20. The ferromagnetic film or label of claim 15, wherein the weight of said ferromagnetic ink composition is up to 2% of the total weight of said object.

21. The ferromagnetic film or label of claim 10, wherein said ferromagnetic film or label is a shrink sleeve label.

22. A method of manufacturing said ferromagnetic film or label of claim 10.

23. A method of sorting a mixed stream of objects comprising:
(a) providing a mixed stream of objects that comprises at least one non-ferromagnetic object comprising a ferromagnetic film or label deposited thereupon, and at least one object not comprising a ferromagnetic or magnetic component;
(b) contacting said stream of objects to a magnetic field, wherein said magnetic field has a magnetic flux density ranging from about 3,000 gauss (G) to about 12,000 G;
(c) separating said at least one non-ferromagnetic object comprising said ferromagnetic film or label deposited thereupon from said mixed stream of objects based on attraction of said at least one non-ferromagnetic object comprising said ferromagnetic film or label deposited thereupon to said magnetic field,
wherein said ferromagnetic film or label comprises a ferromagnetic ink composition, a film, and an adhesive layer, wherein said ferromagnetic ink composition comprises a ferromagnetic material, a resin, and at least one of a wetting agent and a dispersing agent, and
wherein said ferromagnetic ink composition is a food contact substance that has a migration of less than 10 milligrams (mg) per squared decimeter (dm$^2$) of a contact surface, a coercivity ranging from 0.8 A/m to 8 A/m, and a viscosity up to 200 cP; and wherein the ferromagnetic ink composition is compatible with flexographic printing, gravure printing, offset printing, or any combination thereof.

24. The ferromagnetic ink composition of claim 1, wherein the ferromagnetic ink composition is compatible with flexographic printing and has a viscosity of from about 100 cP to about 200 cP.

25. The ferromagnetic ink composition of claim 1, wherein the ferromagnetic ink composition is compatible with gravure printing and has a viscosity of from about 40 cP to about 80 cP.

26. The ferromagnetic ink composition of claim 1, wherein the ferromagnetic ink composition is compatible with offset printing and has a viscosity of from about 100 cP to about 150 cP.

* * * * *